(12) United States Patent
Thompson et al.

(10) Patent No.: US 10,860,511 B1
(45) Date of Patent: Dec. 8, 2020

(54) INTEGRATED NETWORK-ATTACHABLE CONTROLLER THAT INTERCONNECTS A SOLID-STATE DRIVE WITH A REMOTE SERVER COMPUTER

(71) Applicant: Western Digital Technologies, Inc., San Jose, CA (US)

(72) Inventors: Michael Ivan Thompson, Colfax, CA (US); Murthy Kompella, Roseville, CA (US); Joseph Harold Steinmetz, Loomis, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/530,346

(22) Filed: Dec. 28, 2016

Related U.S. Application Data

(60) Provisional application No. 62/387,625, filed on Dec. 28, 2015.

(51) Int. Cl.
*G06F 13/28* (2006.01)
*G06F 13/40* (2006.01)
*G06F 13/16* (2006.01)
*G06F 13/42* (2006.01)

(52) U.S. Cl.
CPC ...... *G06F 13/4027* (2013.01); *G06F 13/1605* (2013.01); *G06F 13/28* (2013.01); *G06F 13/4282* (2013.01); *G06F 2213/0026* (2013.01)

(58) Field of Classification Search
CPC .. G06F 13/4027; G06F 13/1605; G06F 13/28; G06F 13/4282; G06F 2213/0026
See application file for complete search history.

(56) References Cited

U.S. PATENT DOCUMENTS

| | | | |
|---|---|---|---|
| 7,460,473 B1* | 12/2008 | Kodama | H04L 47/10 370/230 |
| 10,333,813 B1* | 6/2019 | O'Brien | H04L 43/10 |
| 2006/0034283 A1* | 2/2006 | Ko | H04L 69/16 370/392 |
| 2006/0143534 A1* | 6/2006 | Dall | G06F 11/3636 714/38.11 |
| 2006/0168274 A1* | 7/2006 | Aloni | H04L 67/1097 709/230 |
| 2007/0174526 A1* | 7/2007 | Blackwell | G06F 13/12 710/73 |
| 2010/0030910 A1* | 2/2010 | Pong | H04L 69/08 709/232 |

(Continued)

*Primary Examiner* — Tim T Vo
*Assistant Examiner* — Harry Z Wang

(57) ABSTRACT

The current document is directed to a family of integrated hardware controllers that provides for cost-effective, high-bandwidth, and scalable incorporation of SSDs into large, distributed-computer systems. Certain implementations of the integrated hardware controller include dual media-access controllers for connection to one or more local area networks, remote-direct-memory-access ("RDMA") controllers for supporting RDMA protocols over the local area network, an NVMe controller that provides access to an SSD. In certain integrated-hardware-controller implementations, the RDMA and NVMe controllers are implemented in one of a field programmable gate array ("FPGA") and application-specific integrated circuit ("ASIC").

55 Claims, 52 Drawing Sheets

(56) References Cited

U.S. PATENT DOCUMENTS

| | | | | |
|---|---|---|---|---|
| 2011/0271141 A1* | 11/2011 | Kursun | ............... | G06F 11/008 |
| | | | | 714/6.3 |
| 2013/0198312 A1* | 8/2013 | Tamir | ................... | G06F 15/167 |
| | | | | 709/212 |
| 2013/0346667 A1* | 12/2013 | Stroud | ................ | G06F 13/385 |
| | | | | 710/316 |
| 2014/0089533 A1* | 3/2014 | Saripalli | ............. | G06F 9/4812 |
| | | | | 710/8 |
| 2014/0115150 A1* | 4/2014 | Ewanchuk | ........... | H04W 76/25 |
| | | | | 709/224 |
| 2014/0244888 A1* | 8/2014 | Kallickal | ........... | G06F 13/4022 |
| | | | | 710/313 |
| 2014/0344488 A1* | 11/2014 | Flynn | ...................... | G06F 5/14 |
| | | | | 710/52 |
| 2015/0160884 A1* | 6/2015 | Scales | ................. | G06F 3/0608 |
| | | | | 711/114 |
| 2015/0254088 A1* | 9/2015 | Chou | ................. | G06F 9/45541 |
| | | | | 709/212 |
| 2015/0261434 A1* | 9/2015 | Kagan | ................... | G06F 13/28 |
| | | | | 711/103 |
| 2015/0370665 A1* | 12/2015 | Cannata | ............... | H04L 49/356 |
| | | | | 714/4.11 |
| 2016/0124643 A1* | 5/2016 | Liu | .................... | G06F 12/0868 |
| | | | | 711/130 |
| 2016/0328209 A1* | 11/2016 | Pape | ...................... | G06F 7/582 |
| 2017/0068640 A1* | 3/2017 | Shahan | ............ | G06F 15/17331 |
| 2017/0149920 A1* | 5/2017 | Sammatshetti | ..... | H04L 67/2842 |

\* cited by examiner

| HHD (504) | | SSD (502) |
|---|---|---|
| SCSI / ATA / IDE / FC / SAS / SATA (508) | | SCSI / SATA / PCIE / FC / USB / IDE (512) |
| 2 – 3 S | Startup Time | 1 – 3 ms |
| 100 ms | Random Access Time | 3-12 ms |
| 200 Mb/s | Data Transfer Rate | 200 Mb/s – 2 Gb/s |
| 0° - 35° C | Temperature Tolerance | -55°C - 40°C + |
| Altitude, mechanical shock, temperature changes, electrical shock, magnetic fields, EMP | Environmental effects | EMP, power-surge susceptibility |
| $0.04 | Cost / GB | $0.23 |
| 10 TB (518) | Capacity | 15 TB (516) |

FIG. 5

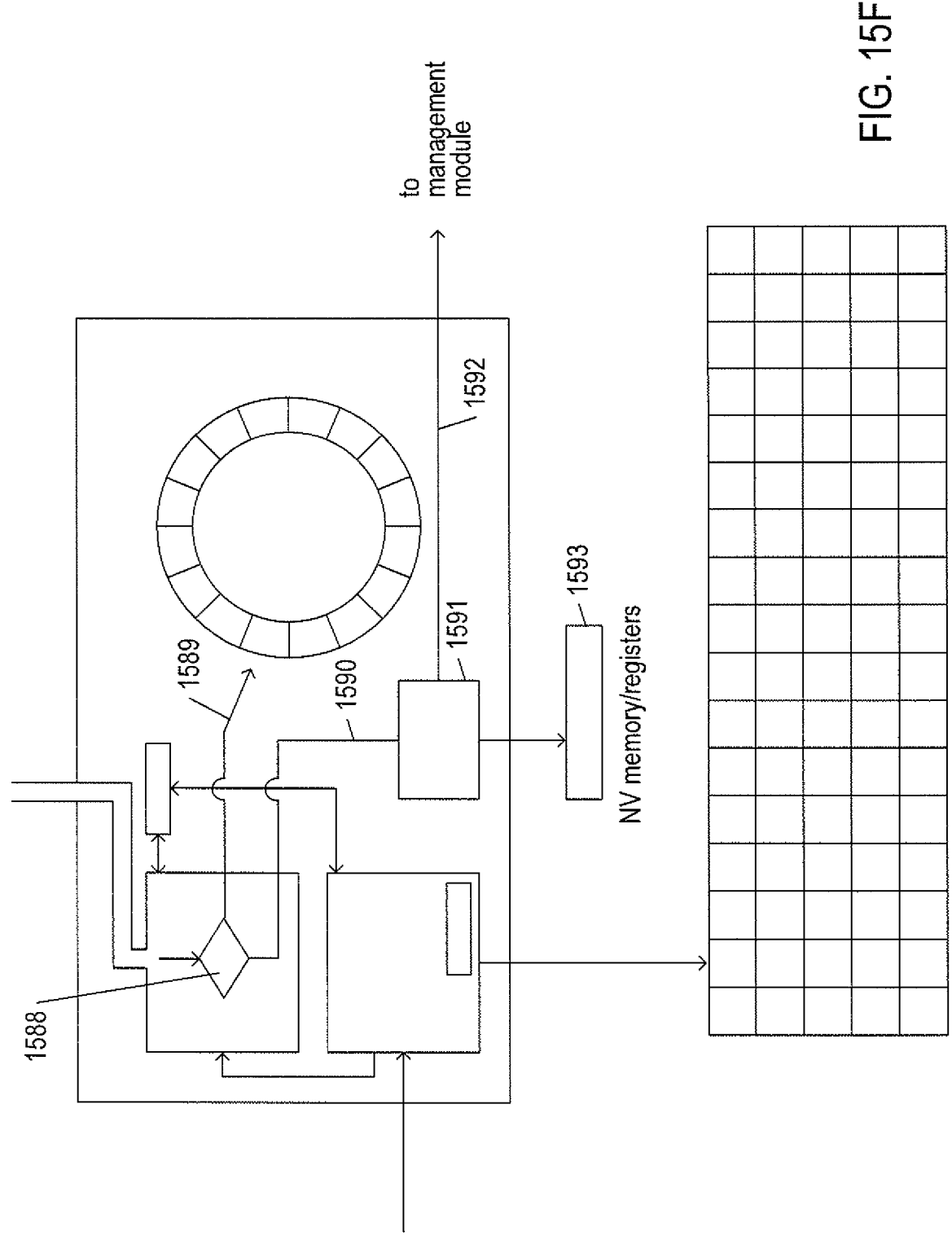

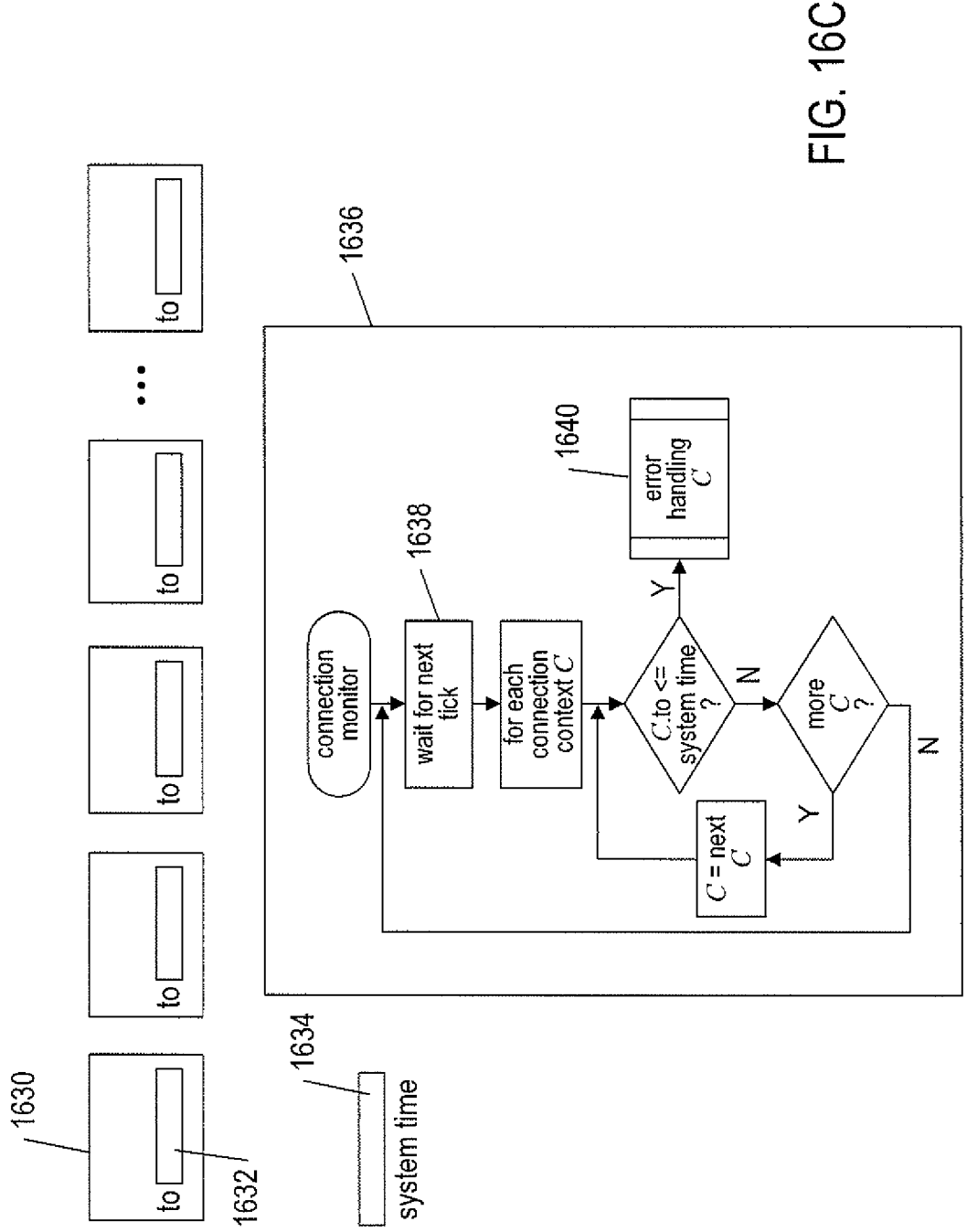

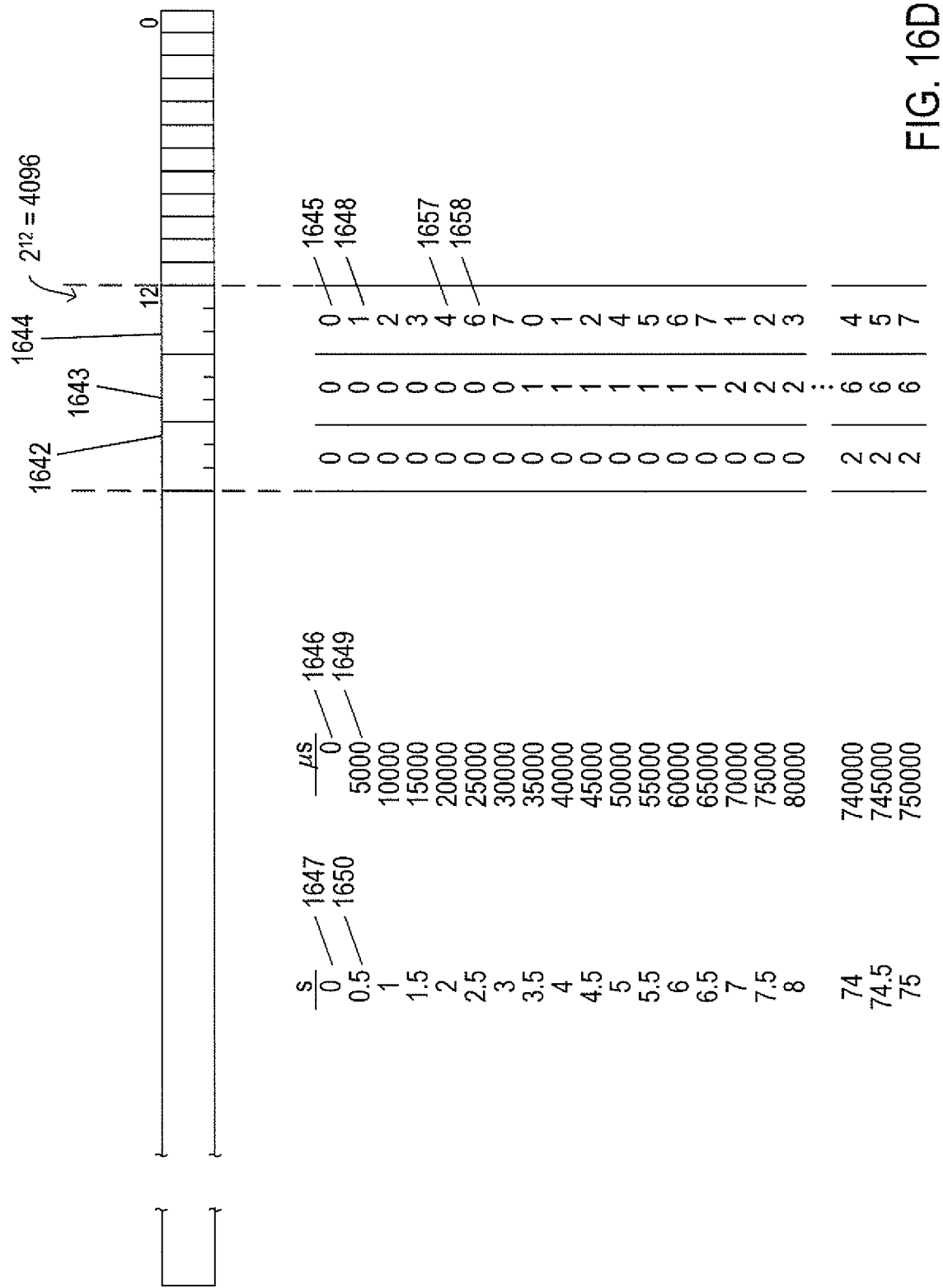

INTEGRATED NETWORK-ATTACHABLE CONTROLLER THAT INTERCONNECTS A SOLID-STATE DRIVE WITH A REMOTE SERVER COMPUTER

CROSS-REFERENCE TO RELATED APPLICATION

This application claims the benefit of Provisional Application No. 62/387,625, filed Dec. 28, 2015.

TECHNICAL FIELD

The current document is directed to network-attached data-storage appliances and, in particular, to an integrated hardware controller that interconnects a non-volatile-memory-express ("NVMe") solid-state disk ("SSD") to a local area network.

BACKGROUND

As computer technologies have advanced over the past 20 years, large, distributed cloud-computing facilities and other large, distributed-computing systems have begun to dominate provision of computational bandwidth and data storage to business organizations. As the price performance, bandwidths, and storage capacities of computer-system components have rapidly increased, computational services are now provided to organizations and individuals by cloud-computing facilities in a fashion similar to provision of electrical energy and water to consumers by utility companies. As a result of rapid growth in the cloud-computing industry, the demand for computational bandwidth, data storage, and networking bandwidth has dramatically increased, providing great incentives to cloud-computing providers to increase the economic efficiency of cloud-computing facilities and other large distributed-computing systems.

The rapid decrease in the cost of storing data and hard disk drives during the latter half of the 1990s helped to spur the development of cloud computing and big-data applications. More recently, the development of solid-state disks ("SSDs") and rapid increase in price performance of SSDs has provided an approach to more efficient and robust data storage. Designers and developers of distributed-computer systems, cloud-computing-facility owners and managers, and, ultimately, consumers of computational bandwidth and data storage continue to seek technologies for incorporating large numbers of high-capacity SSDs into cloud-computing facilities and distributed-computer systems.

SUMMARY

The current document is directed to a family of integrated hardware controllers that provides for cost-effective, high-bandwidth, and scalable incorporation of SSDs into large, distributed-computer systems. Certain implementations of the integrated hardware controller include dual media-access controllers for connection to one or more local area networks, remote-direct-memory-access ("RDMA") controllers for supporting RDMA protocols over the local area network, an NVMe controller that provides access to an SSD. In certain integrated-hardware-controller implementations, the RDMA and NVMe controllers are implemented in one of a field programmable gate array ("FPGA") and application-specific integrated circuit ("ASIC").

BRIEF DESCRIPTION OF THE DRAWINGS

FIG. 5 compares magnetic disk drives with solid-state disk drives.

FIGS. 15A-F illustrate another feature of the currently disclosed TFC implementation.

FIGS. 16A-I illustrate how the MPU manages connections within the TFC.

DETAILED DESCRIPTION

The current document is directed to integrated hardware controllers that interconnect one or more SSDs to a network, such as an Ethernet network. The discussion, provided below, introduces the architecture for one implementation of the hardware controller and provides illustrations and detailed discussion about numerous particular features within this implementation. The current version of the full hardware specification for the hardware controller is provided in Appendix A.

Figure 1:
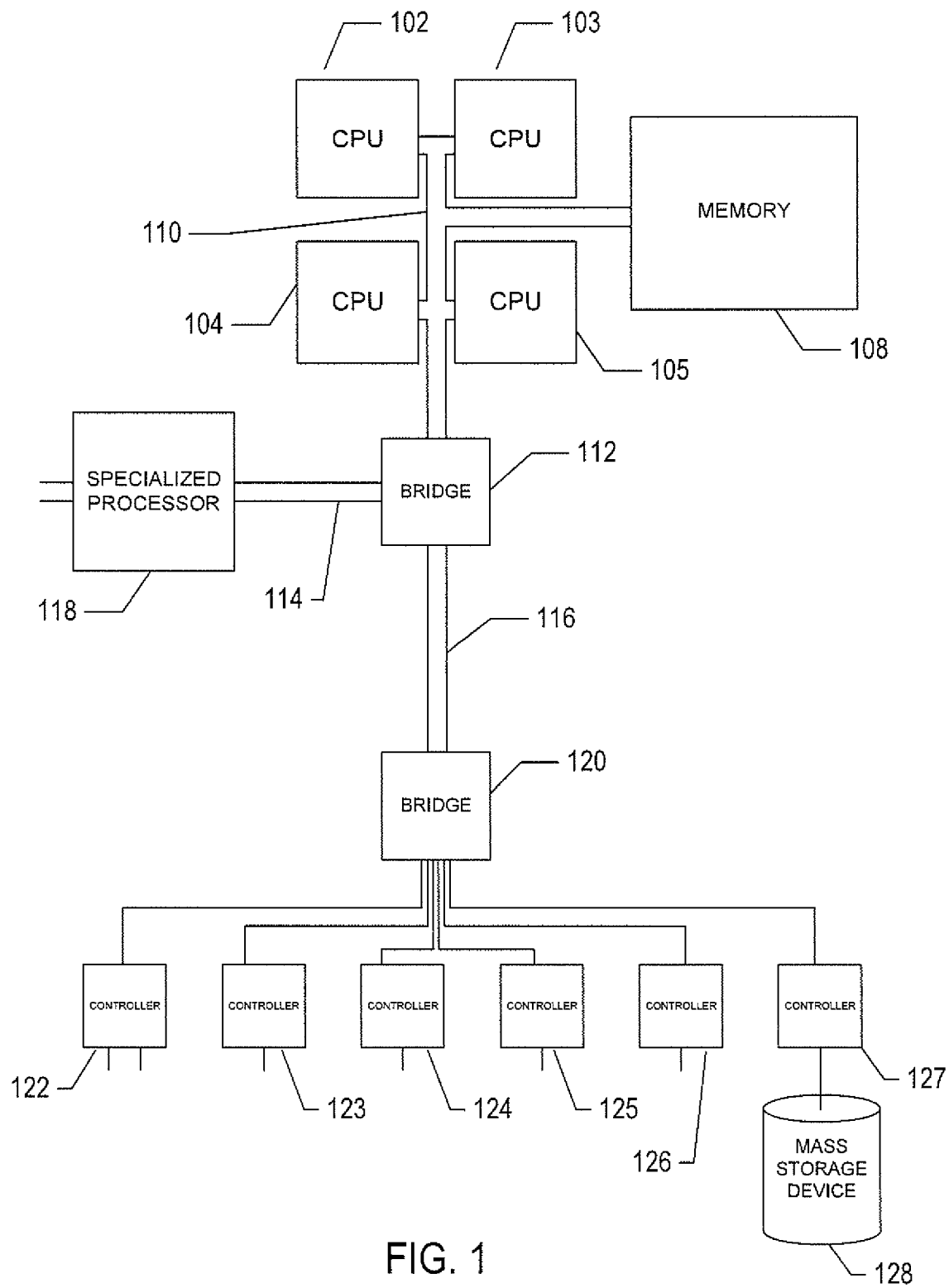
FIG. 1 provides a general architectural diagram for various types of computers.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
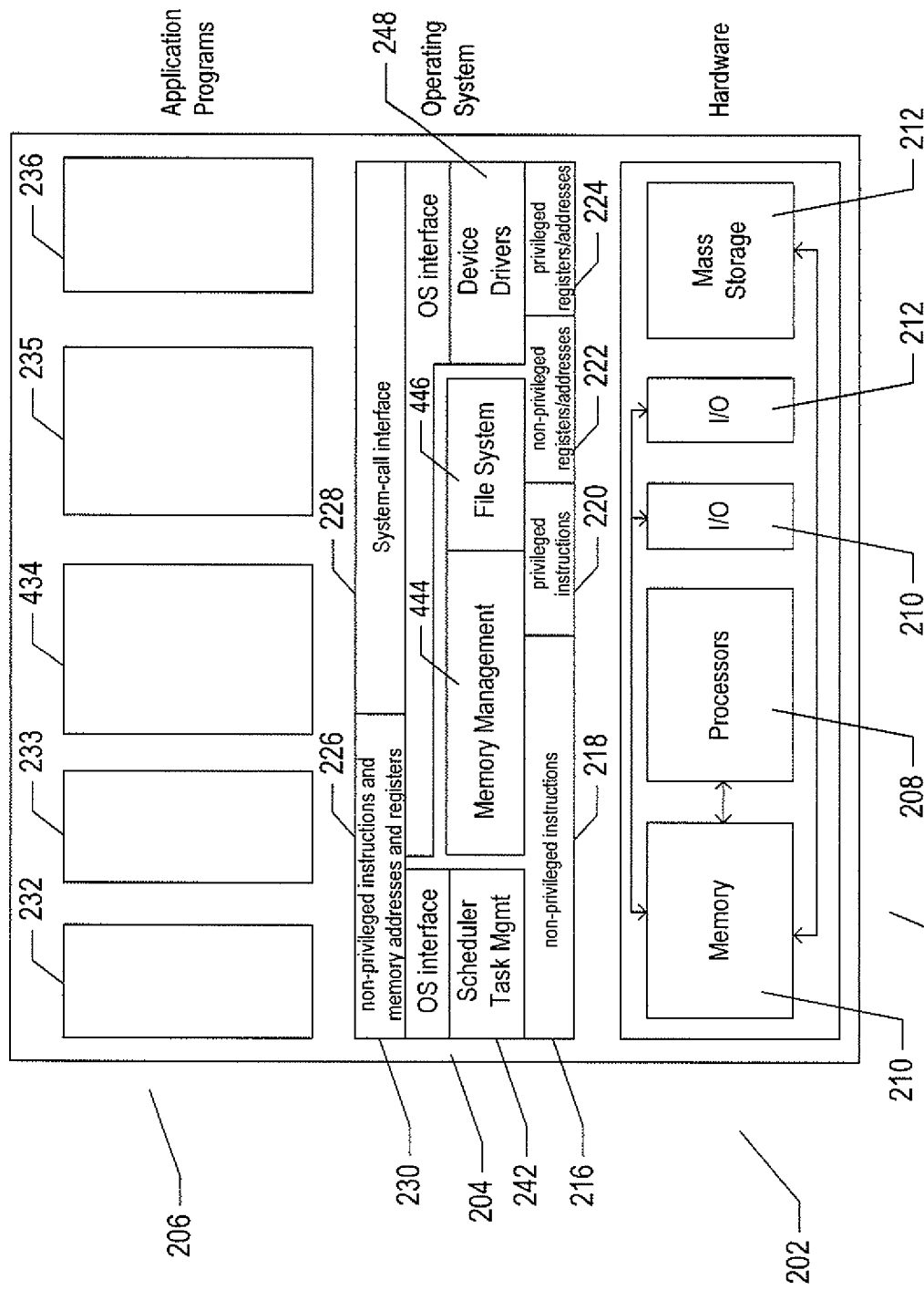
FIG. 2 illustrates generalized hardware and software components of a general-purpose computer system, such as a general-purpose computer system having an architecture similar to that shown in FIG. 1.

FIG. 2 illustrates generalized hardware and software components of a general-purpose computer system, such as a general-purpose computer system having an architecture similar to that shown in FIG. 1. The computer system 200 is often considered to include three fundamental layers: (1) a hardware layer or level 202; (2) an operating-system layer or level 204; and (3) an application-program layer or level 206. The hardware layer 202 includes one or more processors 208, system memory 210, various different types of input-output ("I/O") devices 210 and 212, and mass-storage devices 214. Of course, the hardware level also includes many other components, including power supplies, internal communications links and busses, specialized integrated circuits, many different types of processor-controlled or microprocessor-controlled peripheral devices and controllers, and many other components. The operating system 204 interfaces to the hardware level 202 through a low-level operating system and hardware interface 216 generally comprising a set of non-privileged computer instructions 218, a set of privileged computer instructions 220, a set of non-privileged registers and memory addresses 222, and a set of privileged registers and memory addresses 224. In general, the operating system exposes non-privileged instructions, non-privileged registers, and non-privileged memory addresses 226 and a system-call interface 228 as an operating-system interface 230 to application programs 232-236 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 242, memory management 244, a file system 246, device drivers 248, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 246 facilitates abstraction of mass-storage-device and memory resources as a high-level, easy-to-access, file-system interface. In many modern operating systems, the operating system provides an execution environment for concurrent execution of a large number of processes, each corresponding to an executing application program, on one or a relatively small number of hardware processors by temporal multiplexing of process execution. Thus, the development and evolution of the operating system has resulted in the generation of a type of multi-faceted virtual execution environment for application programs and other higher-level computational entities.

While the execution environments provided by operating systems have proved to be an enoiatously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 3:
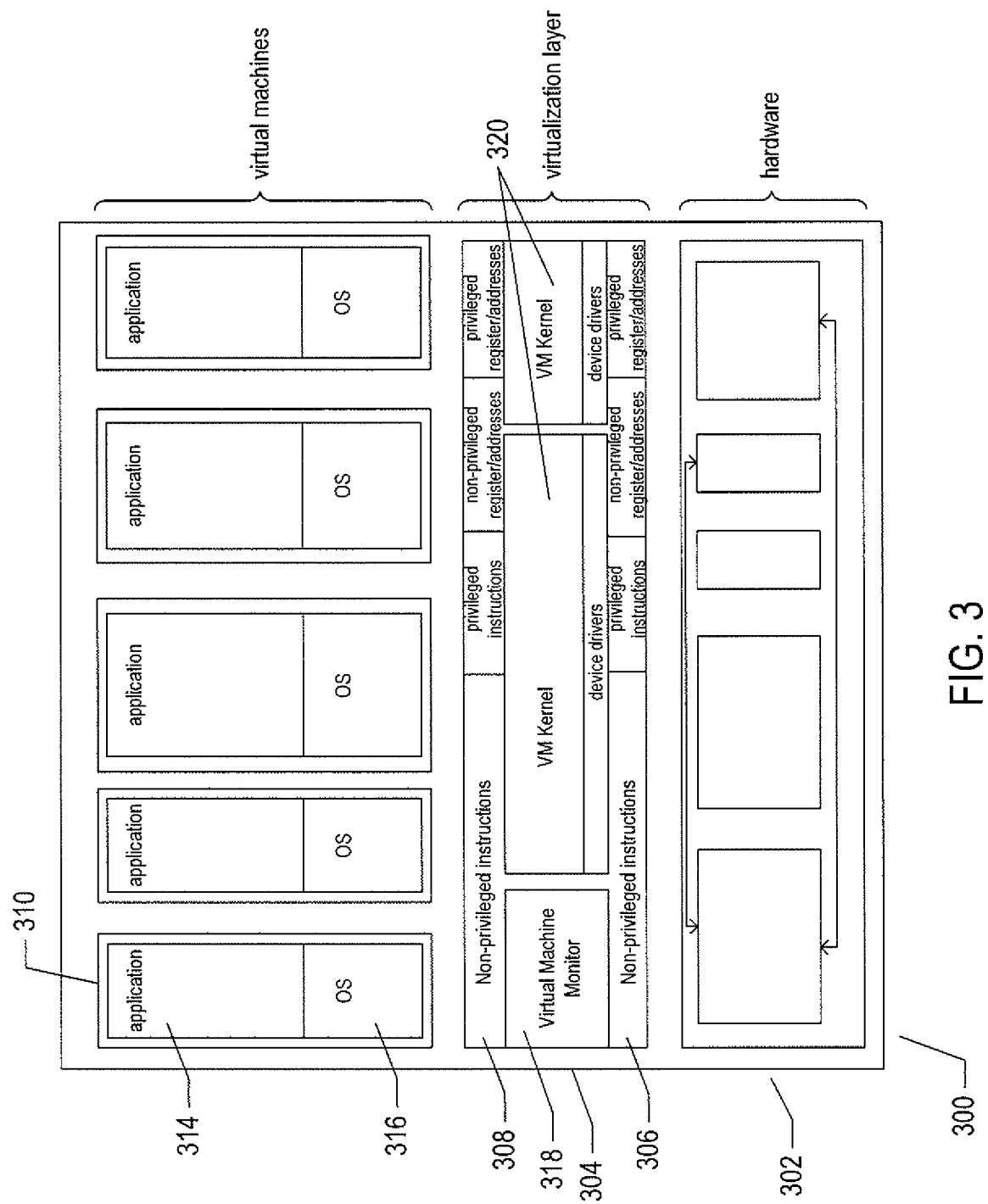
FIG. 3 illustrates one type of virtual machine and virtual-machine execution environment.

For all of these reasons, a higher level of abstraction, referred to as the "virtual machine," has been developed and evolved to further abstract computer hardware in order to address many difficulties and challenges associated with traditional computing systems, including the compatibility issues discussed above. FIG. 3 illustrates one type of virtual machine and virtual-machine execution environments. The computer system 300 in FIG. 3 includes the same hardware layer 302 as the hardware layer 202 shown in FIG. 2. However, rather than providing an operating system layer directly above the hardware layer, as in FIG. 2, the virtualized computing environment illustrated in FIG. 3 features a virtualization layer 304 that interfaces through a virtualization-layer/hardware-layer interface 306, equivalent to interface 216 in FIG. 2, to the hardware. The virtualization layer provides a hardware-like interface 308 to a number of virtual machines, such as virtual machine 310, executing above the virtualization layer in a virtual-machine layer 312. Each virtual machine includes one or more application programs or other higher-level computational entities packaged together with an operating system, referred to as a "guest operating system," such as application 314 and guest operating system 316 packaged together within virtual machine 310. Each virtual machine is thus equivalent to the operating-system layer 204 and application-program layer 206 in the general-purpose computer system shown in FIG. 2. Each guest operating system within a virtual machine interfaces to the virtualization-layer interface 308 rather than to the actual hardware interface 306. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 308 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 318 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 308, the accesses result in execution of virtualization-layer code to simulate or emulate the privileged resources. The virtualization layer additionally includes a kernel module 320 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

Figure 4:
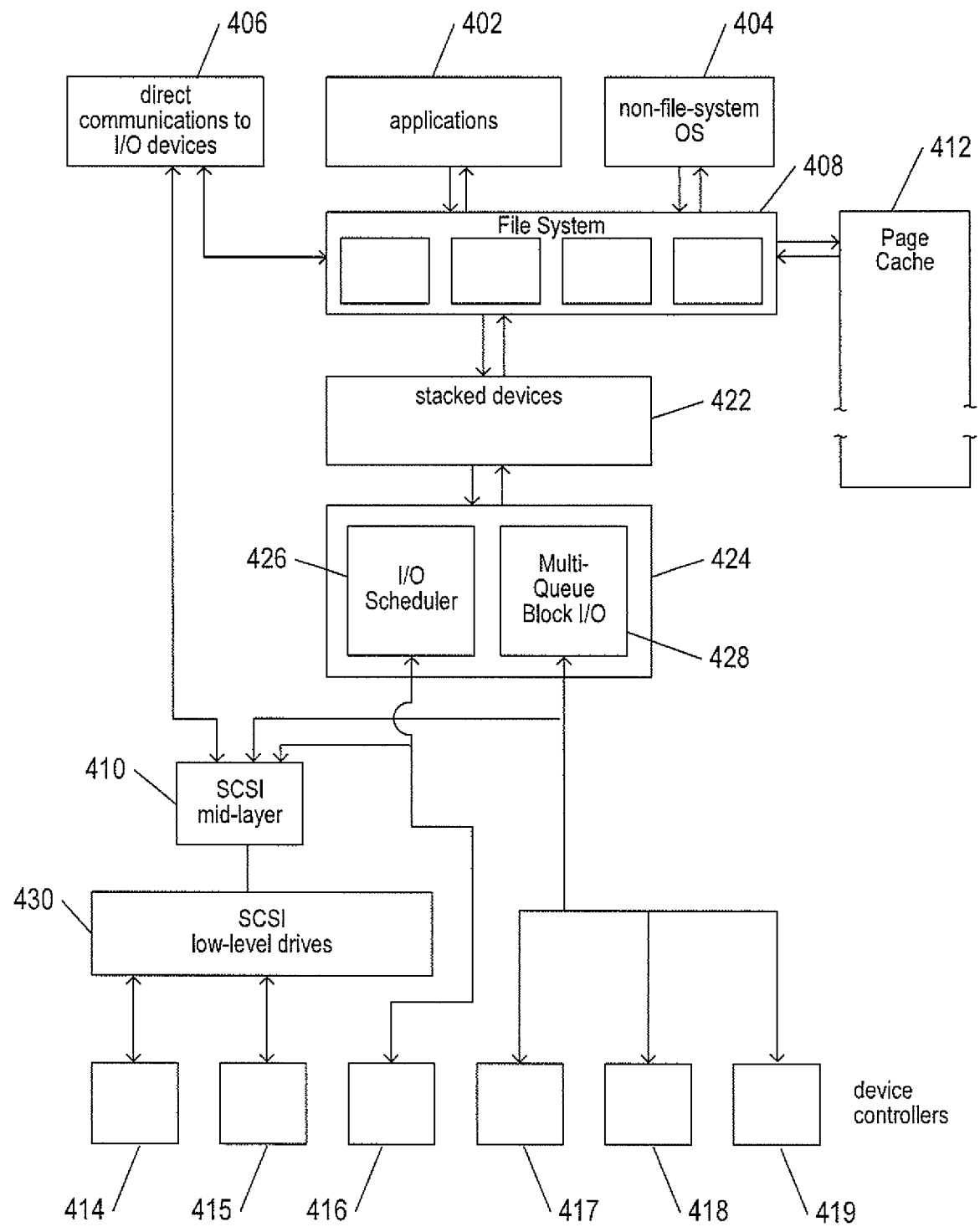
FIG. 4 illustrates the storage stack within a computer system.

FIG. 4 illustrates the storage stack within a computer system. The storage stack is a hierarchically layered set of components that interconnect application programs, portions of an operating system, and remote computational entities with the controllers that control access to, and operation of, various types of data-storage devices. In FIG. 4, executing application programs are represented by rectangle 402, the non-file-system portion of an operating system is represented by rectangle 404, and remote computational entities accessing data-storage facilities of the local computer system through communications devices are represented by rectangle 406. The applications and non-file-system portions of the operating system 402 and 404 access local data-storage devices through the file system 408 of the operating system. Remote processing entities 406 may access data-storage devices through the file system or may directly access a small-computer-system-interface ("SCSI") middle layer 410. The file system maintains a page cache 412 for caching data retrieved from storage devices on behalf of applications, non-file-system OS components, and remote computational entities. The file system, in turn, accesses, the low-level data-storage device controllers 414-419 through a stacked-devices layer 422 and block layer 424. The stacked-devices layer 422 implements various types of multi-device aggregations, such as redundant array of independent disks ("RAID") that provide for fault-tolerant data storage. The block layer 424 stores data blocks in, and retrieves data blocks from, data-storage devices. Traditional devices with single input and output queues are accessed via an I/O scheduler 426 while more modern, high-throughput devices that provide for large numbers of input and output queues from which device controllers fetch I/O requests, in parallel, for parallel execution of the I/O requests by high-throughput devices are accessed through a multi-queue block I/O component 428. The SCSI midlayer 410 and lower-level SCSI drives 430 provide access to the device controllers for data-storage devices with SCSI interfaces 414-415. Other types of I/O device controllers 416 that do not provide the SCSI interface are directly accessed by the I/O scheduler component 426. The device controllers for modern, multi-queue, high-throughput data-storage devices 417-419 are accessed directly by the multi-queue block I/O component 428.

FIG. 5 compares magnetic disk drives with solid-state disk drives. Solid-state drives ("SSDs") 502 are modern data-storage devices with electronic interfaces similar to block I/O magnetic disk drives ("HHDs") 504. However, while magnetic disk drives employ mechanically spun platters for magnetically storing data in small regions of a thin-film ferromagnetic material, the direction of magnetization of which are set by magnetic disk-write operations executed by magnetic heads arranged along a movable actuator arm, SSDs are non-mechanical devices that use non-volatile electronic memory for storing data. Magnetic disks 504 include processor-based disk controllers, multiple platters 506 with ferromagnetic coatings, a multi-arm actuator 508, each arm including multiple magnetic heads for accessing the data-storage regions on the surface of the platters, a high-speed electric motor, power-distribution circuitry, and other electromagnetic components. They are complicated devices and are associated with many types of failure modes, from deterioration of the ferromagnetic films on the platters to actuator alignment errors and electronic-motor failures. By contrast, solid-state drives 502 store data in dynamic random access memory ("DRAM") and/or various types of flash memory, including multi-level-cell ("MLC") NAND-based flash memory. Solid-state disk drives do not include moving mechanical components, as a result of which they are generally far more tolerant to mechanical shock and vibration and are generally not subject to the types of mechanical wear and deterioration observed in magnetic disk drives. In FIG. 5, various parameters and characteristics of magnetic disk drives and solid-state disk drives are shown. Both types of drives may be interconnected with a device controller within a computer system or data-storage appliance by various types of interconnection media and protocols 510 and 512. In a central column 514 of FIG. 5, a number of characteristics are listed, with the values for those characteristics shown in a right-hand column 516 for solid-state disk drives and a left-hand column 518 for magnetic disk drives. This can be seen by comparing the values in columns 516 and 518, solid-state disks have much faster start-up times than magnetic disk drives. SSDs also have, in general, much faster random-access times. SSDs have data-transfer rates that range from rates observed for magnetic disk drives to rates of at least an order of magnitude greater than those found in magnetic disk drives. SSDs tolerate a wider range of operational temperatures than magnetic disk drives. As with all modern processor or micro-processor-controlled electronic devices, SSDs and magnetic disk drives are both susceptible to damage from electromagnetic pulses ("EMPs"). However, magnetic disk drives are susceptible to failure due to operating at high altitudes, due to mechanical shock, due to rapid temperature changes, electrical shocks, and magnetic fields. By contrast, SSDs are somewhat more susceptible to damage due to power surges. However, the cost per gigabyte of storage for SSDs, while continuing to fall, is still significantly higher than for mechanical disk drives. The data-storage capacity of SSDs continues to increase, and high-end SSDs currently have larger data-storage capacities than high-end mechanical disk drives. Thus, as the cost per gigabyte of data storage continues to decrease for SSDs, it is expected that SSDs will increasingly replace magnetic disk drives both in high-end distributed computational platforms as well as in lower-end consumer devices.

Figure 6:
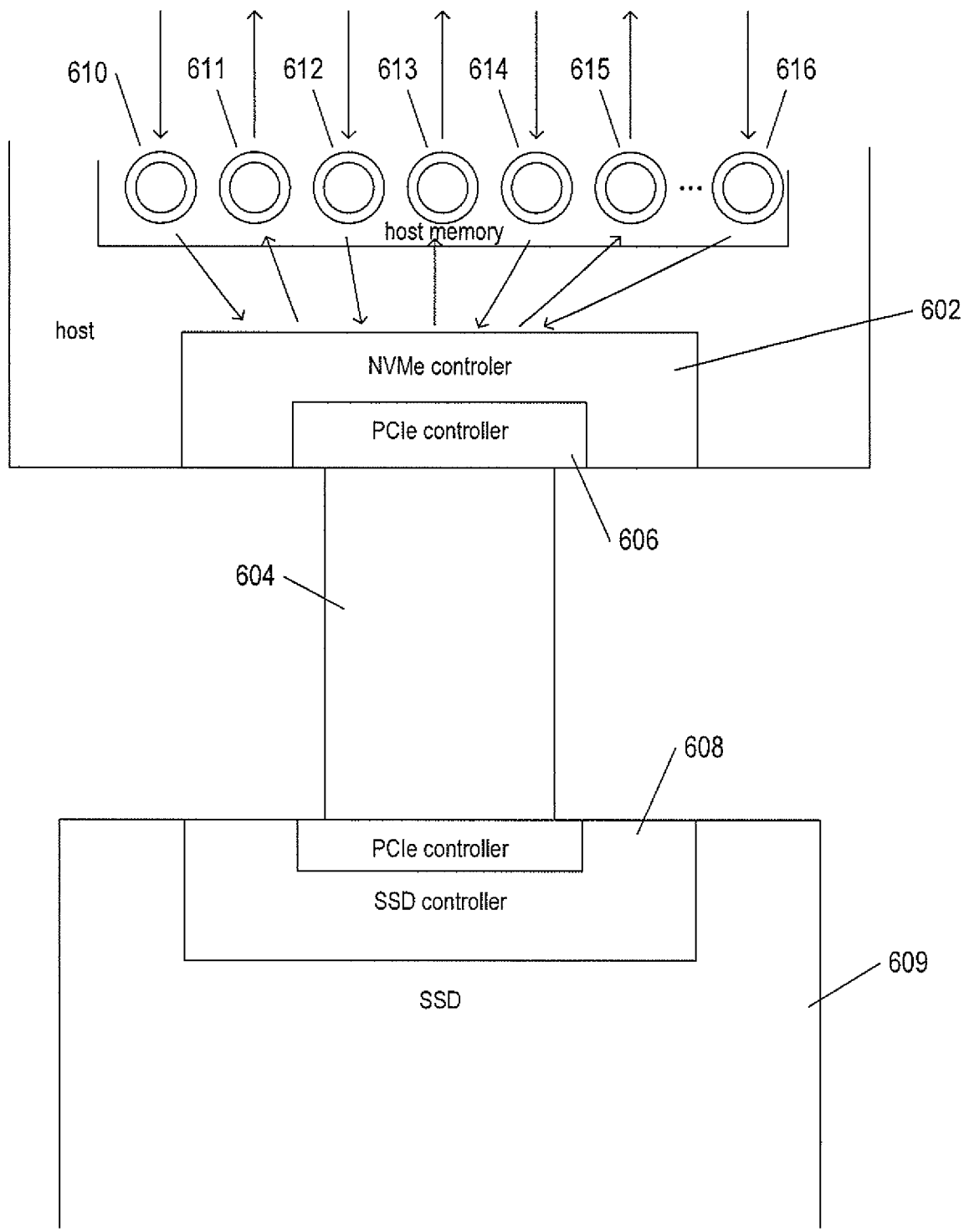
FIGS. 6-7 illustrate an example of a new, high-throughput I/O device that is connected to a host computer system through a high speed communications medium.
Figure 7:
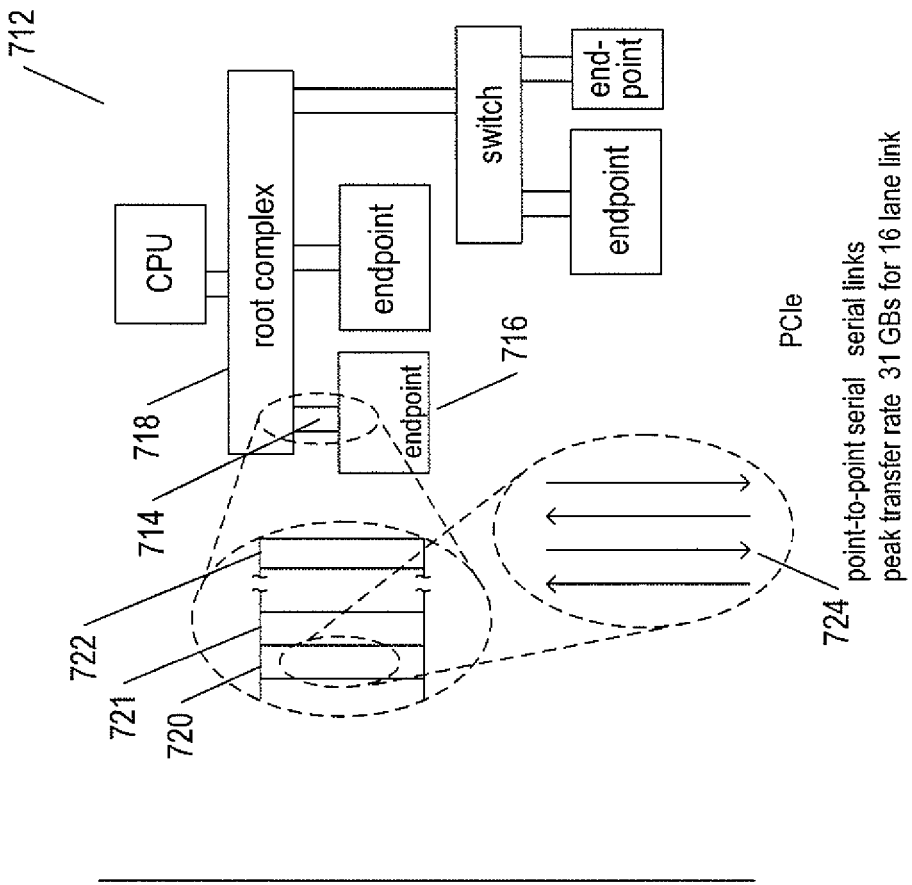
Figure 7:
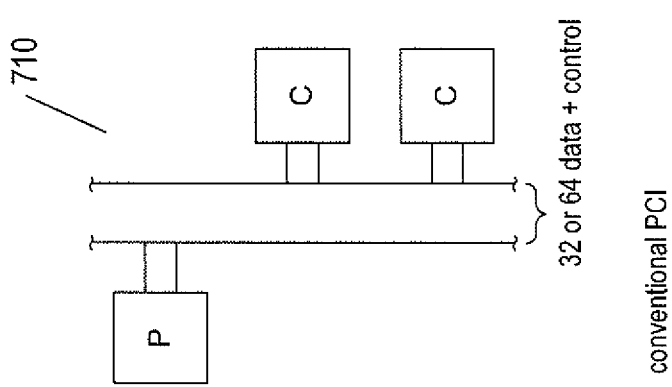

FIGS. 6-7 illustrate an example of one type of high-throughput I/O device that is connected to a host computer system through a high speed communications medium. FIG. 6 illustrates a non-volatile memory express ("NVMe") host controller. The NVMe express host controller has been developed in order to facilitate incorporation of SSDs and other high-throughput I/O data-storage devices with host computers. The NVMe controller 602 is implemented by an NVMe chip set incorporated into an expansion card that interfaces to a PCIe communications medium 604 through an internal PCIe controller 606. The PCIe communications medium 604 interconnects the NVMe controller with an SSD controller 608 of an SSD 609. The NVMe accesses a number of generally paired submission and completion queues 610-616 in host memory to provide parallel, simultaneous access to the SSD by multiple processor cores or multiple processors in a multi-processing-entity computational environment. SSDs are capable of a high degree of parallel operation which is exploited by the NVMe controller via the multiple submission and completion queues and parallel processing of I/O requests.

The large data-transfer rates of SSDs would be difficult to realize in computer systems without high-speed communications media to interconnect SSDs with host processors and host memory. Older arbitrated-bus-based communications media do not have sufficient data-transfer bandwidths to take advantage of the data-transfer rates of SSDs. However, the newer peripheral component interconnect express ("PCIe") communications technology provides the data-transfer bandwidth to allow host computers to take full advantage of SSDs. FIG. 7 compares the older peripheral component interconnect ("PCI") technology with the newer PCIe technology. PCI 1410 is an arbitrated bus with 32 or 64 signal lines for data transfer plus additional control signal lines. The peak data-transfer rate for the PCI is about 133 MB per second for a 32-bit bus. By contrast, the newer PCIe communications medium 1412 is a much higher-speed interconnection technology based on dedicated, point-to-point serial links, rather than a shared, arbitrated bus. A link 714 between an endpoint 716 and a root complex 718 includes one or more lanes 720-722. Each lane is composed of two differential signal-line pairs 724. A link 714 is a point-to-point bi-directional serial connection. PCIe is inherently scalable, because the point-to-point links can have one, two, four, eight, 16 or other numbers of lanes, a doubling of the lanes providing an approximately doubling of the data-transfer rate of the link. A 16-lane PCIe link has a peak data transfer rate of 31 GB per second. Thus, a combination of SSDs and PCIe can provide much higher data-transfer rates than traditional disk drives and arbitrated-bus-based interconnections between disk drives and host memory and processors. Thus, PCIe/SSD technology can significantly increase the data-transfer throughput for I/O subsystems within a computer system, when properly incorporated into the computer-system.

FIGS. 8A-E illustrate operation of a commonly available SSD directly attached to a device controller within a computer system. FIGS. 8A-E all use the same illustration conventions, next described with reference to FIG. 8A. The SSD 802 is shown as a partial rectangle in the lower portion of FIG. 8A. The SSD contains a peripheral component interconnect express ("PCIe") controller and on-board NVMe controller that are not shown in FIGS. 8A-E. The SSD 802 is interconnected with an NVMe controller 804, or device controller, within the host computer system by a PCIe interconnect 806. The NVMe controller 804 includes a submission-queue doorbell 808 and a completion-queue doorbell 810. These two doorbells are mapped to host memory locations that, when written to by the NVMe driver 812 within, or associated with, a virtualization layer or operating system of the host computer, alert the NVMe controller of queue-related events that have occurred as a result of NVMe-driver processing. The NVMe driver 812 communicates with the NVMe controller 804 via the two doorbells 808 and 810 as well as various other data structures and data-containing memory regions within host memory 814. In the examples shown in FIGS. 8A-E, the host memory 814 includes a submission queue 816 and a completion queue 818 that are together associated with a logical connection between some higher-level entity and the SSD. The higher-level entity may be an operating-system-provided connection opened by a thread or process or a connection provided by the operating system to a remote computational entity. Both the submission queue 816 and the completion queue 818 are circular queues. Each includes a head and tail pointer, such as the head pointer 820 and tail pointer 822 associated with the submission queue 816. When the queue is empty, in one implementation, the head and tail pointers point to a single queue element. Contents are written to that element in a queue-submission operation, which causes the tail pointer to advance to a next empty queue element. Data is removed from the circular queue from the cell pointed to by the head pointer, following which the head pointer is advanced. The circular queues operate as first-in, first-out ("FIFO") queues. A circular queue can hold data in all but one entry at any given point in time. Commands and data are queued to the submission queue by the NVMe driver for transmission to the SSD by the NVMe controller and execution by the SSD. Responses to commands are returned by the SSD to the NVMe controller 804, which queues the responses to the completion queue 818, from which they are dequeued and processed by the NVMe driver. One or more data buffers 824 within host memory store data that is transferred from the NVMe driver to the SSD and from the SSD to the NVMe driver during write and read commands, respectively.

Figure 8A:
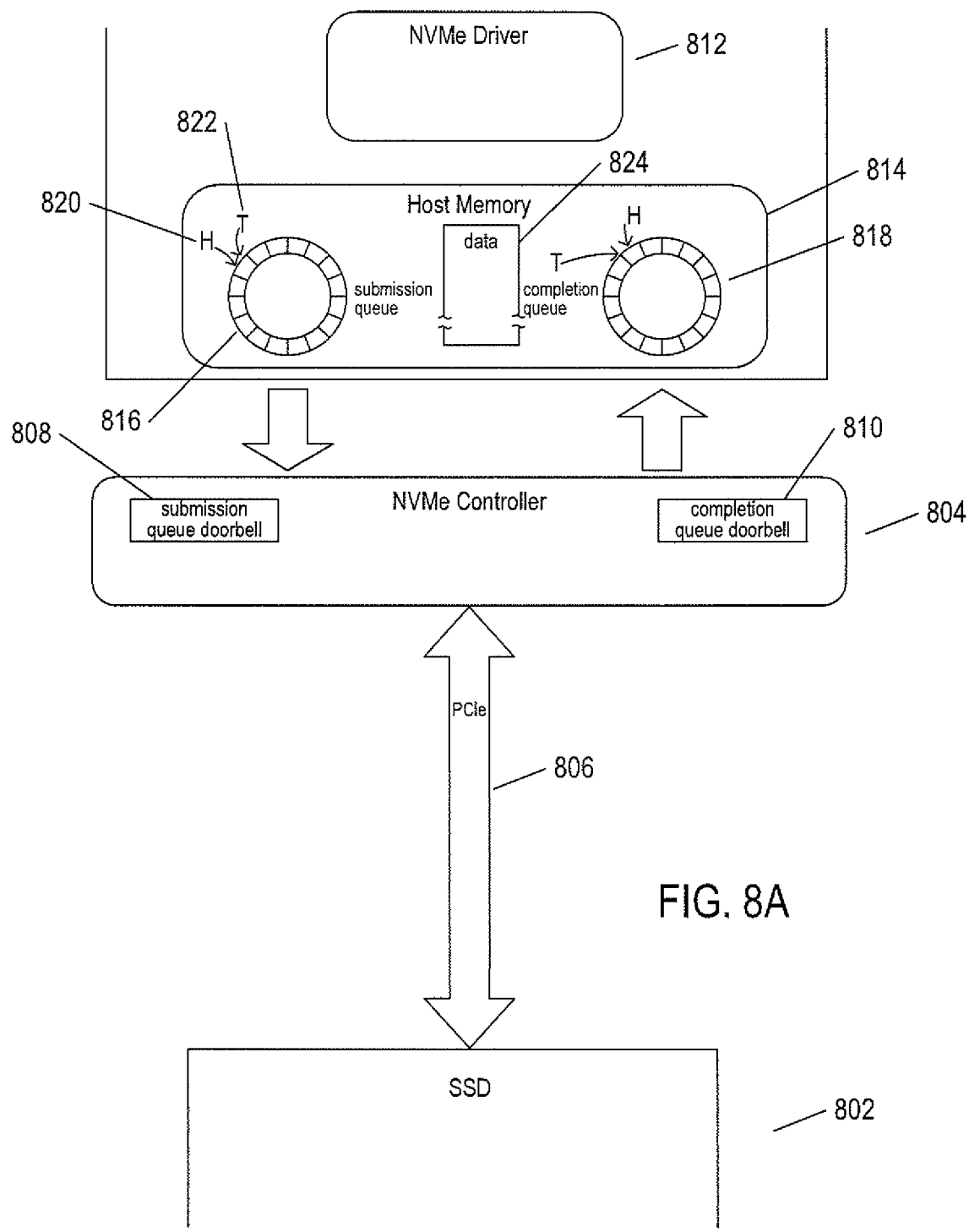
FIGS. 8A-E illustrate operation of a commonly available SSD directly attached to a device controller within a computer system.
Figure 8B:
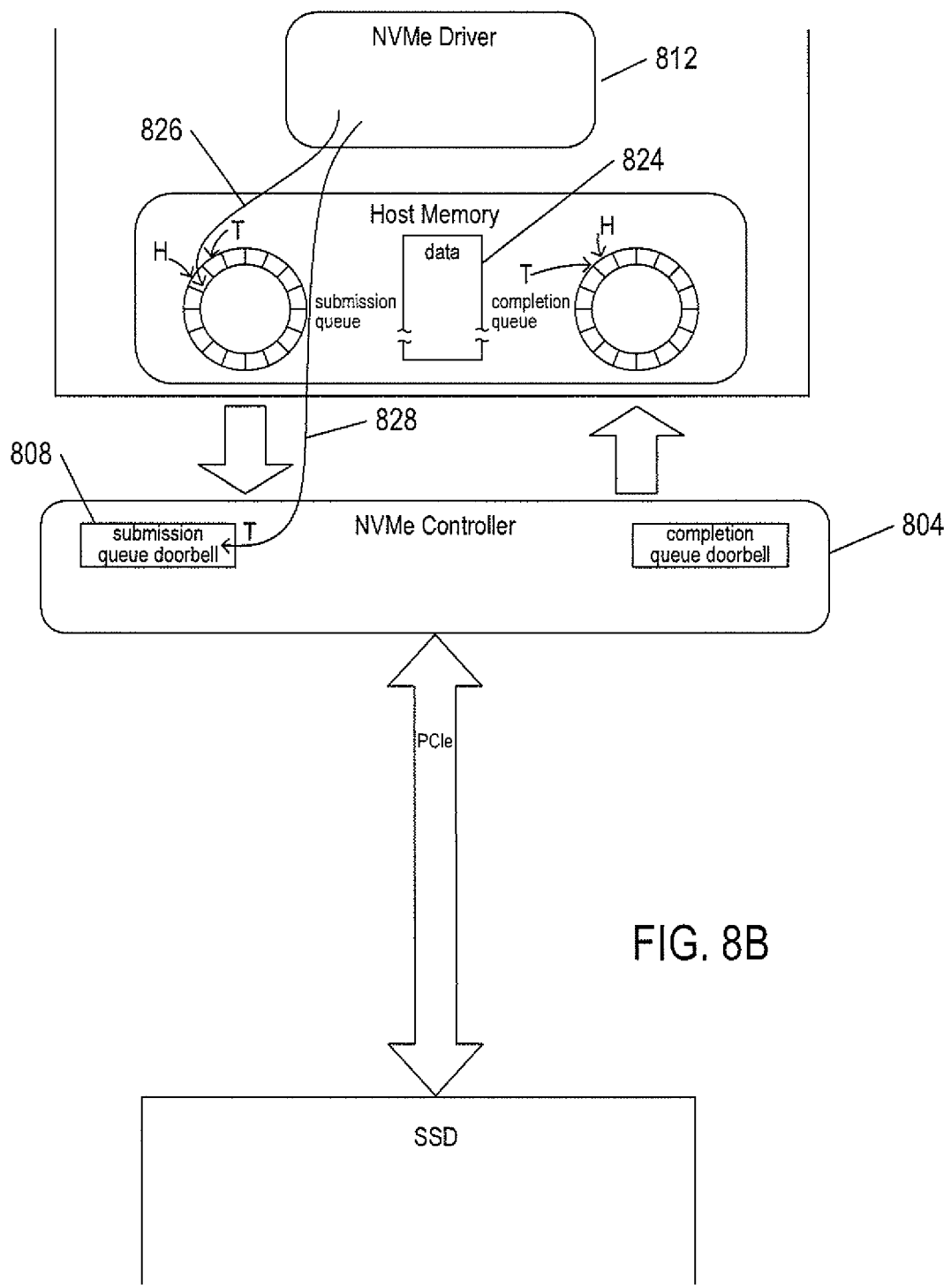

As shown in FIG. 8B, the NVMe driver 812 initiates an SSD operation by writing a command to the submission queue, as represented by curved arrow 826 and then writing the value of the new tail pointer to the submission-queue doorbell 808, as represented by curved arrow 828. When the command represents a request to write data to the SSD, the data is transferred to a data buffer 824 in host memory, the address and length of which is indicated by information contained within the command written to the submission queue. The NVMe controller 804 uses this information to transfer the data to the SSD along with the command.

Figure 8C:
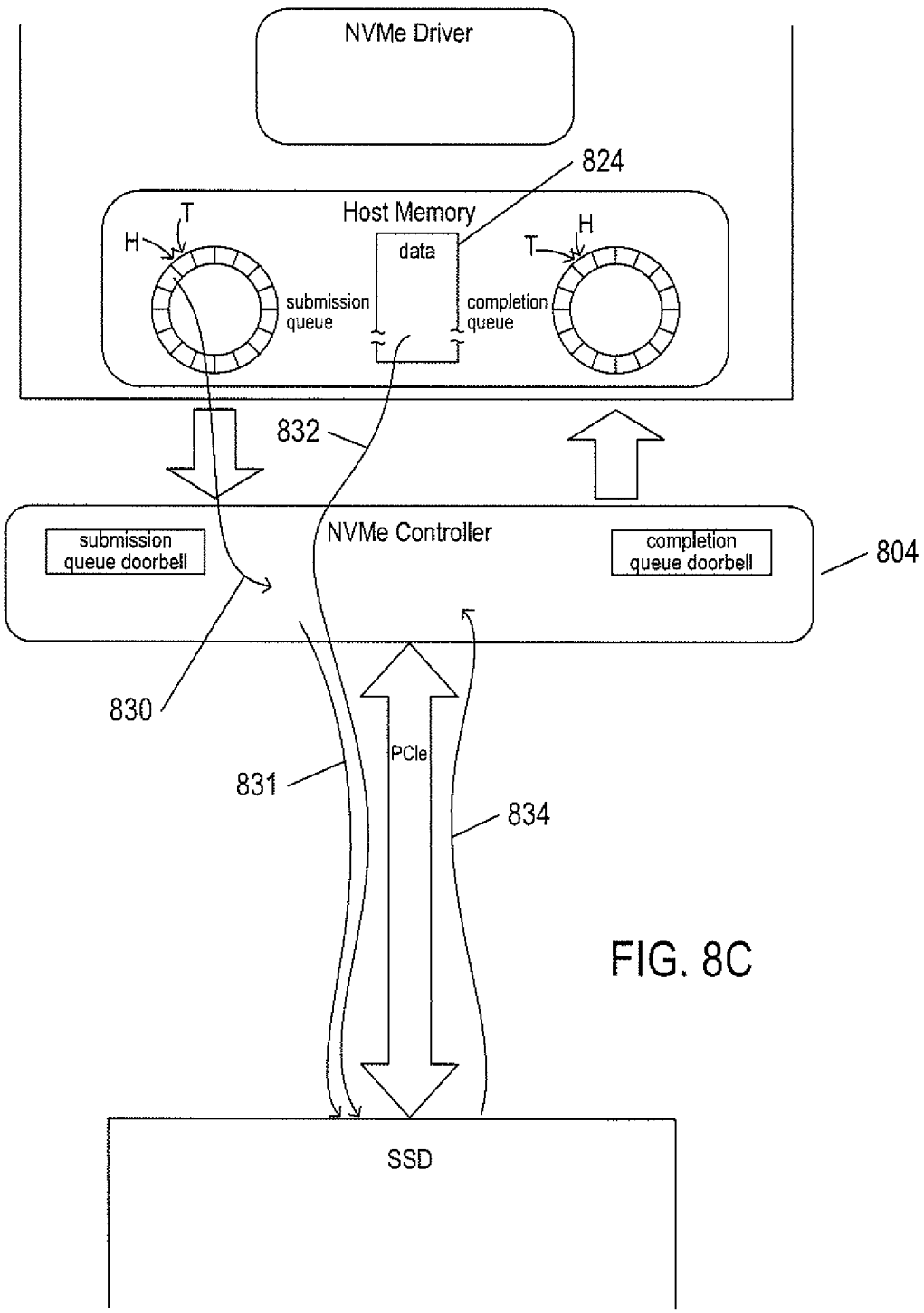

As shown in FIG. 8C, the NVMe controller 804 is alerted to the presence of a new command in the submission queue by writing of the tail-pointer value to the submission-queue doorbell, as discussed above with reference to FIG. 8B. The NVMe controller then reads the command from the submission queue, including advancing the head pointer, and forwards the command to the SSD, as represented by curved arrows 830 and 831. When the command directs data from the host computer to the SSD, the NVMe controller transfers the data to the SSD from a data buffer in host memory 824, as represented by curved arrow 832. The SSD carries out the command and then returns a response message to the NVMe driver, as represented by curved arrow 834. When the command transmitted to the SSD is a read command or another command that involves data transfer from the SSD to the host, the data would be returned to the NVMe controller in addition to the response to the command and written to a host-memory buffer 824.

Figure 8D:
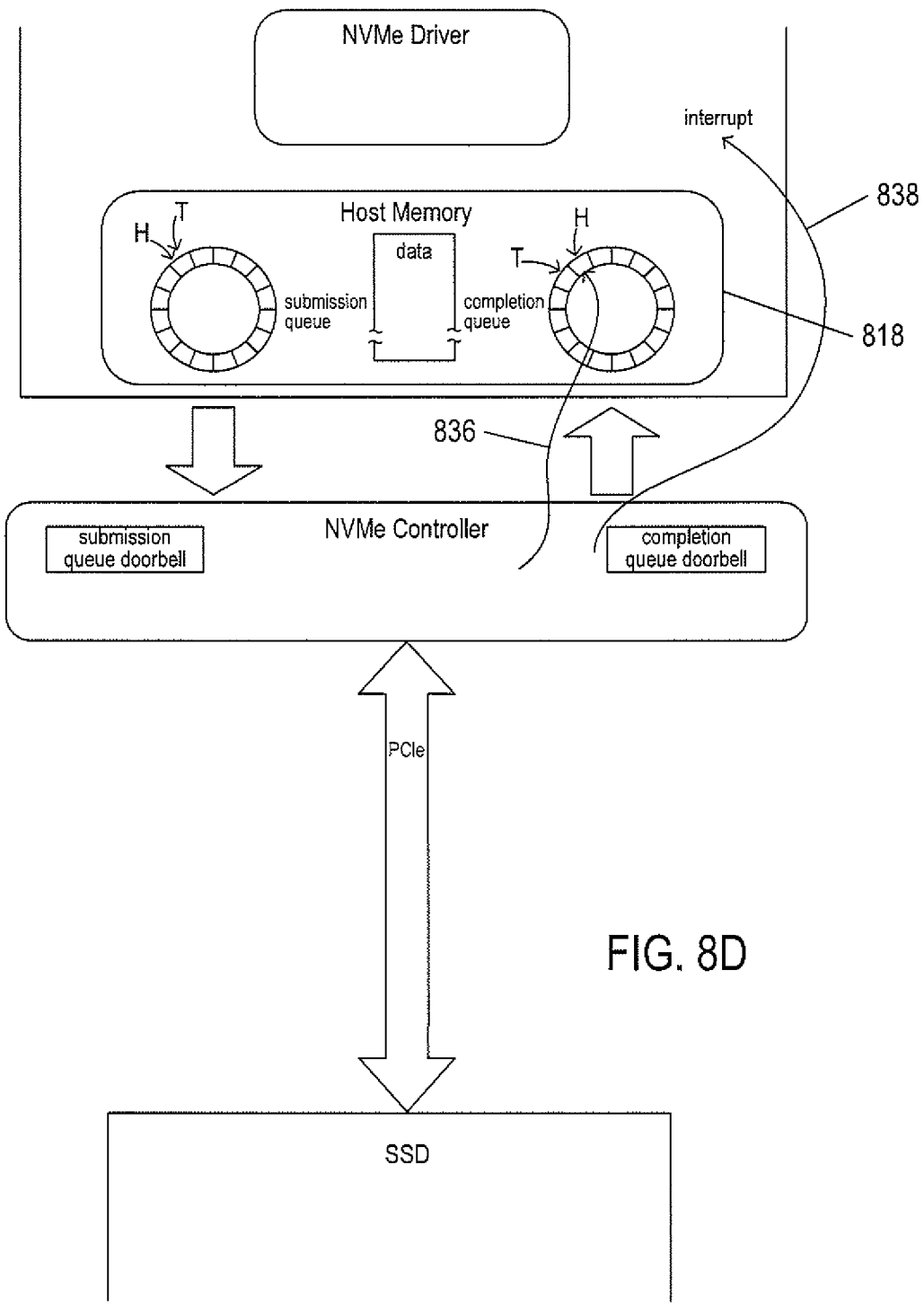
Figure 8E:
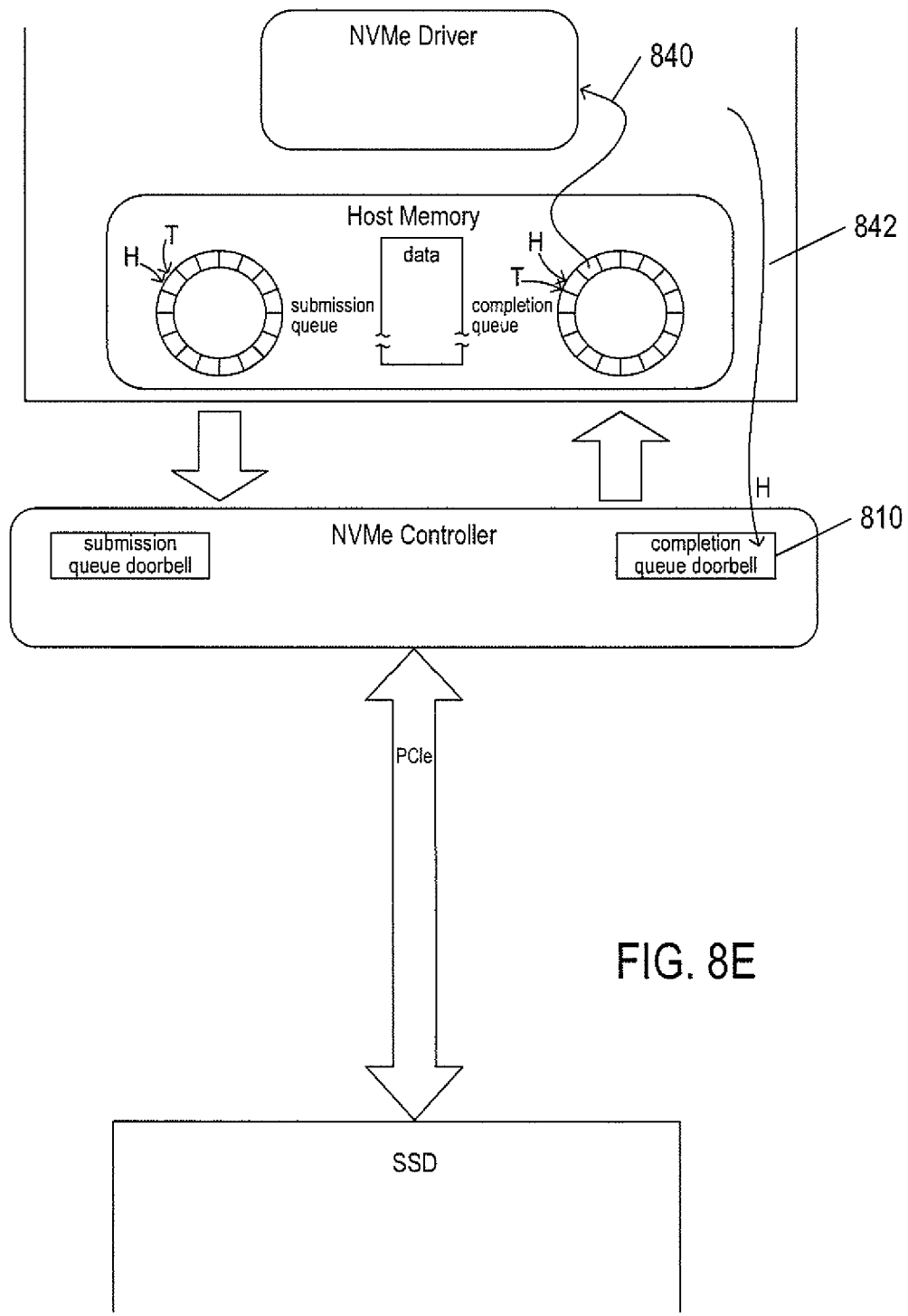

As shown in FIG. 8D, the response message returned by the SSD to the NVMe controller 804 is entered into the completion queue 818, as represented by curved arrow 836. The NVMe controller then initiates generation of an interrupt within the host computer to alert the NVMe driver to the presence of the completion message within the completion queue, as represented by curved arrow 838. As shown in FIG. 8E, the NVMe driver reads the response message from the completion queue, as represented by curved arrow 840, updating the head pointer for the completion queue as shown in FIG. 8E. The NVMe driver then writes the new value of the head pointer to the completion-queue doorbell 810, as represented by curved arrow 842, to complete the command/response transaction.

Figure 9:
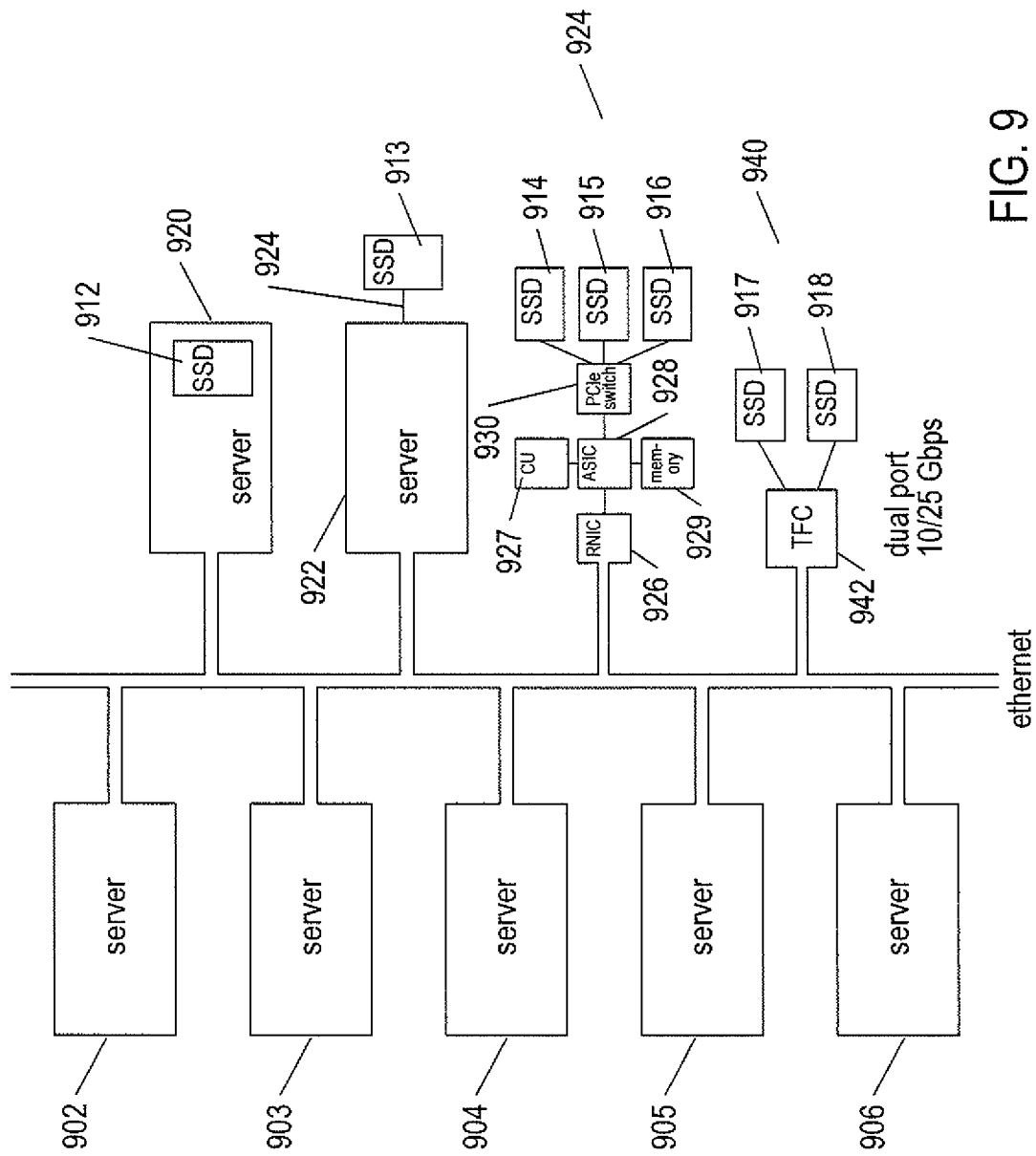
FIG. 9 illustrates a next step in the evolution of SSDs.

FIG. 9 illustrates a next step in the evolution of SSDs. As SSDs have begun to significantly penetrate the market for directly attached data-storage devices, and as the data-storage capacities of SSDs have continued to increase, the data-transfer rates and data-storage capacities of SSDs have begun to exceed the data-processing and computational bandwidths of individual host computers. As a result, designers, manufacturers, vendors, and uses of SSDs have begun to identify methods for allowing multiple different host computers to access a single SSD. In FIG. 9, multiple server computers 902-906 are interconnected by a local area network 910 to remote SSDs 912-918. In a first approach to providing remote access to the SSD through the network 910, SSD 912 is incorporated within a server computer 920 as an internal storage module. In a second approach, SSD 913 is interconnected with a server computer 922 via a PCIe interconnection or another type of interconnection 924. These two approaches are clearly suboptimal. Much of the computational bandwidth of the server computers 920 and 922 is wasted, with the server computers essentially acting as expensive controllers and bridges between the SSD and servers 902-906. A third, hypothetical approach 924 involves assembling a number of components 926-929 together to act as a bridge and controller for a number of SSDs 914-916. These components include a processor 927, an application-specific integrated circuit ("ASIC") 928, a memory device 929, a PCIe switch 930, and a remote direct memory access ("RDMA") network interface controller ("RNIC") 926. This, of course, involves design and implementation of the ASIC and programming of the processor 927.

The current document is directed to a fourth approach 940 in which a single target fabric controller 942 acts as a bridge and controller for one or two SSDs 917-918. The TFC may be implemented as a field-programmable gate array ("FPGA") or as an ASIC. The target fabric controller ("TFC") 942 is a mass-produced, reliable, and relatively low-cost bridge/controller in comparison to the far more expressive, less reliable, and difficult-to-implement ad hoc solution 924. The TEC can be packaged internally with an SSD to provide a compact and robust NVMe-over-Fabrics ("NVMe-oF") storage device.

Figure 10A:
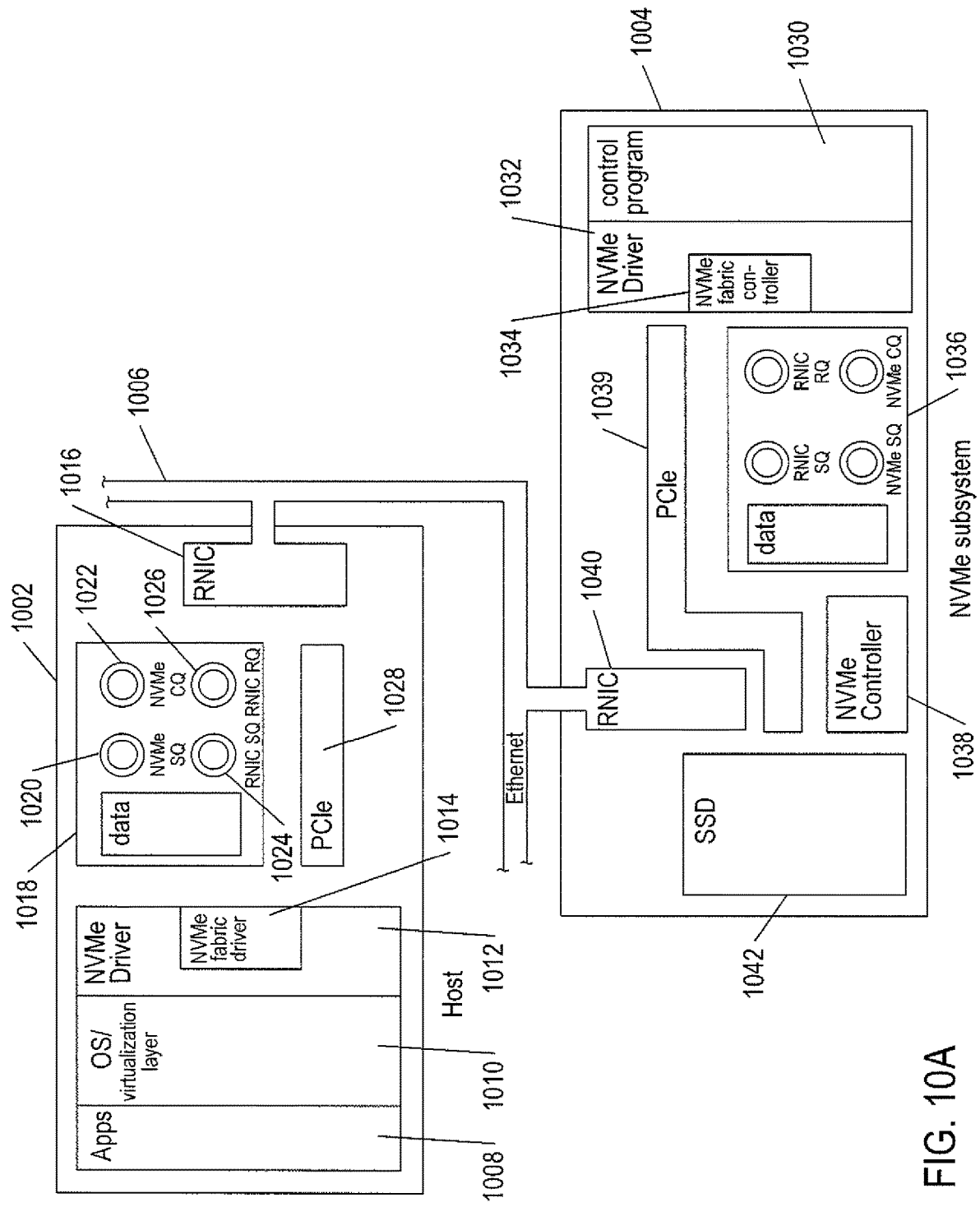
FIGS. 10A-G illustrate operation of a server computer and target NVMe-oF device connected by a fabric.

FIGS. 10A-G illustrate operation of a server computer and target NVMe-oF device connected by a fabric. FIGS. 10A-G all use the same illustration conventions, next described with reference to FIG. 10A. In FIG. 10A, a host computer 1002 and the target NVMe-oF storage device 1004 are shown interconnected by an Ethernet fabric 1006. The Ethernet fabric may be either a single local Ethernet or multiple local Ethernets interconnected by switches. The host computer 1002 includes an application layer 1008, an operating system or operating system and virtualization layer 1010, and an NVMe driver 1012, part of or associated with the operating system or operating system and virtualization layer, that includes an NVMe fabric driver 1014. The NVMe fabric driver communicates with an RDMA-enabled network interface controller ("RNIC") 1016 via data buffers and data structures in host memory 1018. The data structures include an NVMe submission queue 1020, an NVMe completion queue 1022, an RNIC send queue 1024, and an RNIC receive queue 1026. The NVMe fabric driver is interconnected through an internal PCIe 1028 with the RNIC 1016. The target NVMe-oF storage device 1004 includes a control program 1030, an NVMe driver 1032 that includes an NVMe fabric controller 1034, data buffers and data structures in the target memory 1036, an NVMe controller 1038, an RNIC 1040, and the SSD 1042.

Figure 10B:
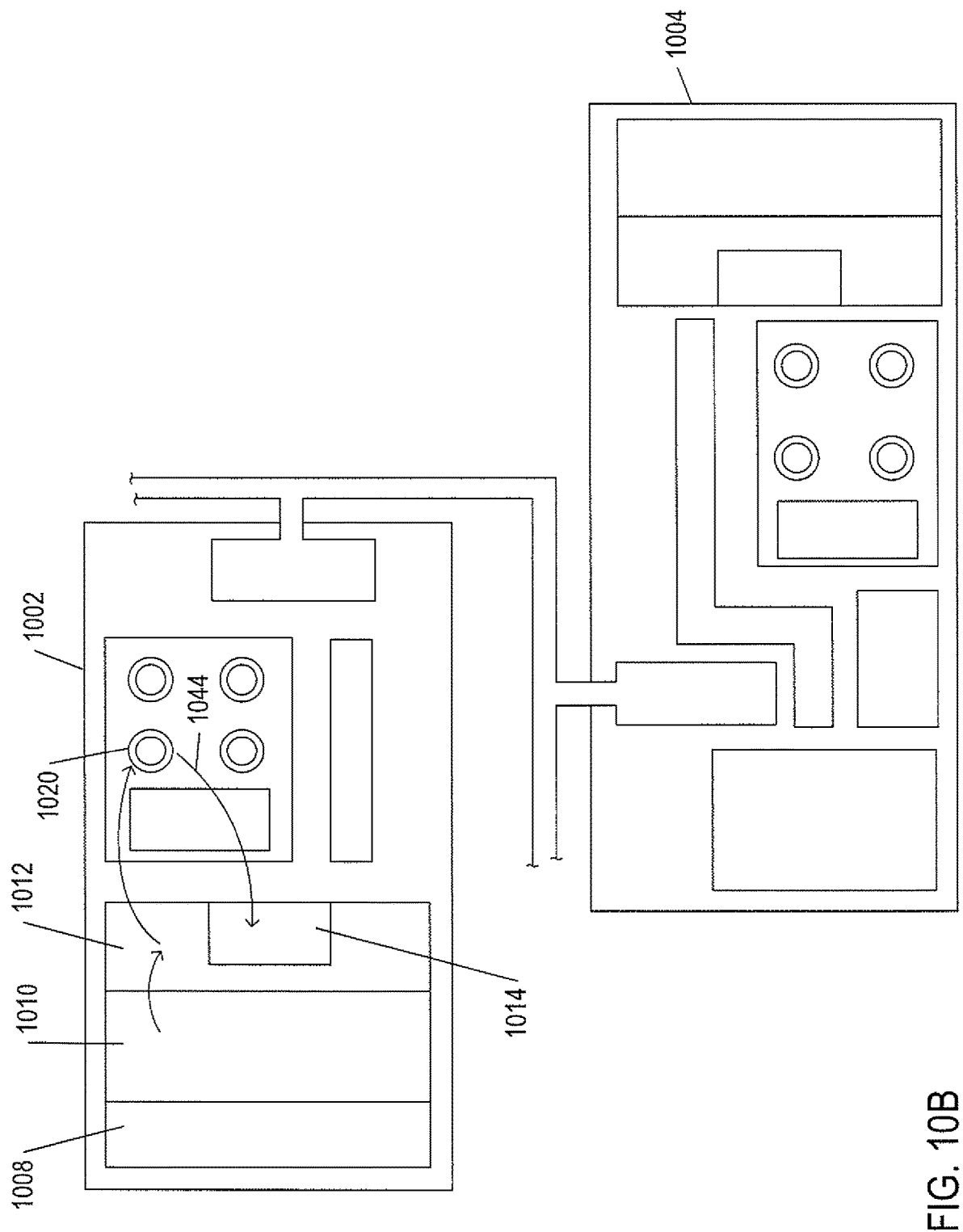
Figure 10C:
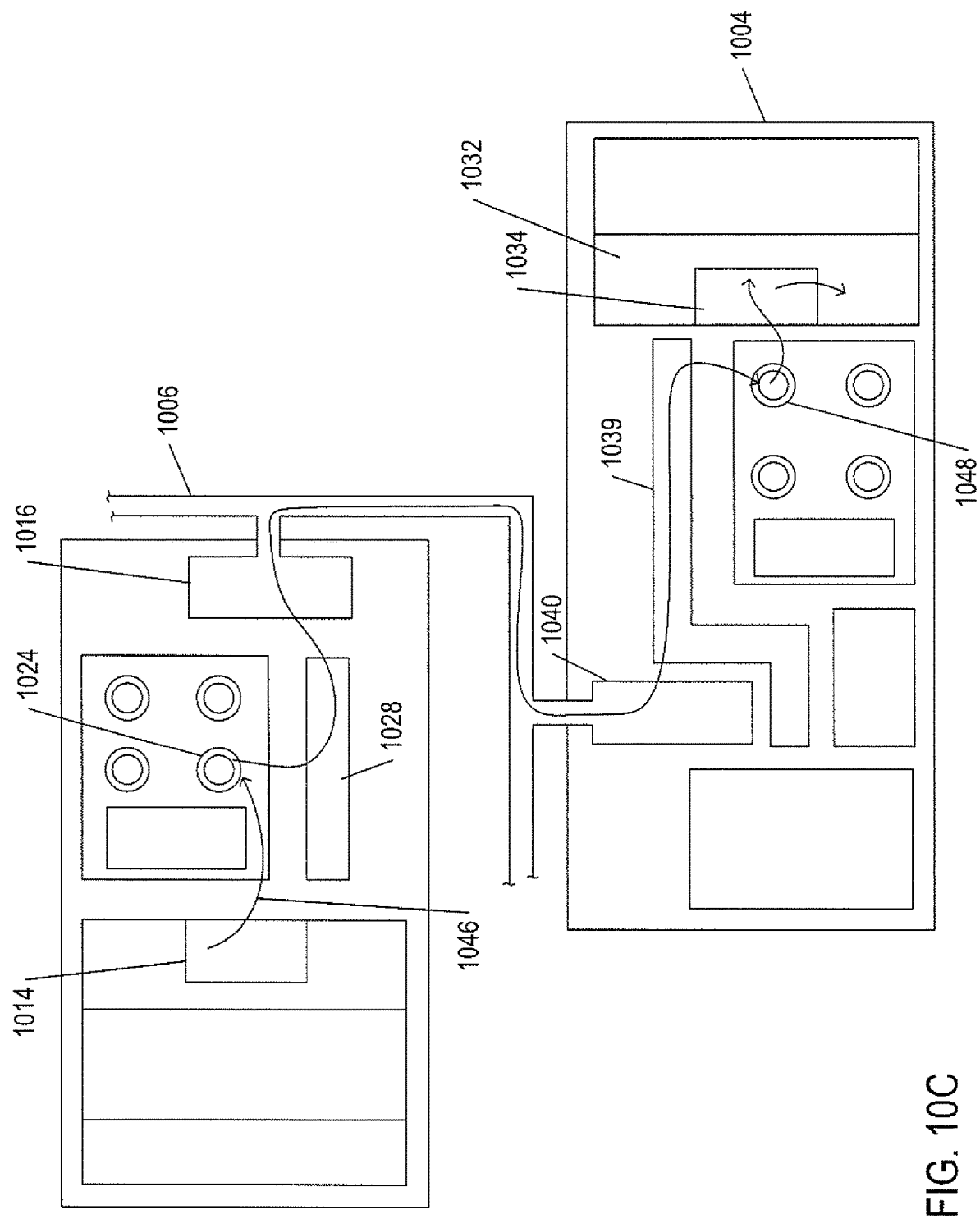

FIGS. 10B-G illustrate flow of commands and data between the server computer 1002 and the target NVMe-oF data-storage device 1004. As shown in FIG. 10B, an SSD operation is initiated within the operating system or operating system-and-virtualization layer 1010 of the computer system 1002. The initiation of the SSD command may be, in turn, initiated by a system routine called by an application program within the application layer 1008. The operating system inputs the command to the NVMe driver 1012 which, in turn, queues the command to the NVMe submission queue 1020. Now, however, rather than alerting an NVMe controller, the NVMe driver alerts the NVMe fabric driver 1014 with respect to the presence of a new command on the submission queue, causing the NVMe driver to retrieve the command from the submission queue, as represented by curved arrow 1044. The NVMe fabric driver encapsulates the NVMe command within a fabric-protocol message, such as an iWarp or RDMA-over-Converged-Ethernet ("RoCE") message. As shown in FIG. 10C, the NVMe fabric driver 1014 then queues the encapsulated command to the RNIC send queue 1024, as represented by curved arrow 1046. Queuing of the command alerts the RNIC 1016 to retrieve the command from the RNIC send queue 1024 via the PCIe 1028. The encapsulated command is then transmitted by the RNIC through the Ethernet fabric 1006 to the RNIC 1040 in the NVMe-oF target device 1004. The RNICs and fabric protocols carry out direct retrieval from, and transfer to, host memory, avoiding unnecessary central-processor involvement in the low-level data transfers. On the target NVMe-oF storage device 1004, the RNIC 1040 transfers the receives the encapsulated NVMe command through the PCIe 1039 to the RNIC receive queue 1048. Queuing of the encapsulated NVMe command to the RNIC receive queue alerts the NVMe fabric controller 1034 to retrieve the encapsulated command, de-encapsulate the command, and forward the NVMe command to the NVMe driver 1032.

Figure 10D:
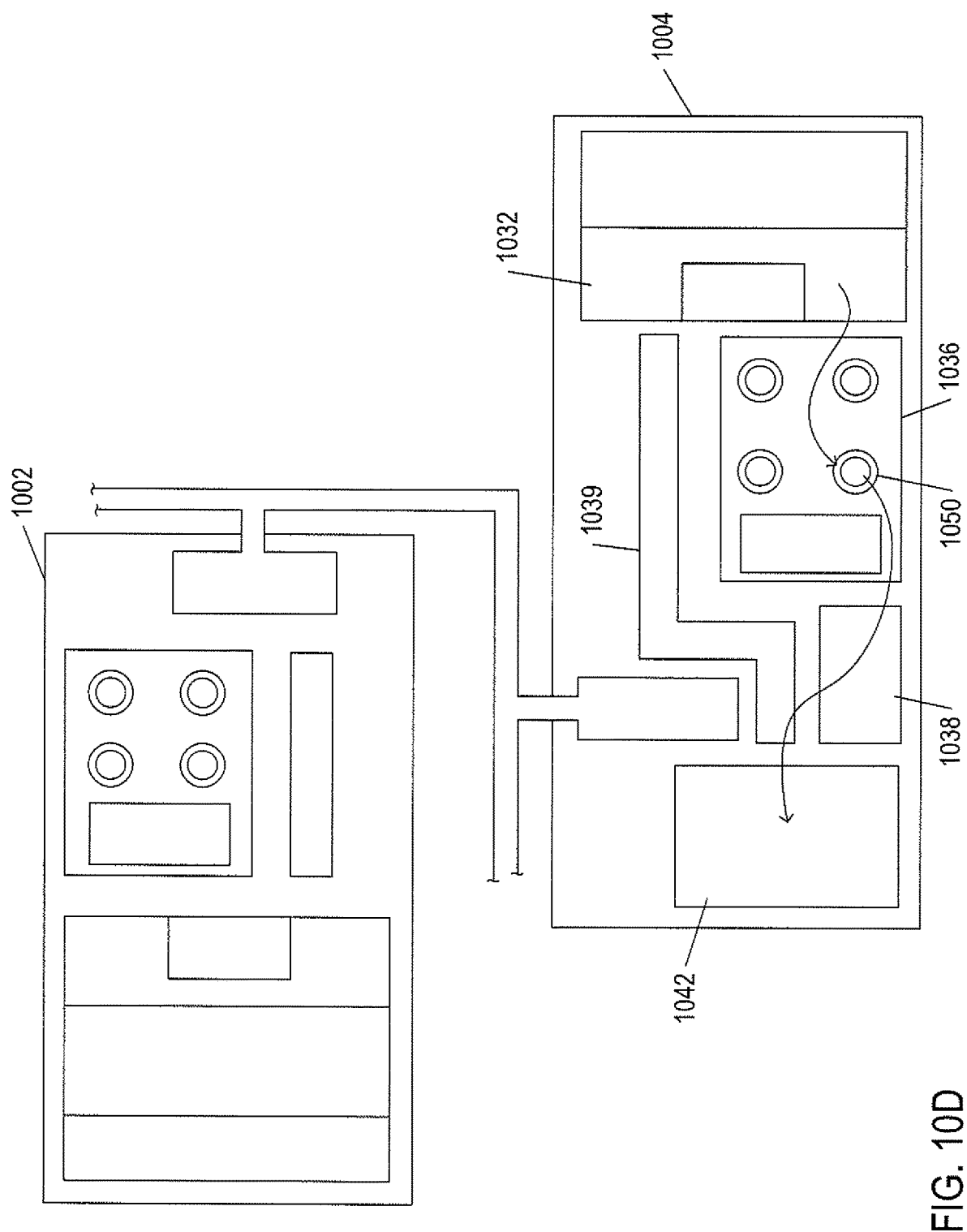
Figure 10E:
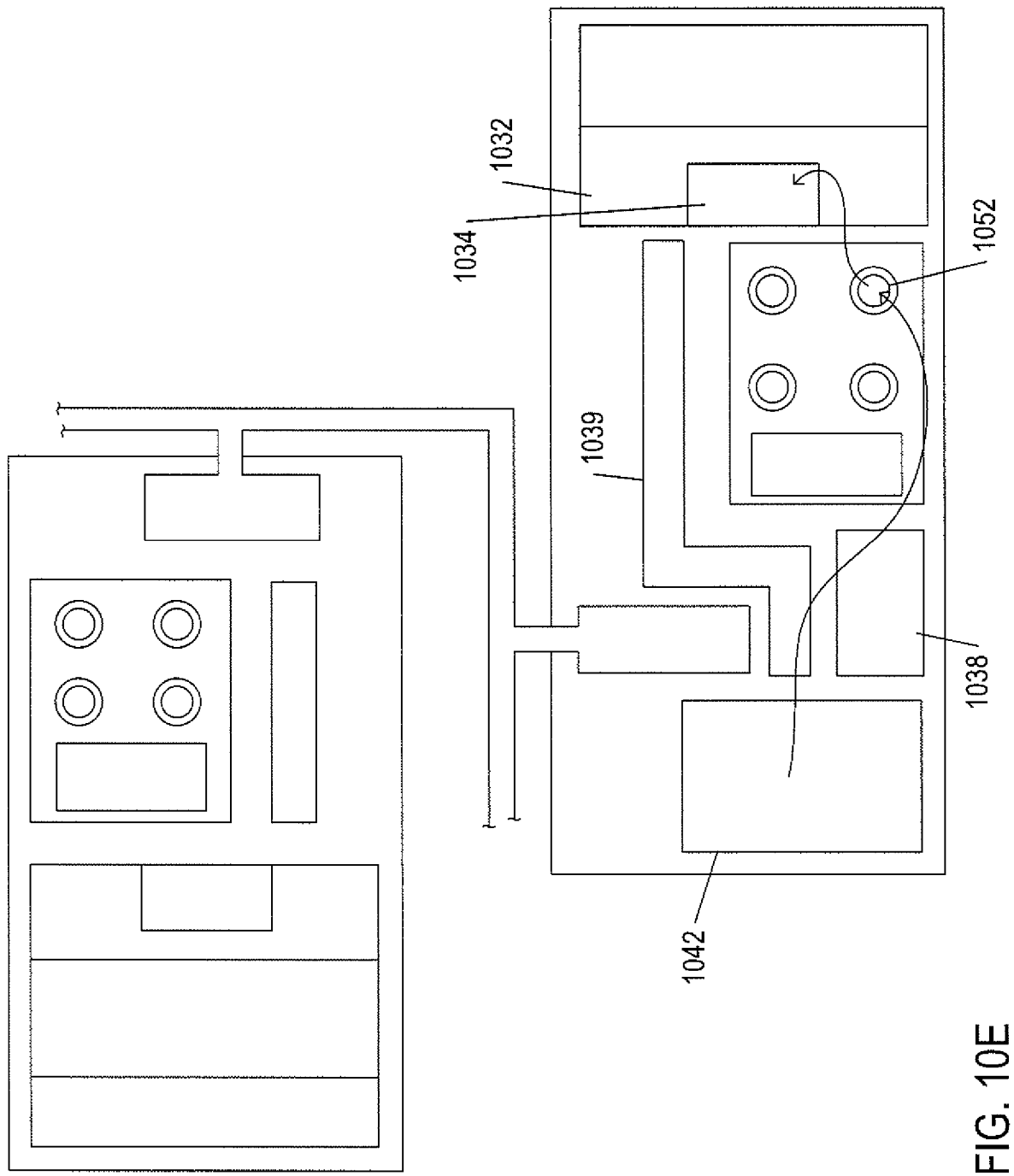
Figure 10F:
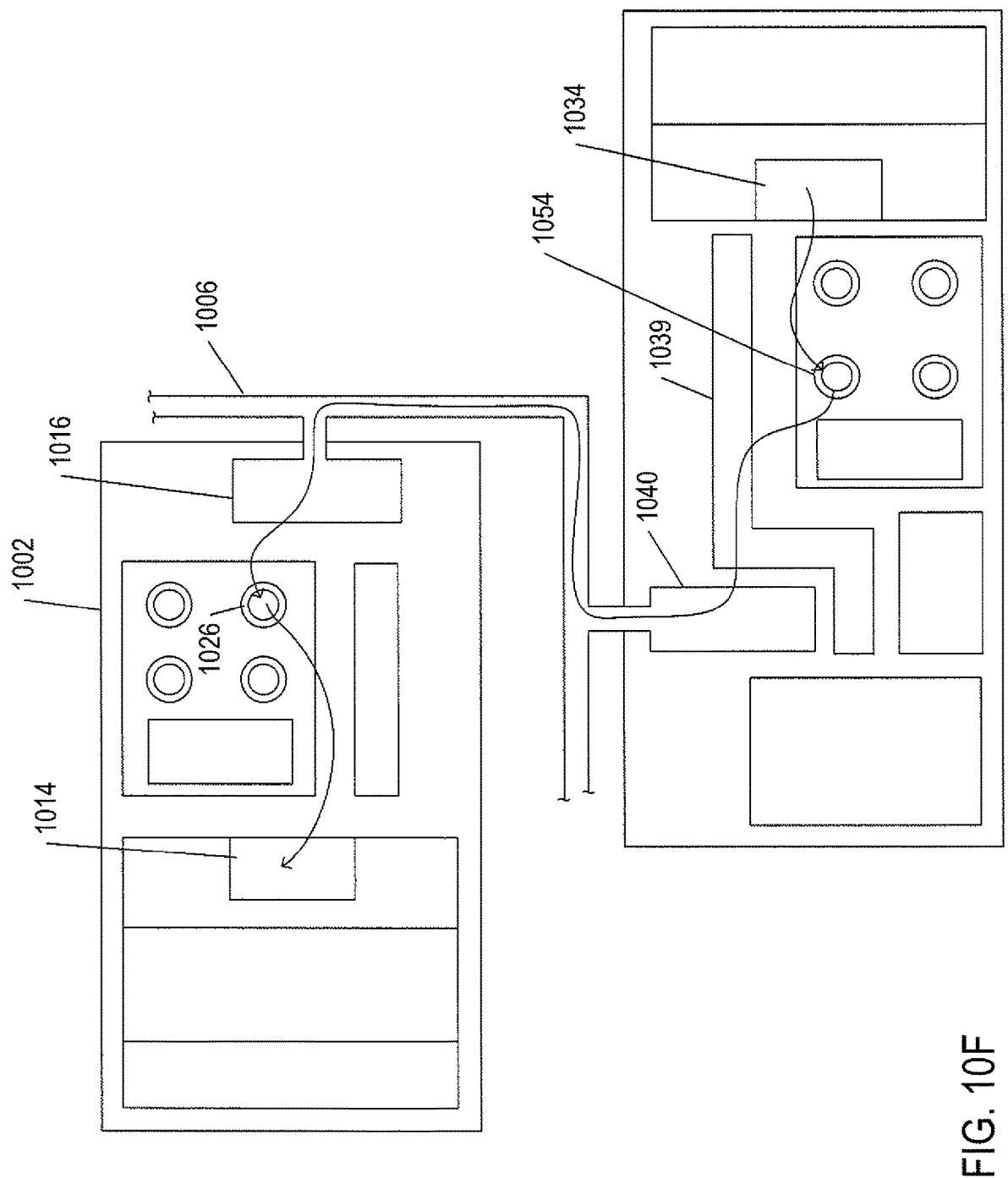
Figure 10G:
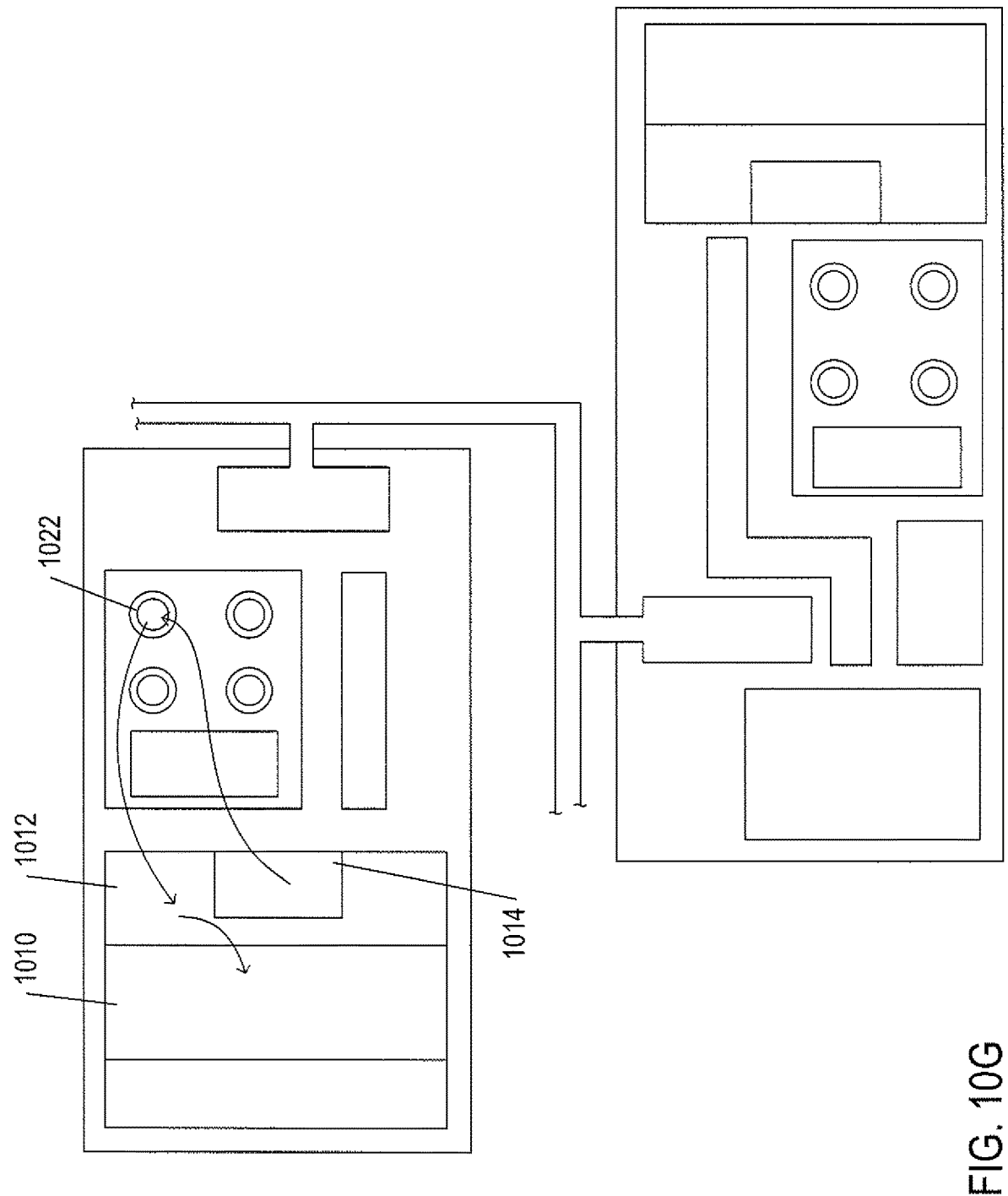

As shown in FIG. 10D, the NVMe driver 1032 on the target NVMe-oF storage device 1004 queues the NVMe command to the submission queue 1050 within target memory 1036. The NVMe driver additionally writes to a doorbell to alert the NVMe controller 1038 to dequeue the NVMe command from the submission queue and transfer the command, via the PCIe 1039 to the SSD 1042. As with the directly attached NVMe storage device discussed above with reference to FIGS. 8A-E, the NVMe fabric controllers and RNICs may also transfer data from memory buffers from the computer 1002 to the target NVMe-oF device 1004 or from the NVMe-oF target device 1004 to the computer 1002 in addition to transferring commands and command responses. As shown in FIG. 10E, once the SSD executes the command, a response message is returned from the SSD 1042 through the PCIe 1039 to the NVMe controller 1038 which queues the response message to the NVMe completion queue 1052. The NVMe controller 1038 alerts the NVMe driver 1032 via a doorbell mechanism, as a result of which the NVMe driver 1032 retrieves the response from the completion queue 1052 and passes the response to the NVMe fabric driver 1034. As shown in FIG. 10F, the NVMe fabric driver 1034 then queues the encapsulated response onto the RNIC send queue 1054 and alerts the RNIC 1040, which retrieves the encapsulated response from the RNIC send queue 1054 via the PCIe 1039 and transmits it over the Ethernet fabric 1006 to the RNIC 1016 within the computer system 1002. The RNIC transfers the encapsulated response to the RNIC receive queue 1026 and alerts the NVMe fabric driver 1014, which retrieves the encapsulated response from the RNIC receive queue 1026. Finally, as shown in FIG. 10G, the NVMe fabric driver 1014 places the NVMe response message on the NVMe completion queue 1022 and alerts the NVMe driver 1012 through an interrupt mechanism. The NVMe driver retrieves the response message, processes the response message and any data transferred in addition to the response message, and eventually returns some type of acknowledgment or completion event to the operating system or operating-system-and-virtualization layer 1010.

It is possible to short-circuit double-queuing of commands and responses in the computer system 1002 by more directly linking the NVMe fabric driver with the NVMe driver and eliminating the NVMe submission queue and NVMe completion queue. However, the generalized target device, despite possibilities for small incremental improvements and simplifications, would appear to be an overly complex and costly communications bridge and controller for interconnecting one or more SSDs with an Ethernet fabric.

Figure 11:
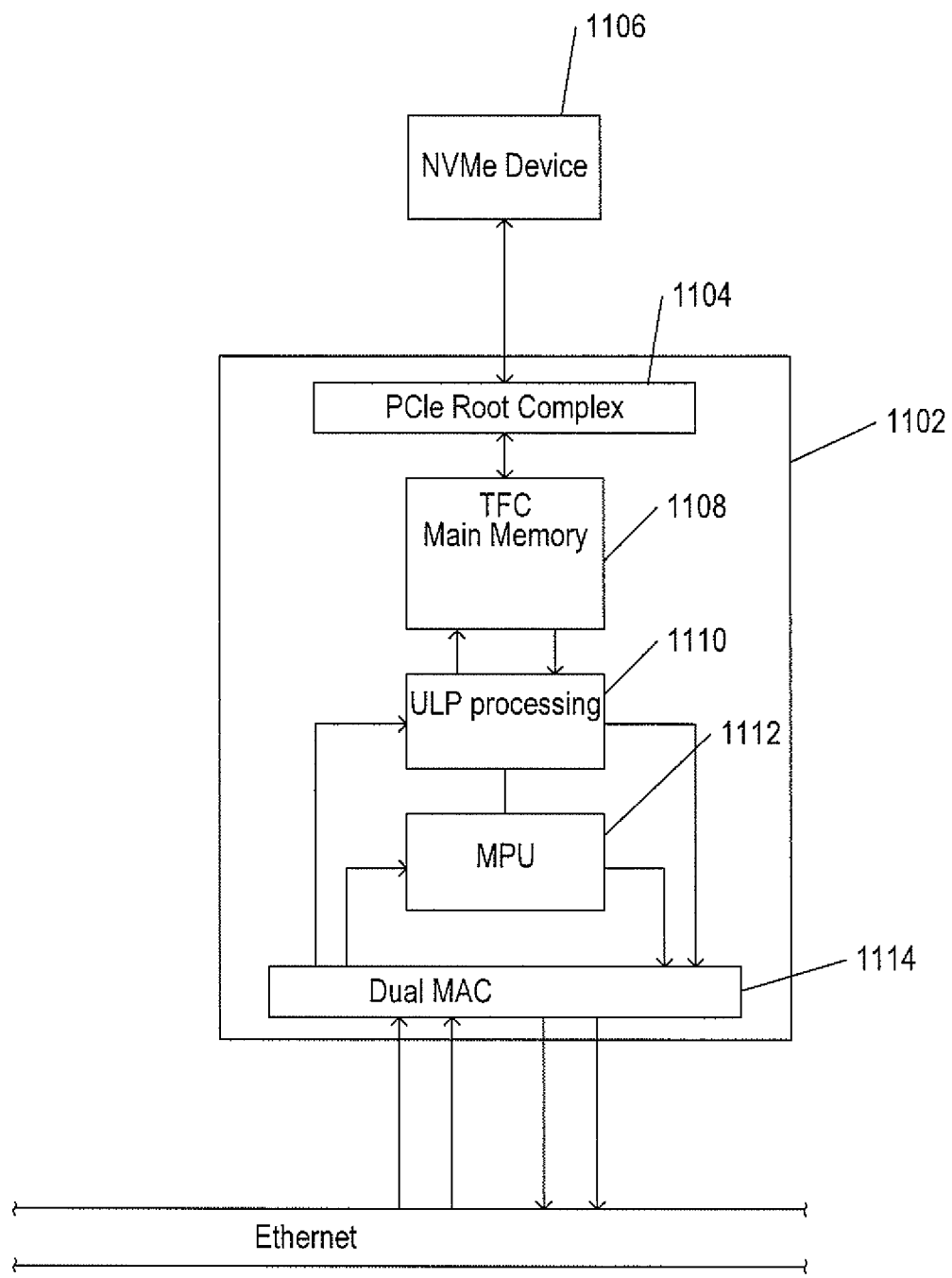
FIG. 11 provides a high-level block diagram of the target fabric controller ("TFC") to which the current document is directed.

The current document is directed to a much simpler, less costly, more power efficient, and more robust hardware device for interconnecting an NVMe data-storage device with an Ethernet fabric. FIG. 11 provides a high-level block diagram of the target fabric controller ("TFC") to which the current document is directed. The TFC 1102 is a single integrated circuit. The TFC includes a PCIe root complex 1104 that interconnects one or more NVMe data-storage devices 1106 to the TFC. In one implementation, the PCIe root complex is implemented to allow attachment of only a single NVMe device to the TFC, allowing for a much simpler PCIe root-complex implementation. In alternative implementations, the PCIe root complex may support attachment of the TFC to two or more NVMe devices. The TFC includes a memory block 1108, referred to as "TFC main memory," that supports data buffers and data structures, including circular queues, that provide a communications channel between the NVMe data-storage device or devices 1106 and other components and modules of the TFC. The TFC includes an upper-layer-protocol processor ("ULP processor") 1110 that is implemented primarily as hardware state machines for fast and efficient processing of encapsulated NVMe commands, using several small microprocessors for exception handling. The TFC includes a management processing unit ("MPU") 1112 that includes general management functionality for local management of the TFC modules, the attached NVMe device, and the network. The MPU, for example, is responsible for the creation and tear-down of the connections through which the TFC communicates with the NVMe data-storage device 1006. The TFC includes a dual media-access-controller ("MAC") block that implements two standard 10/25 Gbps Ethernet MAC functionality representing a lower portion of the data link layer within an Ethernet controller. The MAC hardware controls transmission and reception of Ethernet frames on the physical medium, carries out retransmission and back-off functions, computes, appends, and checks frame-check sequences, guarantees reception of well-formed frames, and carries out other such low-level operations concerned with receiving Ethernet frames from, and transmitting Ethernet frames over, the Ethernet fabric.

Figure 12:
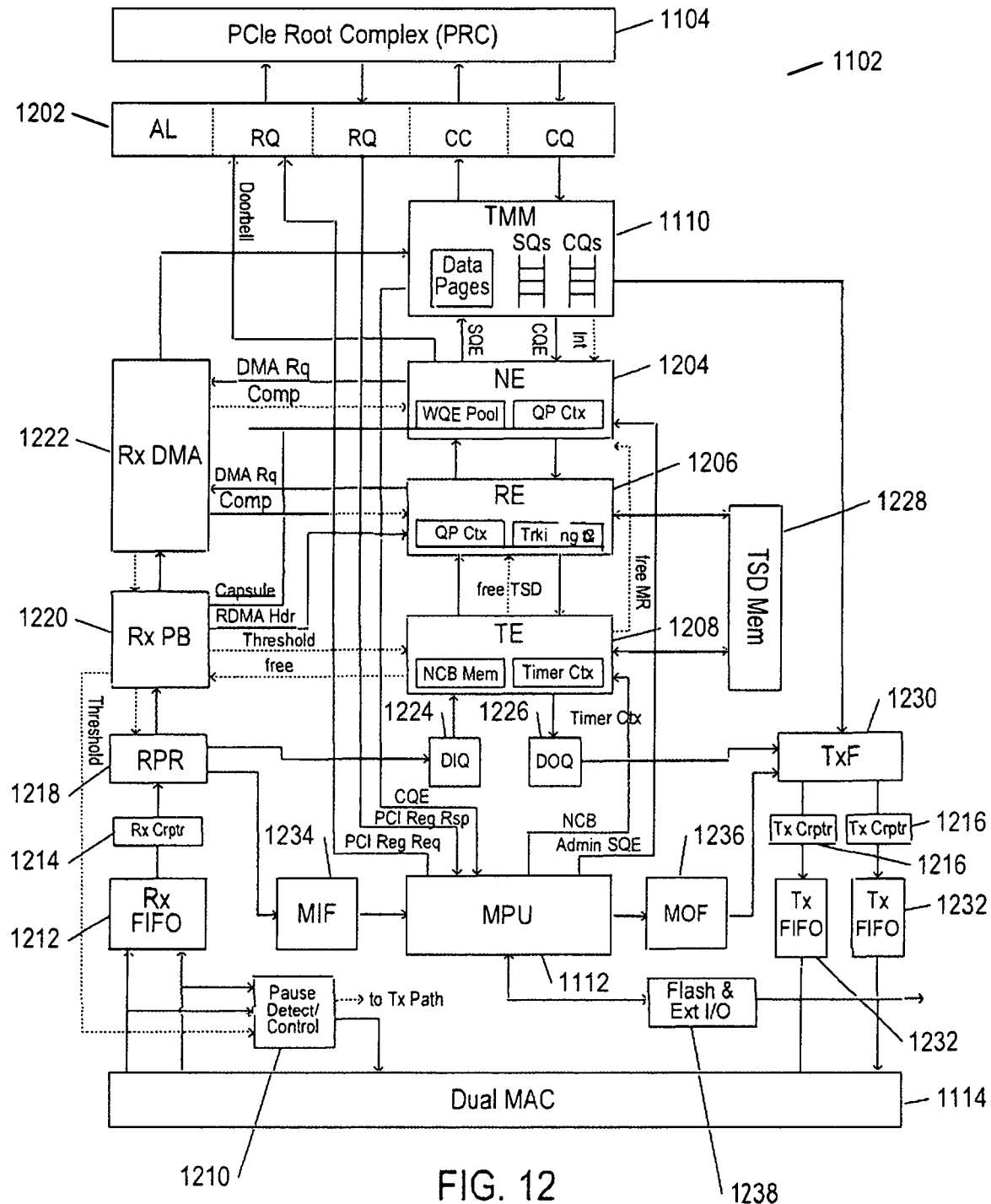
FIG. 12 provides a more detailed diagram of the TFC.

FIG. 12 provides a more detailed diagram of the TFC. As discussed above with reference to FIG. 11, the TFC 1102 shown in FIG. 12 includes the PCIe root complex ("PRC") 1104 that connects the TFC with one or more NVMe devices and the dual-MAC 1114 data-link-layer hardware that connects the TFC with an Ethernet fabric. The remaining modules within the TFC are concerned with receiving and transmitting RoCE and/or iWarp-protocol messages through the dual-MAC hardware to the Ethernet fabric, transmitting and receiving PCIe packets through the PCIe root complex to and from the attached NVMe devices, and bridging encapsulated NVMe commands contained in iWarp and RoCE messages to NVMe commands and responses exchanged through the PCIe connection with the attached NVMe data-storage devices. An abstraction layer ("AL") 1202 provides an interface between internal TFC modules and the PRC 1104. The abstraction layer provides a common interface to different PRC implementations. As discussed above, the TFC main memory ("TMM") 1110 provides a memory-based communications channel between the TFC and the attached NVMe data-storage device or devices, including NVMe submission queues and completion queues, data buffers, as well as memory-mapped doorbell registers and interrupt vectors. The NVMe engine ("NE") 1204, RDMA engine ("RE") 1206, and transport engine ("TE") 1208 are primary logic modules of the ULP processor (1110 in FIG. 11). The NE processes NVMe submission-queue entries and RDMA send segments, processes NVMe completion-queue entries, and maintains two versions of submission queues used to support split commands. Thus, the NE carries out tasks logically associated with an NVMe controller and NVMe driver. The RE is concerned with transferring the contents of RoCE and iWarp protocol messages between the TE, NE, and TMM. The RE is also involved in RDMA transfer of data from the TE to the TMM and from the TMM to the TE. The TE 1208 carries out reception and transmission of TCP and RoCE protocol messages. Thus, the TE and RE together provide functionality logically associated with an RNIC. As discussed above, the MPU 1112 is responsible for network and NVMe-device management function and services as well as TCP, RoCE, and NVMe connection management. The pause detect/control module 1210 detects when a pause frame is received from the Ethernet fabric and signals transmission-path modules to cease transmitting requests through a paused port. The pause detect/control module may also initiate a pause when internal buffers approach data-storage saturation. The Rx FIFO module 1212 provides input-frame buffering for the two Ethernet MAC instantiations, or ports as well as a flow-controlled output port. The Rx corrupter 1214 and Tx corrupter 1216 are used during TFC development to corrupt frames in order to test error detection and error recovery logic. The Rx parser/router ("RPR") 1218 parses incoming Ethernet frames in order to route the frames to appropriate frame-processing modules. The Rx packet buffer ("Rx PB") 1220 is a temporary frame store to facilitate processing of the frames by the ULP processor. The Rx DMA module 1222 is responsible for transferring data from frames stored in the Rx PB to data buffers within the TMM. The descriptor input queue ("DIQ") 1224 and the descriptor output queue ("DOQ") 1226 buffer TCP and RoCE descriptors. The TSD-memory module 1228 stores TCP segment descriptors produced by the RE and consumed by the TE. The Tx framer ("TxF") 1230 constructs Ethernet frames for transmission to the network. The Tx FIFO modules 1232 provide buffering for bridging the internal-TFC-module data rate with the data rates associated with the dual MACs. The MPU Input FIFO ("MIF") 1234 and the MPU Output FIFO ("MOF") 1236 provide temporary buffering of frames processed by the MPU. The flash and ext I/O module 1238 contains an SPI flash controller and other I/O controllers.

Figure 13A:
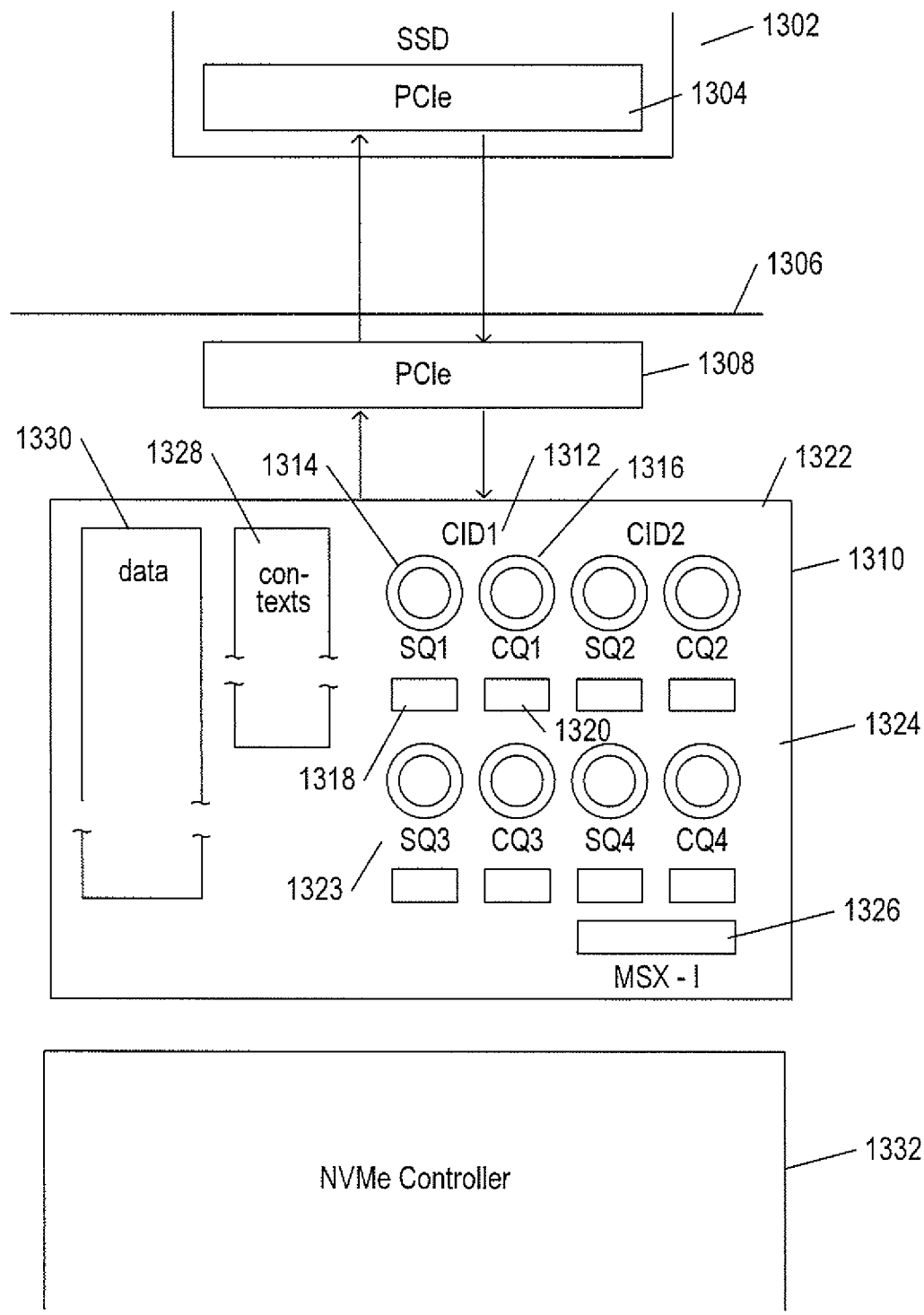
FIGS. 13A-D illustrate a conventional sequence of events that occur when a command is issued by an NVMe controller to an SSD via a PCIe.
Figure 13B:
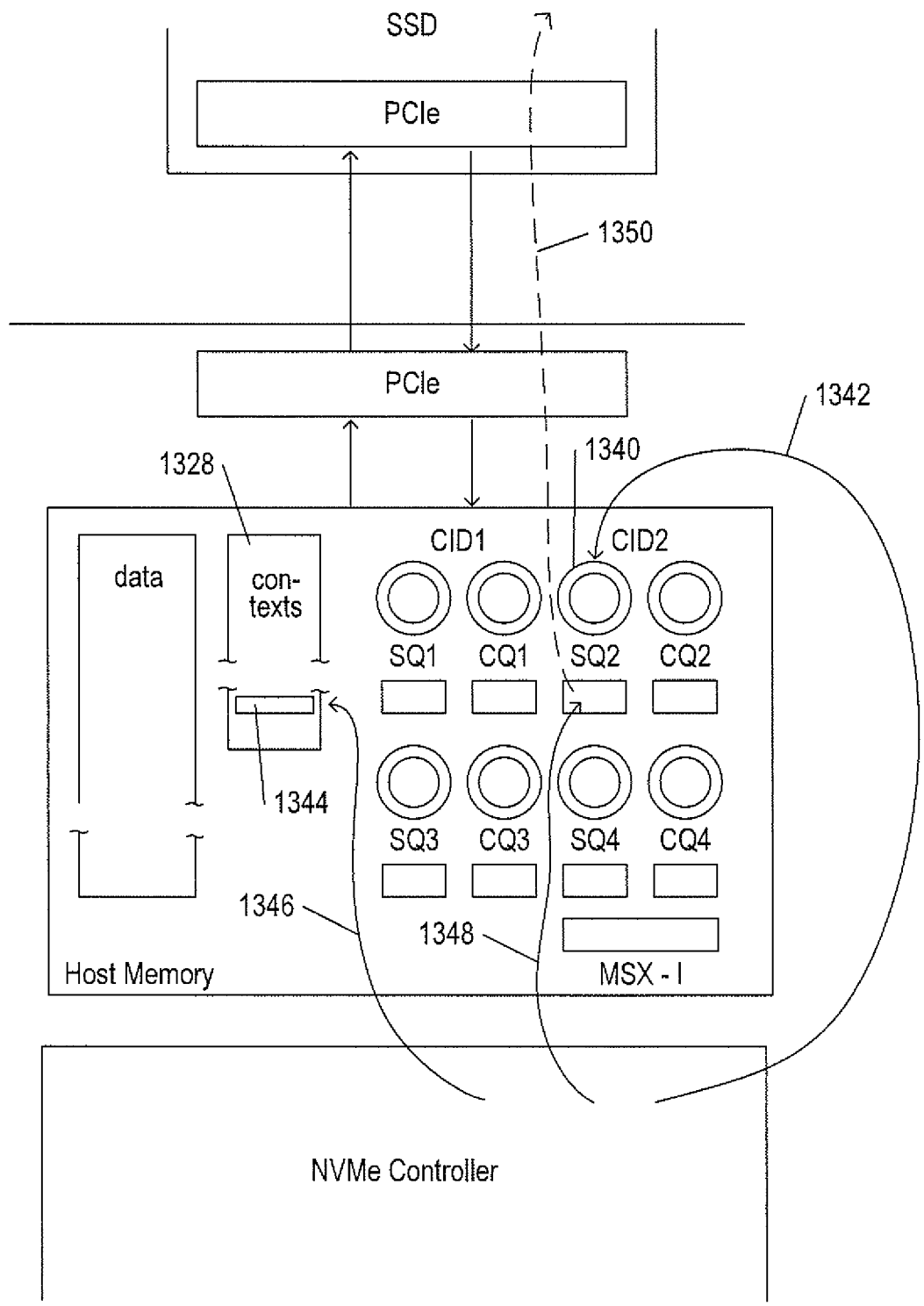

FIGS. 13A-D illustrate a conventional sequence of events that occur when a command is issued by an NVMe controller to an SSD via a PCIe. FIGS. 13A-D all use the same illustration conventions, next discussed with reference to FIG. 13A. In FIG. 13A, the SSD is represented by a partial rectangle 1302 and is shown to include a PCIe controller 1304. The host computer is represented as the portion of FIG. 13A below horizontal line 1306. The host computer also includes a PCIe 1308, in the current case a PCIe root complex. Host memory 1310 includes a number of PCIe submission queues and completion queues. The queues are paired, and each pair together combines a connection with a connection ID. Each queue is also associated with a doorbell register. Thus, in FIG. 13A, the connection with connection ID1 1312 is associated with submission queue 1314 and completion queue 1316, each associated with a doorbell register 1318 and 1320. FIG. 13A shows three additional submission-queue/completion-queue pairs 1322, 1323, and 1324. Host memory also includes an MSX-I interrupt vector storage location 1326. When a command is issued by the NVMe controller to the PCIe by placing a submission-queue entry ("SQE") onto the submission queue, a context for the command is placed in an area of memory 1328 that holds contexts for in-flight commands. Context includes sufficient information to associate a response to the command based on a command identifier. The data area 1330 stores data transferred between the host computer and the SSD. The NVMe controller 1332 is shown as a lower partial rectangle in FIG. 13A. In FIG. 13B, the NVMe controller issues a command to the SSD. First, an SQE is queued to the submission queue 1340 with the appropriate connection, as represented by curved arrow 1342. Then, a context is placed into the context memory area 1328 and 1344, as represented by curved arrow 1346. Finally, as represented by curved arrow 1348, the new tail pointer for the submission queue is placed into the doorbell memory location 1350. This memory location is mapped to logic and transfers the tail pointer through the PCIe connection to the SSD, as represented by dashed arrow 1350.

Figure 13C:
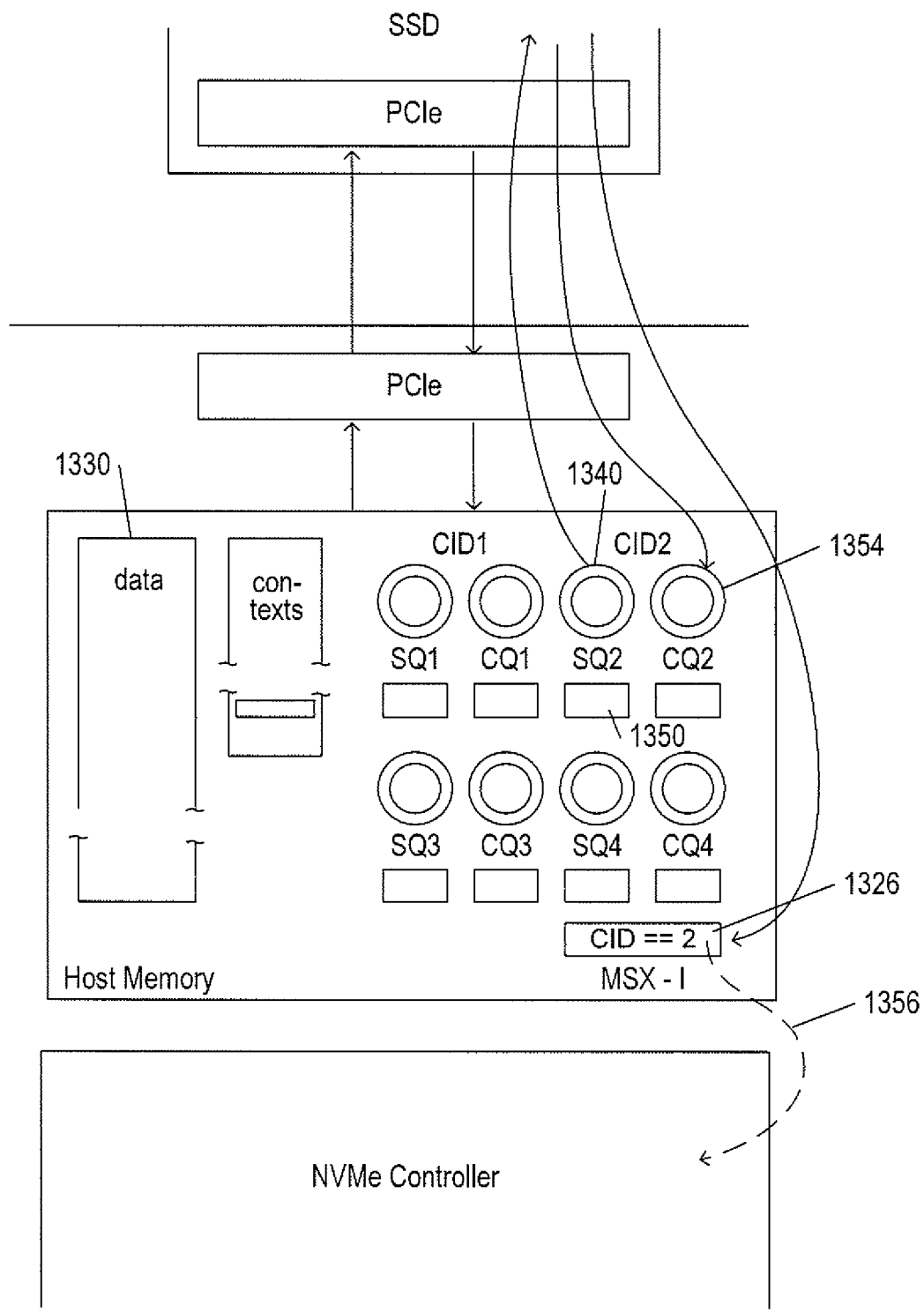

FIG. 13C illustrates subsequent operations during command transfer from the NVMe controller to the SSD. Alerted by the write to the doorbell memory location 1350, the SSD reads the next command, pointed to by the head pointer, from the submission queue 1340. The SSD carries out the command, such as a read command or a write command, which involves transfer of data between the data region 1330 of host memory and the SSD, and then places an entry in the completion queue 1354 for the connection with connection ID2. The SSD then writes the connection ID, 2, into the MSX-I interrupt-vector location 1326. The MSX-I memory location is mapped to control logic that detects writes to the memory location and generates an interrupt that interrupts the NVMe controller, as represented by dashed arrow 1356.

Figure 13D:
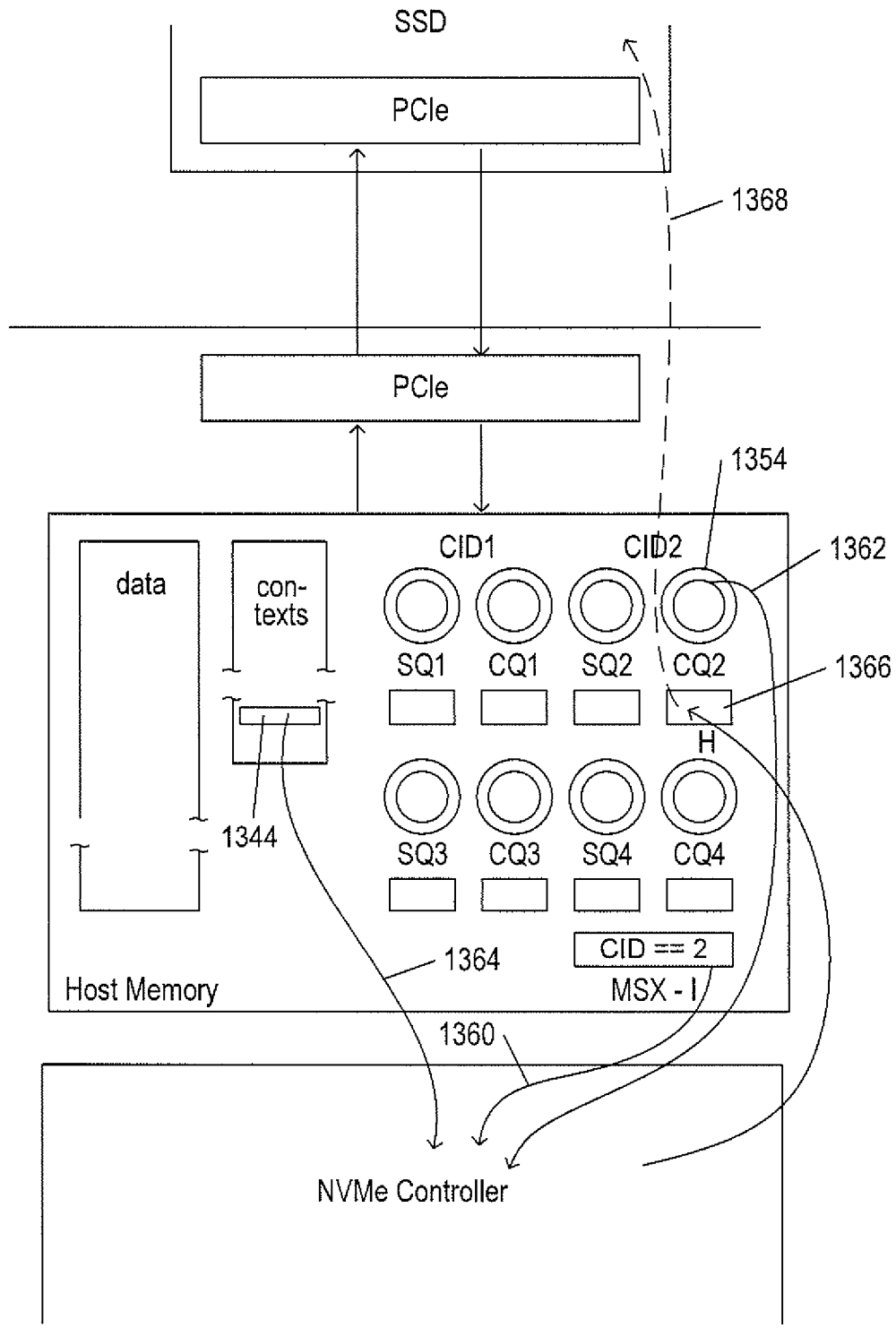

FIG. 13D illustrates subsequent operations involved in response reception by the NVMe controller. Writing the connection ID2 into the MSX-I register generates an interrupt to the NVMe controller, as represented by curved arrow 1360. The NVMe controller handles the interrupt by dequeuing the next CQE from the completion queue and processing the completion, as represented by curved arrow 1362. Completion processing involves identifying the context for the completed command 1344, using the command ID returned in the CQE as well as the connection ID2 and retrieving the contents of the context, as represented by curved arrow 1364. Finally, the NVMe controller writes the new head pointer to the doorbell location 1366 associated with completion queue 1354 which results in transfer of the new head pointer to the SSD, as represented by dashed curved arrow 1368.

Figure 14A:
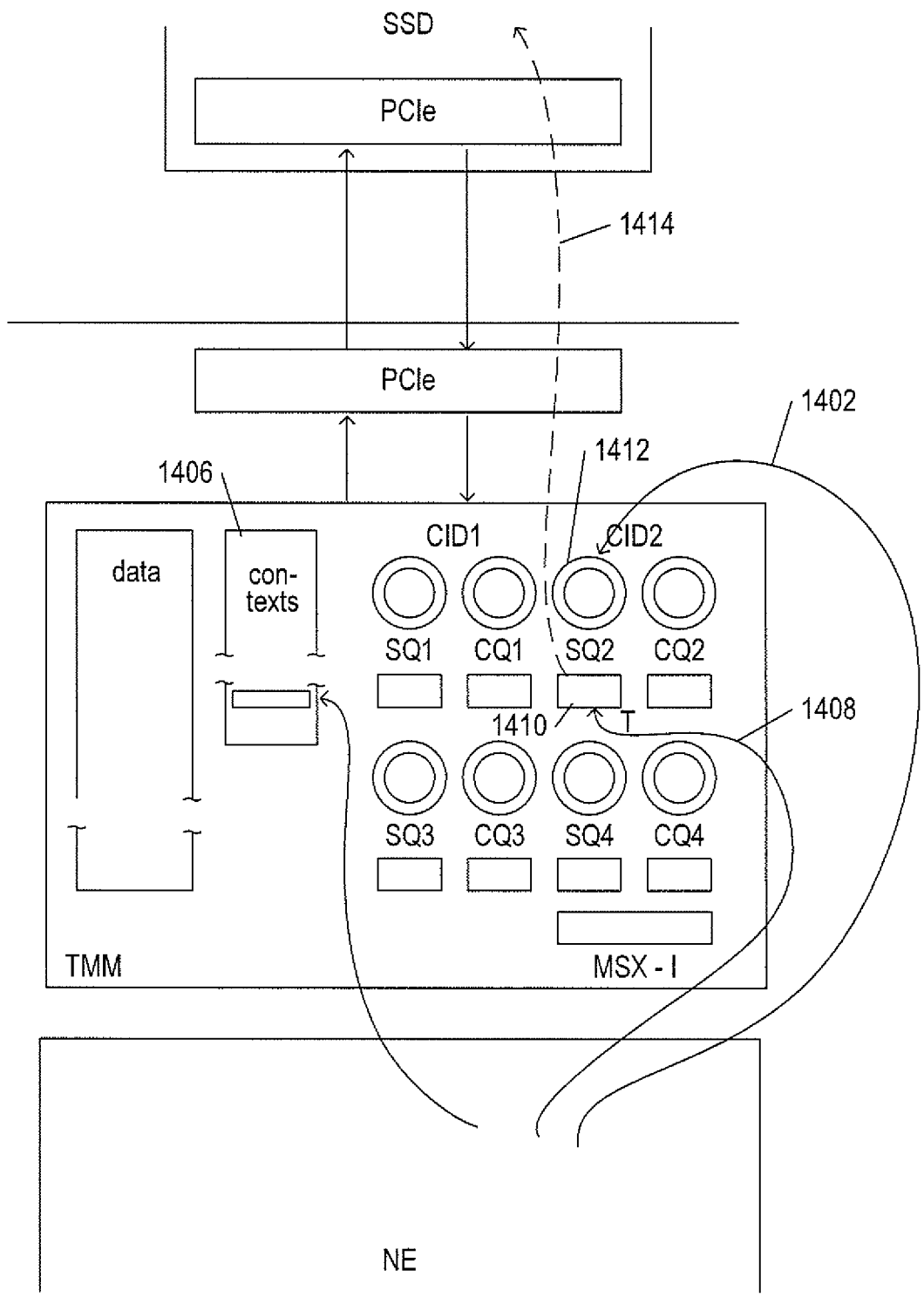
FIGS. 14A-C illustrate a more efficient, streamlined sequence of operations carried out by the TFC during command issuance by the TFC to an SSD.
Figure 14B:
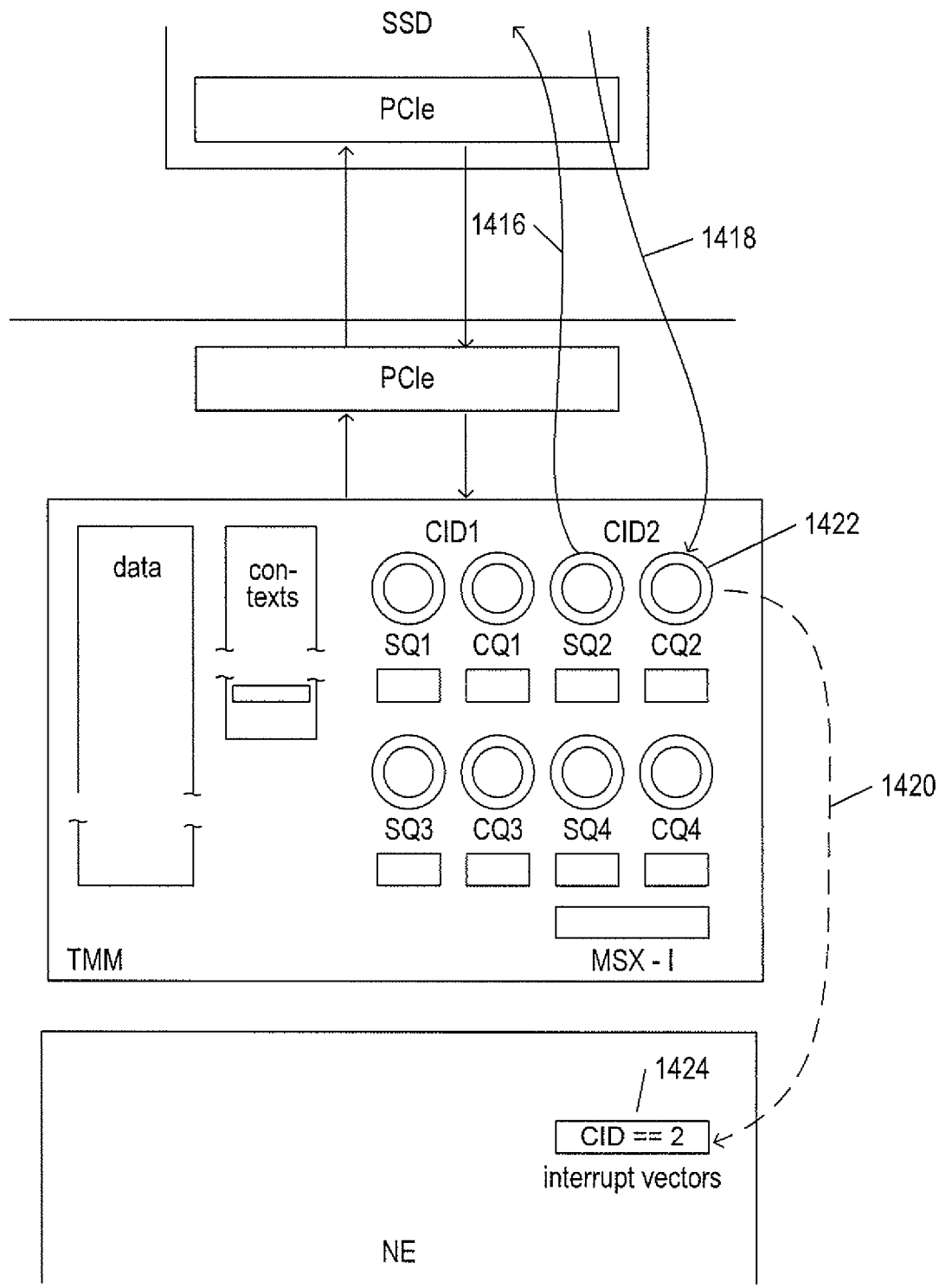
Figure 14C:
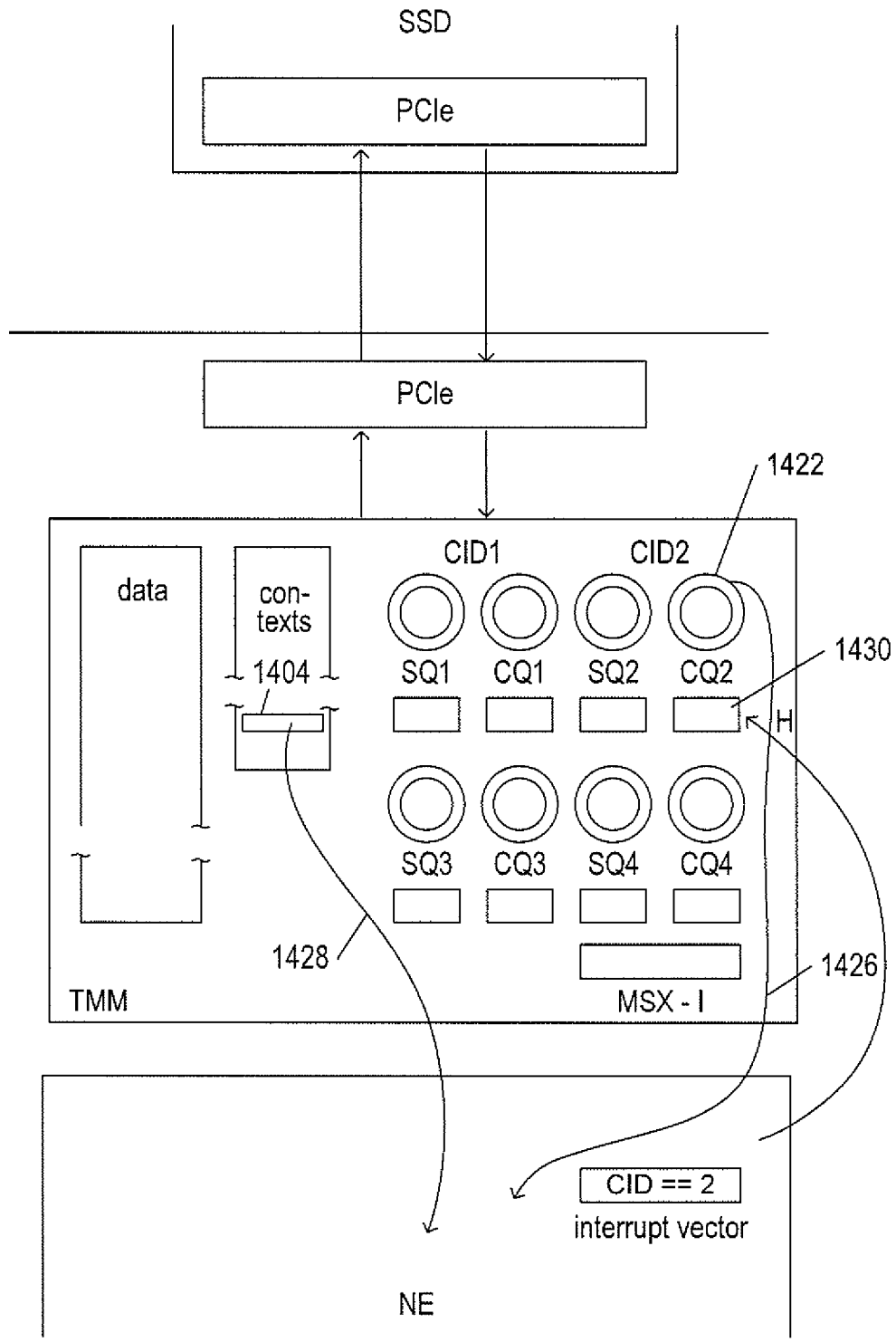

FIGS. 14A-C illustrate a more efficient, streamlined sequence of operations carried out by the TFC during command issuance by the TFC to an SSD. This more efficient, streamlined command processing involves mapping completion queue memory to logic that generates an interrupt vector within the NE module of the TFC. This avoid separate operations to write CQE entries to the completion queue and to write the connection ID to the MSX-I memory location. As shown in FIG. 14A, issuance of a command to the SSD by the NE involves entering an SQE to a submission queue, as represented by curved arrow 1402, writing a context 1404 for the command to the contexts memory area 1406, and writing the new tail pointer for the submission queue, as represented by curved arrow 1408, to the doorbell memory location 1410 associated with the submission queue 1412 to which the command is queued. Writing of the tail pointer to the doorbell memory location 1410 results in waking-up logic within the SSD to read the CQE pointed by the current head pointer for the submission queue, as represented by dashed arrow 1414.

As shown in FIG. 14B, the SSD reads the SQE from the submission queue, as represented by curved arrow 1416, carries out the command, and writes a response to the completion queue, as represented by curved arrow 1418. The completion queue memory location is mapped to hardware that detects writes and generates interrupts to the NE, as illustrated by dashed curved arrow 1420, by putting the connection ID of the completion queue written to 1422 into an interrupt vector within the NE 1424. The NE then, as shown in FIG. 14C, reads the CQE from the completion queue, as represented by curved arrow 1426, reads the associated context from the context memory area 1404, as represented by arrow 1428, and then writes the new head pointer for the completion queue to the doorbell 1430 associated with the completion queue 1422 to notify the SSD that the head pointer has changed and that the response has been processed by the NE.

Figure 15A:
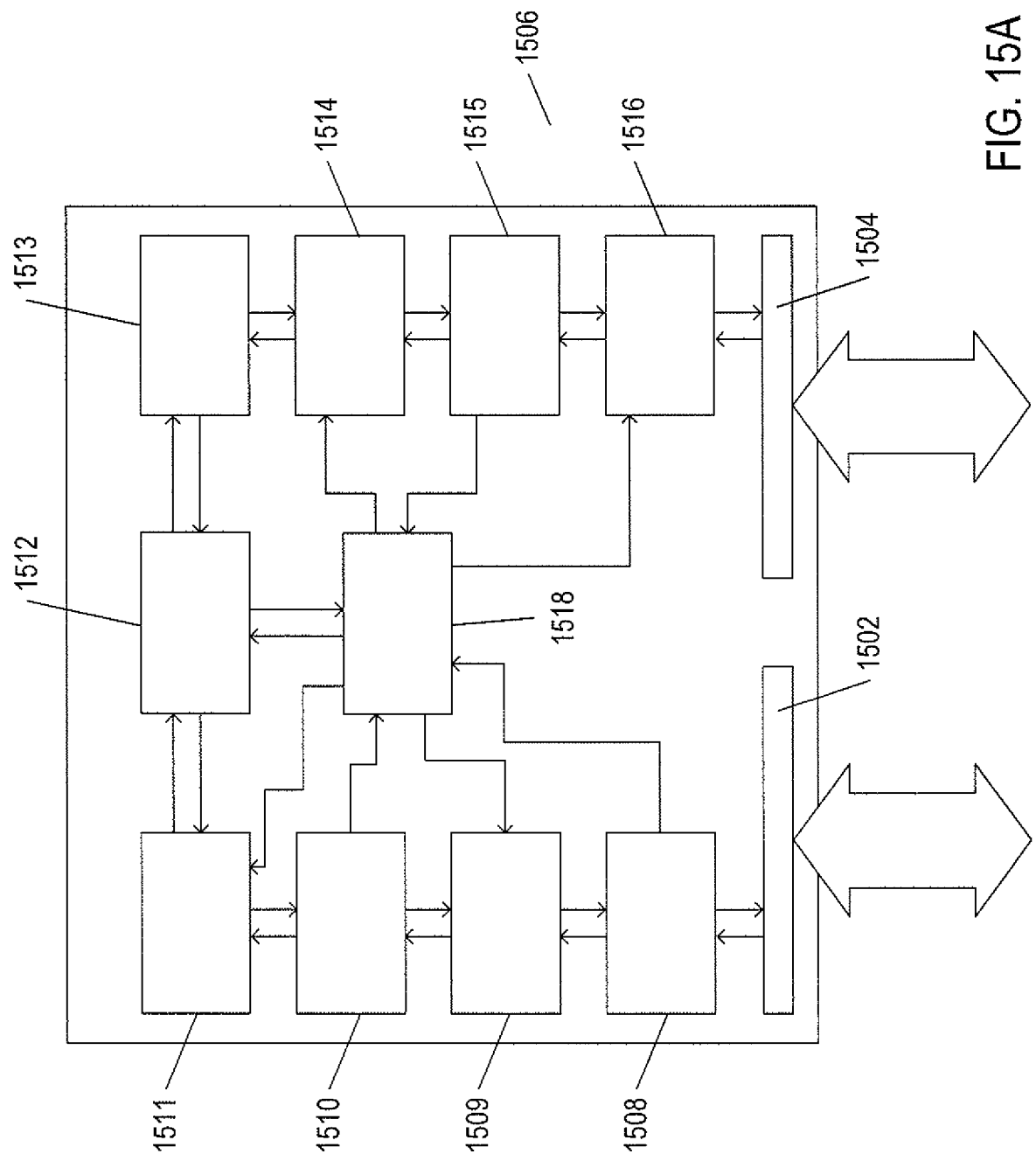
Figure 15B:
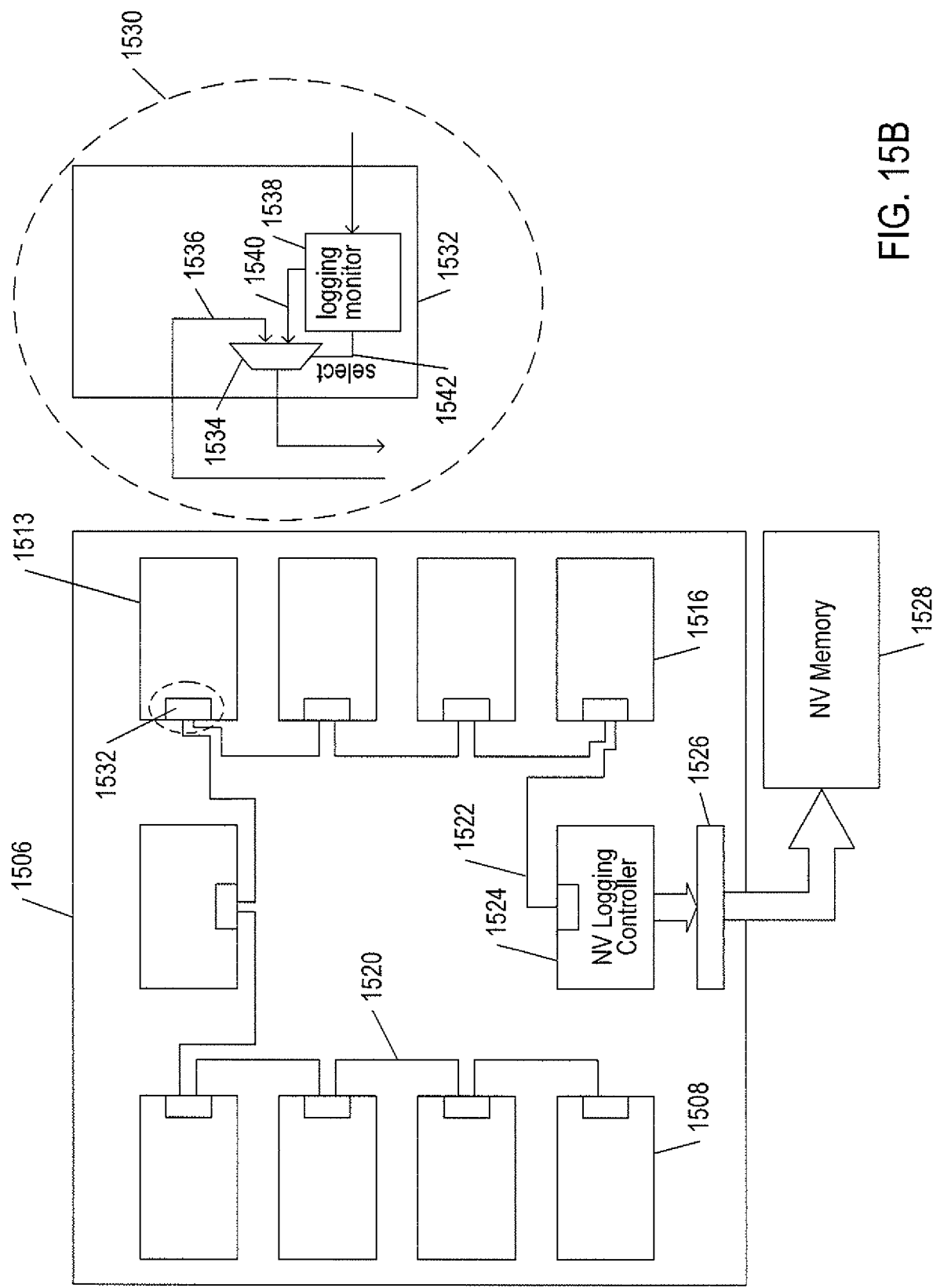

FIGS. 15A-F illustrate another feature of the currently disclosed TFC implementation. FIG. 15A shows an abstract block diagram of a complex integrated circuit that acts as a protocol translation and communications bridge. Message or packet traffic is received and transmitted from a first communications medium through interface 1502 and messages or packets are exchanged with a second communications medium through a second interface 1504. The integrated circuit 1506 additionally includes nine computational modules 1508-1516 and a control/module-intercommunication module 1518. In general, message traffic proceeds from the first interface 1502 through modules 1508-1516 to the second interface 1504 and in the second interface 1504 in a reverse direction back to the first interface. Each module is responsible for some portion of the overall tasks of protocol translation, flow control, connection management, and other such tasks. As shown in FIG. 15B, the communications/bridge integrated circuit 1506 includes a simple chain-like interconnect 1520 that begins with module 1508 and interconnects subsequent pairs of modules through module 1516. A last link in the chain 1522 interconnects module 1516 with a non-volatile logging controller 1524. This module is able to write data values through non-volatile-memory interface 1526 to a non-volatile memory 1528. Inset 1530 shows the chain-like communications-link interface that occurs within each module, including module 1513, that are part of the ring of modules interconnected by the chain-like series of links. The interface includes a multiplexor 1534 that receives event messages or packets from the previous module in the ring 1536 as well as messages from a logging monitor 1538 through input 1540 to the multiplexor for transmission to the next module in the ring. A select input 1542 controls whether input 1536 or input 1540 is transmitted onward to the next module in the ring. The logging monitor 1538 receives periodic event messages from the module in which it is included and waits for the absence of signal on the ring or for an unused time slot for ring broadcast and outputs the event message to the ring.

Figure 15C:
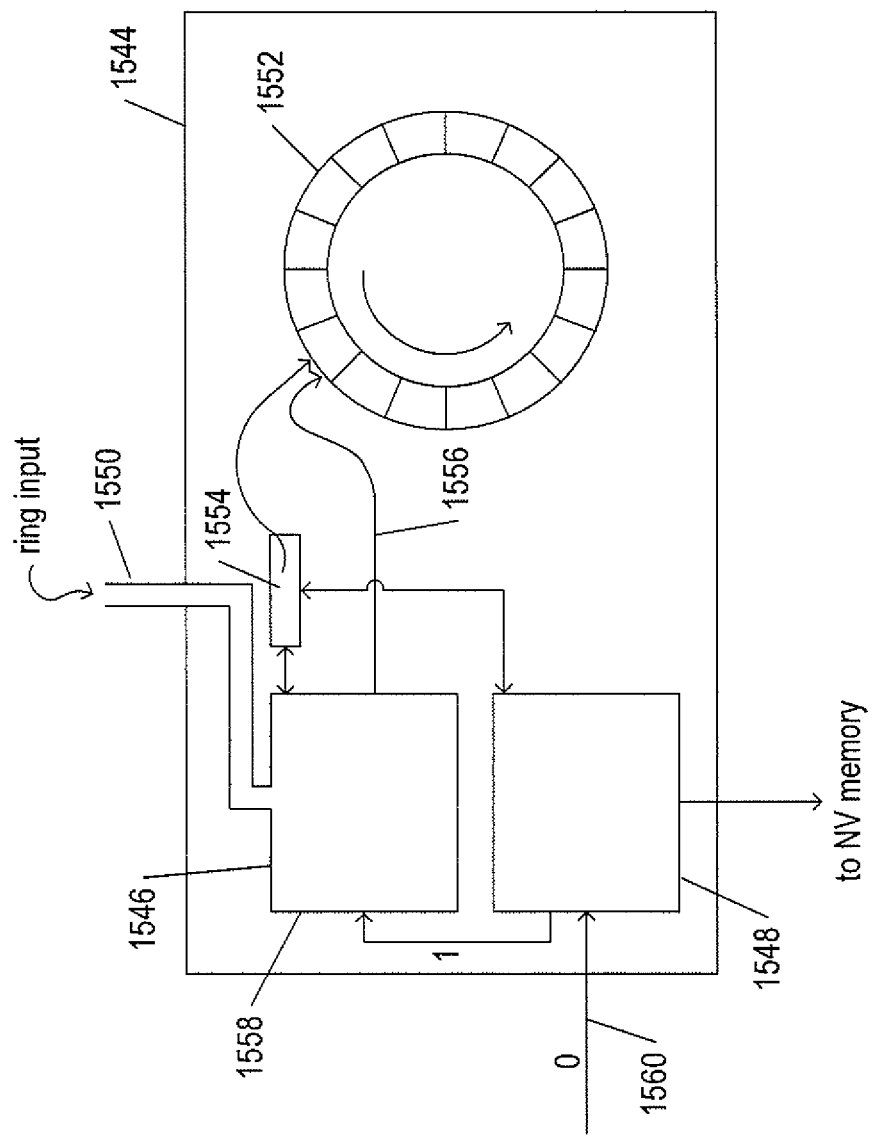

The chain-like ring of communications links within the integrated circuit allow modules to periodically report on status, current command being executed, or other information that would be useful in the event that a problem arises in the integrated circuit that needs to be diagnosed. A most recent set of these event messages output by the modules are periodically written to non-volatile memory by the NV logging controller. FIG. 15C illustrates the NV logging controller. The NV logging controller 1544 has two internal logic modules 1546 and 1548. Logic module 1546, generally a collection of state machines and possibly a microprocessor receives messages from the ring 1550 and places them in a circular buffer 1552. A tail pointer register 1554 points to the next slot in the circular queue into which an event message is placed. Curved arrow 1556 represents the first logic module 1546 placing a next event message in the circular queue. Note that the first logic module operates when it receives input 1 through signal line 1558. A second logic module 1548 is not operable when it receives an input signal 0 on signal input 1560.

Figure 15D:
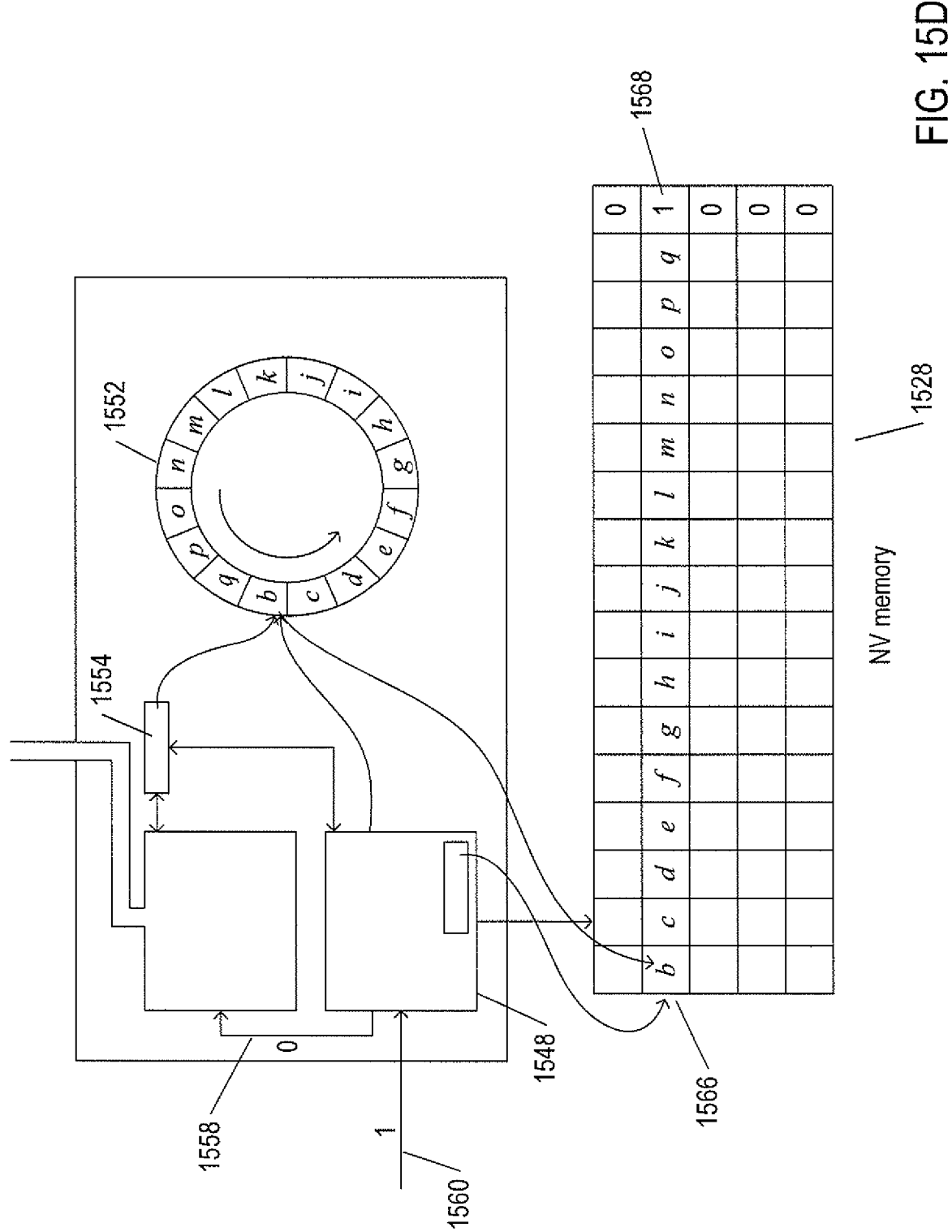

As shown in FIG. 15D, when the input signal line to the second module 1560 is raised, the input signal to the first module 1558 is lowered, the input signal line 1560 is raised by error-detection logic within the integrated circuit. For example, intercommunication/controller module 1518 may detect error conditions and raise input signal 1560 to dump contents of the circular buffer 1552 to flash memory 1528. A pointer register 1564 within the second logic module 1548 accesses the contents of the circular buffer of the buffer entry pointed to by the tail-pointing register 1554. It then proceeds in the direction of curved arrow 1566 to dump the contents of the circular buffer into a row of memory locations 1566 within the NV memory. The second logic module 1548 may additional set a bit or byte 1568 to indicate that this is the most recent values dumped from the circular buffer. The pointer register 1564 can thus write values to NV memory in a circular fashion.

When an error occurs in the integrated circuit that requires diagnosis from on-site diagnosticians or by factory technologists, the contents of the NV memory can be accessed through an additional interface to determine the set of most recent event messages logged by internal logic modules within the integrated circuit. Such information can be extremely useful when attempting to diagnose the root causes of various types of error conditions. Otherwise, technicians may need to attempt to reproduce the error conditions, which may involve very complex testing systems or sniffing circuitry.

Figure 15E:
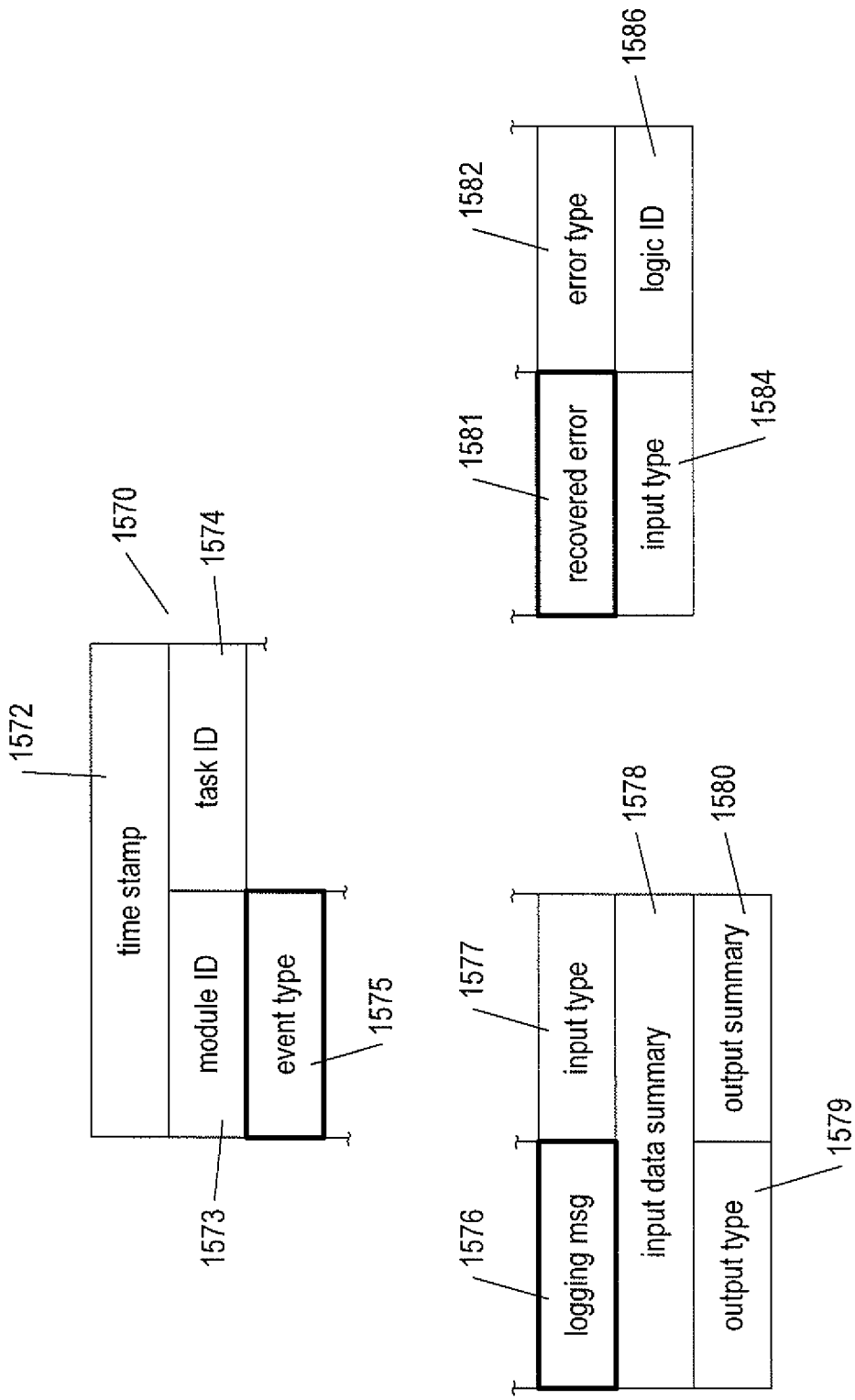

FIG. 15E shows two types of messages that may circulate within the ring. Both types of messages have a similar header 1570 that may include a time stamp 1572, a module ID 1573, a task ID 1574, and an event type 1575. A first type of event message, discussed above, includes a logging message, an input type 1577, input data summary 1578, output type 1579, and output summary 1580. These are simply examples of the types of data that may be included in an event message. The input type and output type may refer to the current inputs to and outputs from the module reporting the event and the logging-message type 1576 is the particular event types for the periodically reported events, as discussed above. A second type of event messages has the recovered-error type 1581. This recovered-error message may include an error type 1584, and logic ID 1586. Again, these are but examples of the many different types of information that may be replaced in a recovered-error message. A recovered-error message is generated by an internal integrated-circuit module where the module has encountered an error condition but has successfully recovered from that error condition. The ring-like communications system described above for logging event messages can also be used to transmit recovered-error messages directly from a recovering module to a management module. This allows for logic-module recovery and resumption of operation in a more efficient and fast fashion that would be possible were the module to need to wait for interaction with the management module in order to report the recovered area before resuming operation.

As shown in FIG. 15F, additional logic is added to the NV logging controller to facilitate recovered-error reporting. A decision element 1588 routes received event messages depending on the event type contained within the event messages. The periodic event messages discussed with reference to FIGS. 15A-D are routed to the circular buffer while recovered-error messages are routed to an additional logic module 1590 and 1591 which signals the management module 1592 in which it may store the recovered-error messages in a set of NV memory addresses 1593 accessible to the management module.

Figure 16A:
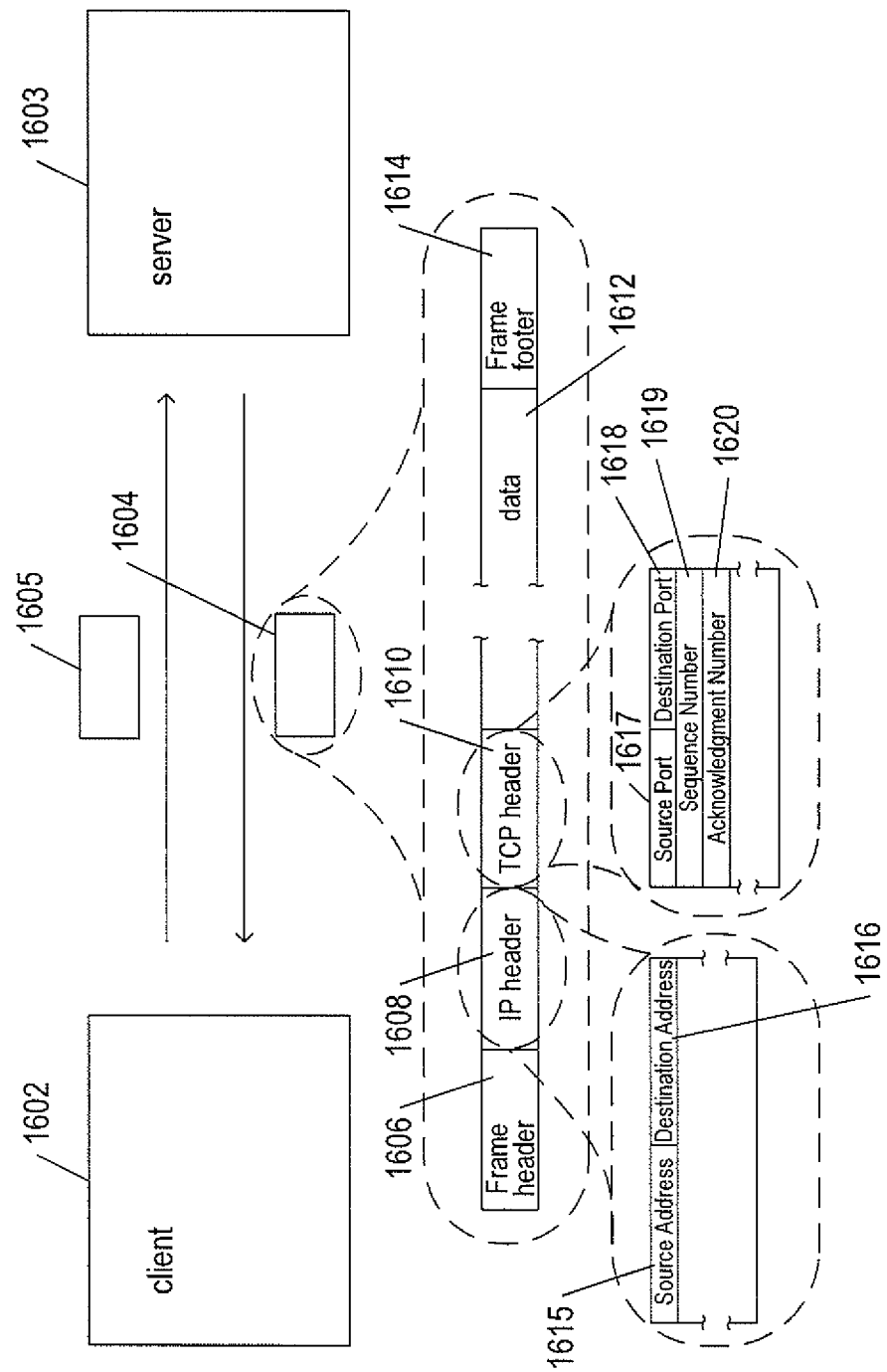
Figure 16B:
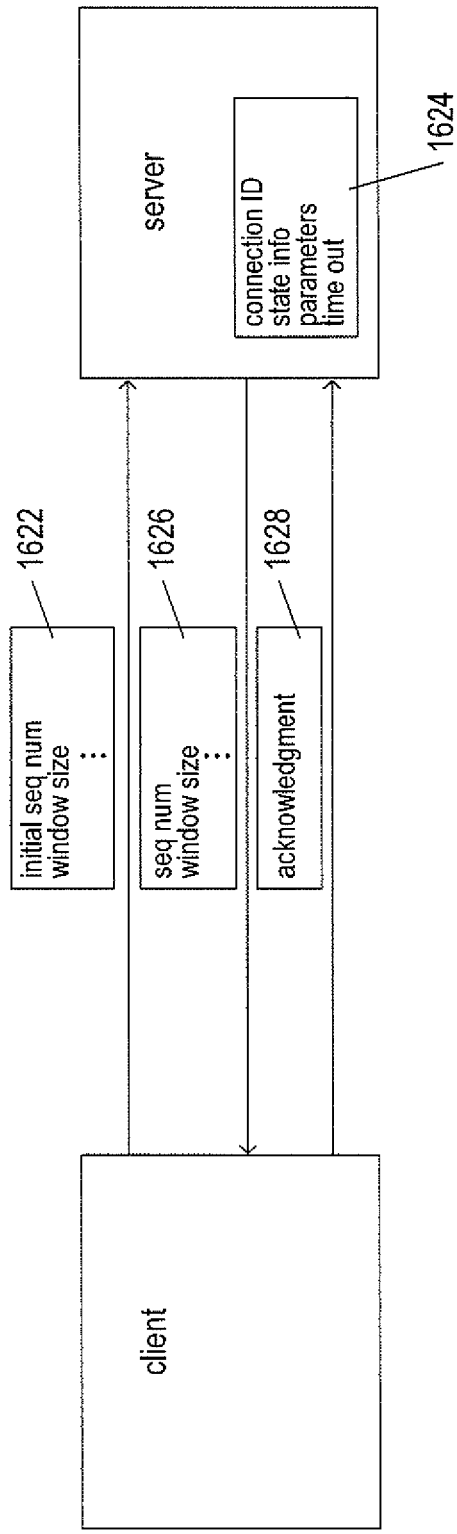
Figure 16E:
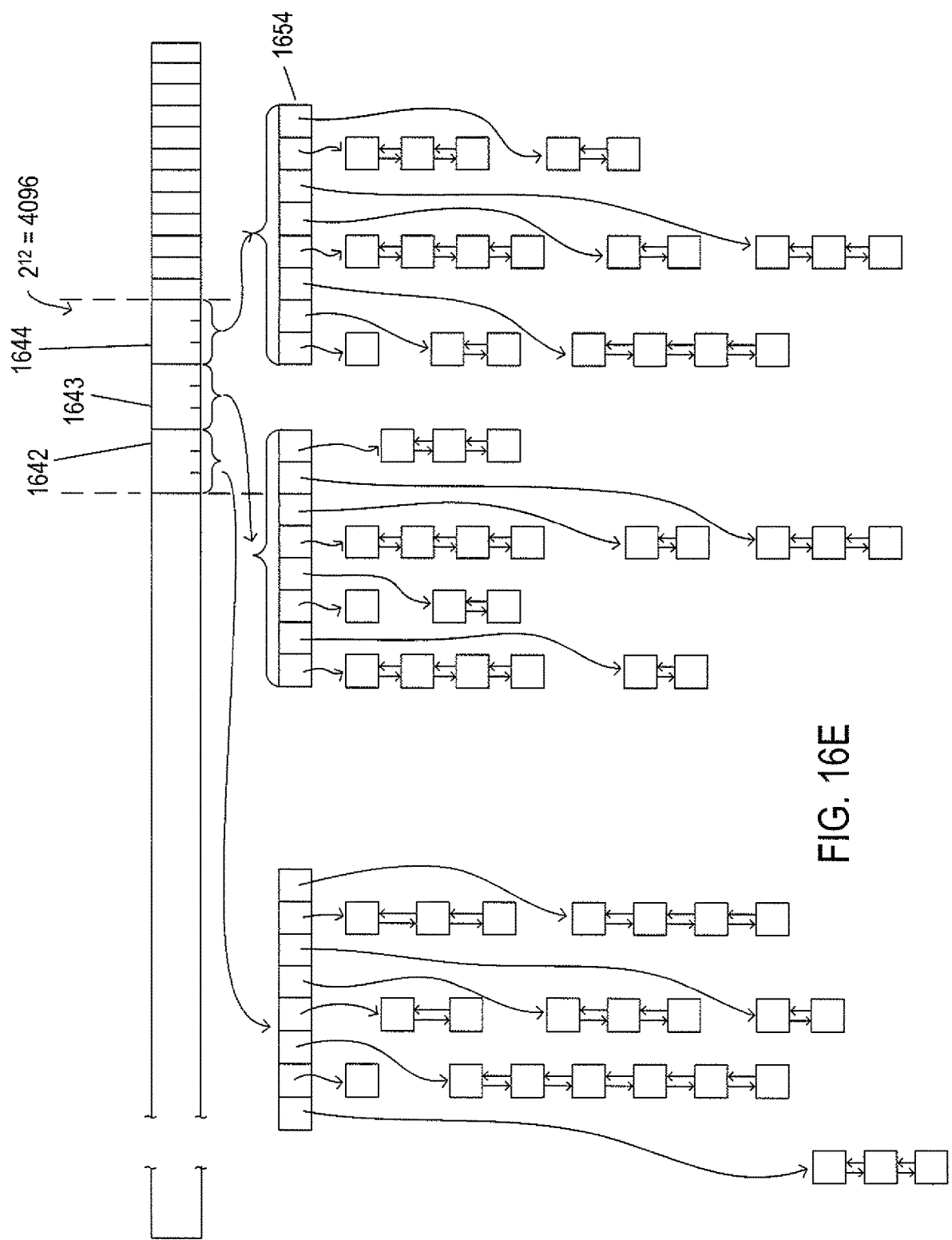
Figure 16F:
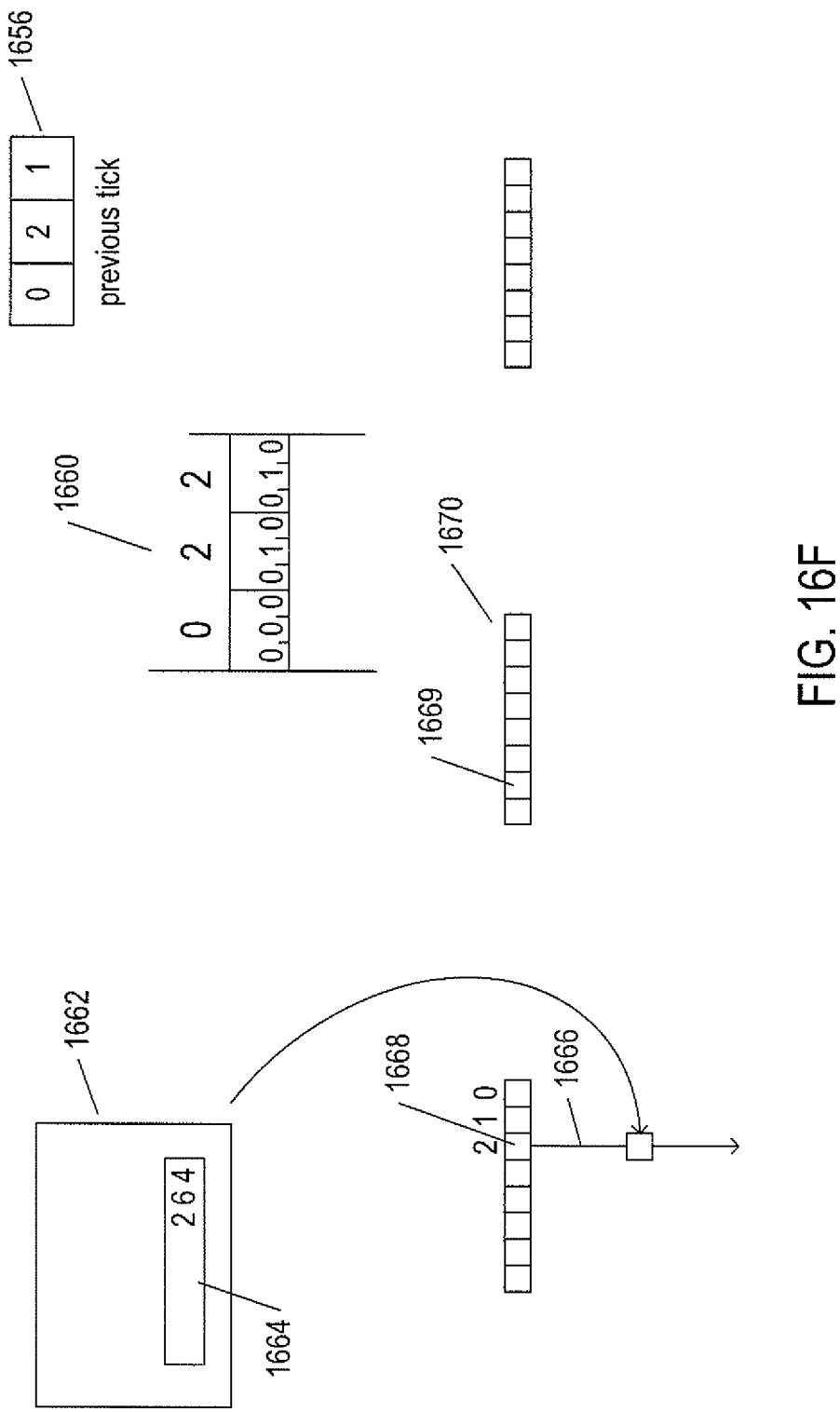

As mentioned above, the MPU module is responsible for creating and tearing down connections. FIGS. 16A-H illustrate how the MPU manages connections within the TFC. FIGS. 16A-B illustrate establishment of a TCP connection between the client and server. The client 1602 and server 1603 are represented by rectangles in FIG. 16A. The client and server computers exchange frames through the Internet. Each frame includes a frame header 1606, an IP protocol header 1608, and a TCP header 1610 in addition to data 1612 and a frame footer 1614. The IP header contains, among other fields, a source address 1615 and a destination address 1616. The TCP header includes, among other fields, a source port 1617, a destination port 1618, a sequence number 1619, and an acknowledgement number 1620.

FIG. 16B illustrates establishment of a TCP connection between the client and server. Connection establishment involves exchange of three frames. A first frame contains an initial sequence number and window size, which is the size for buffering data for received frames, and a connection request message 1622. In response to receiving the connection request message, the server establishes a connection context in memory. The connection context contains a connection ID, state information for the connection, connection parameters, and a time out value. The server returns a second frame in the three-frame sequence 1626 which contains a sequence number for the connection determined by the server and a window size for data buffering on the server. Finally, the client returns an acknowledgement message 1628 which acknowledges the connection-request-response message 1626 and establishes the connection between the client and server. The client and server can then exchange frames for the established connection.

FIG. 16C shows a general time out logic for managing connection contexts. In FIG. 16C, a number of connection contexts, including connection context 1630. Each connection context includes a time out value, such as time out value 1632 in connection context 1630. There is also a system time available in a system-time register. A connection monitor 1634 continuously iterates, waiting for each next tick 1638 before looping through the connections contexts to determine whether any connection contexts have time out. A connection context is timed out when the system time is greater than or equal to the connection-context time out value. When a connection context is timed out, error handling is initiated 1640. The presumption is that a connection must remain active while it is maintained within the server and client computer. An inactive connection is often a sign of some type of failure or error condition.

FIG. 16D illustrates selection of a small number of bits from a microsecond system time register to represent clock ticks. In this case, three octal digits 1642-1644 that include the 12th through 19th bits of the microsecond system time can be extracted as a tick counter. Each increment of the tick counter corresponds to roughly 5,000 microseconds. Thus, the selected octal digit 1642-1644 comprise a half-second tick counter. The value of the three octal digits is "000," 1645, the tick counter represents 0 microseconds and 0 seconds 1646-1647. When the counter increments by 1 1648, the tick counter has the value of approximately 5,000 (4096) 1649 or half a second 1560.

There are eight values for each octal digit, 0-7. Each octal digit is associated with a set of eight pointers, such as the set of eight pointers 1654, each pointer in the set of pointers representing one of the eight values of the octal digit. Each pointer points to a doubly linked list of connection contexts.

FIGS. 16F-I illustrate how connection contexts migrate between the double linked lists as the tick counter successively increments towards the time out value, in ticks, for linked connection contexts as in the implementation shown in FIGS. 16E-H, a previous tick value 1656. The tick counter does not increment precisely, but occasionally skips a digit, as between the tick counter values 1657 and 1658 in FIG. 16D. The current tick value 1660 is extracted from the microsecond system timer. When an event or operation has occurred with respect to the connection represented by connection context 1662, the connection-context manager is re-queued to a doubly linked list. First, a new time out value is entered into the time-out-value field 1664 of the connection context. The number of ticks represented by the time out value is 264−022=242 providing that the highest of the three octal digits of the time out value 264 is not equal to the highest digit of the current tick counter 1660 which it is not, then the connection context is queued to the doubly linked list emanating from the pointer corresponding to the digit 2 1668. Had the highest digit of the tick counter 1660 been equal to the highest digit of the time out value, then the connection context would have been queued to the doubly linked list emanating from pointer 1669 in the set of pointers 1670, provided that the second-highest digit in the time out value 6 is different from the second-highest digit in the current tick counter 1660.

Figure 16G:
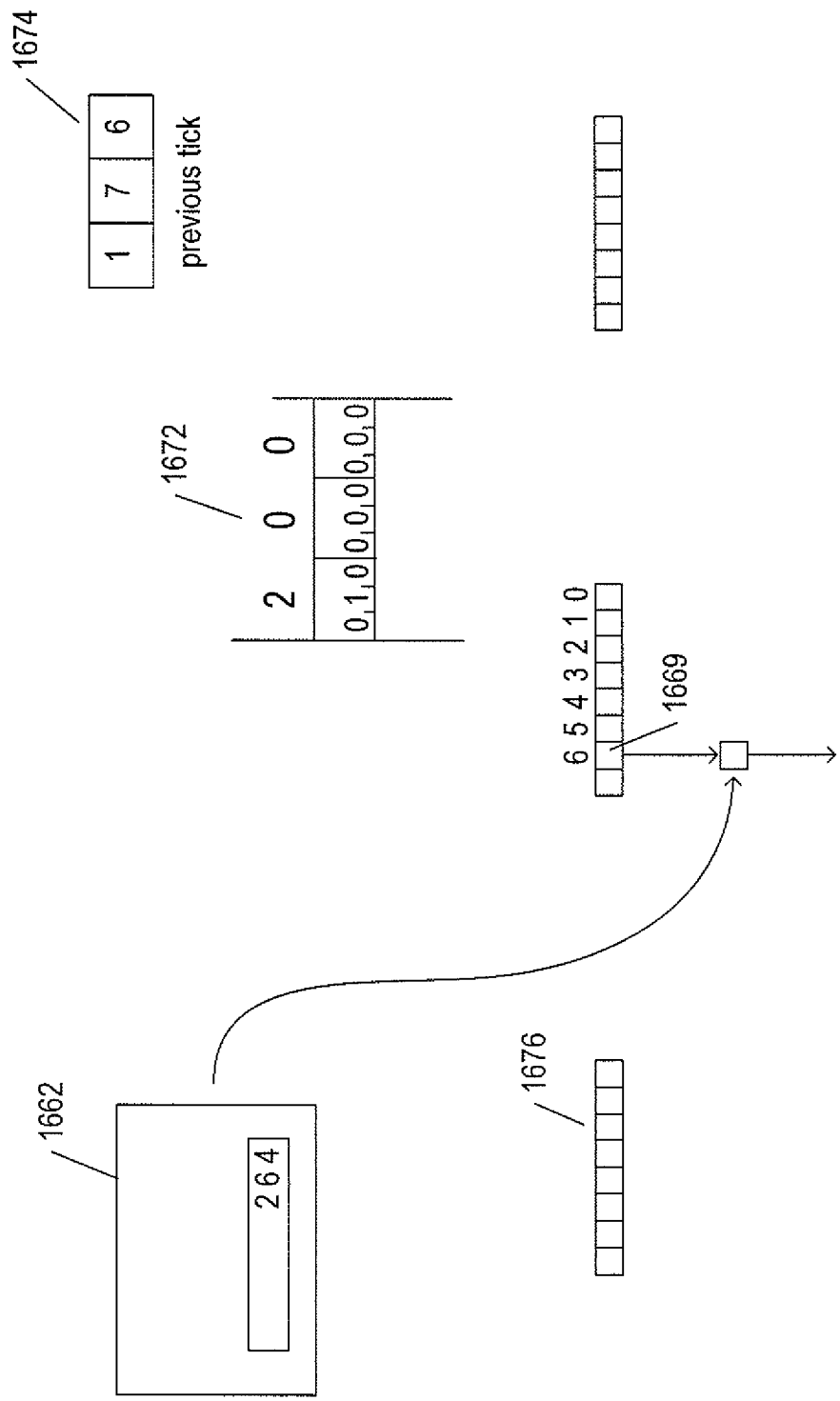
Figure 16H:
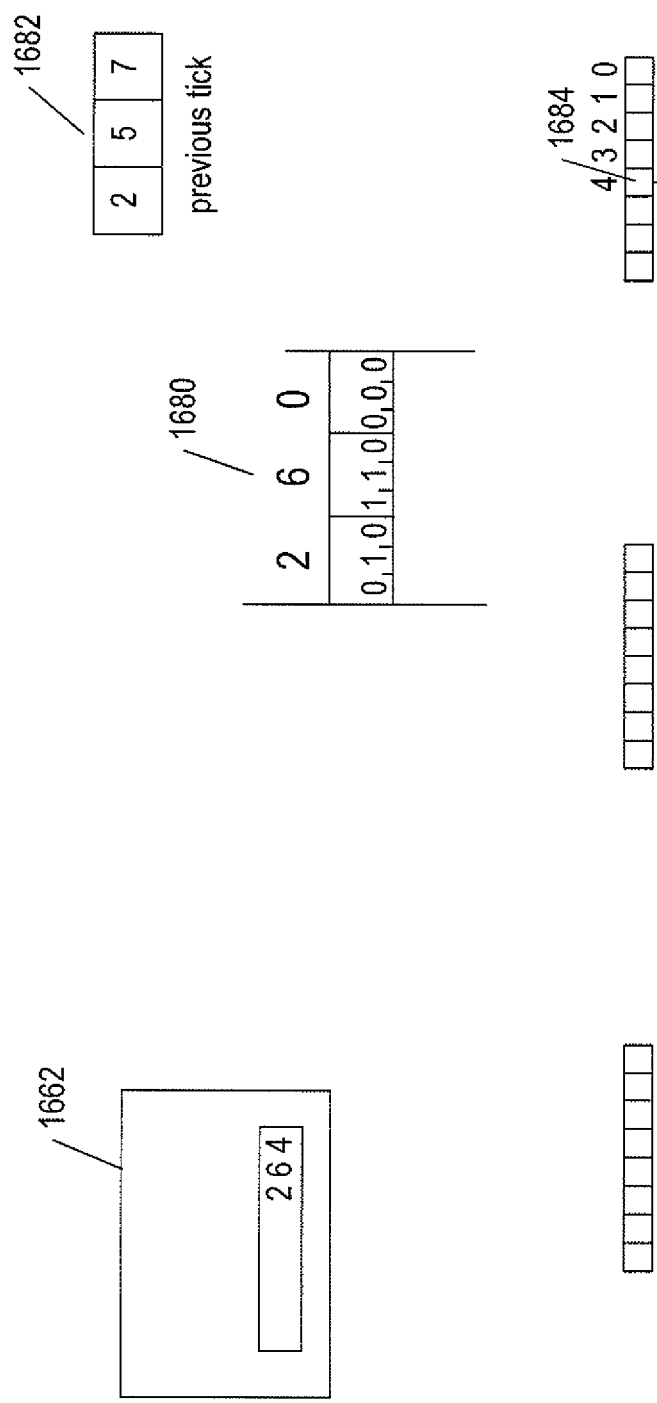
Figure 16I:
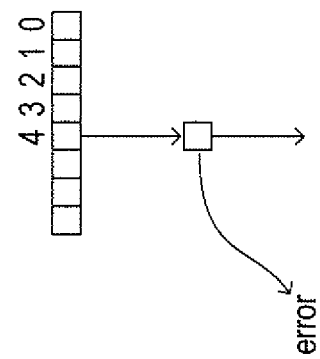
Figure 16I:
Figure 16I:

As shown in FIG. 16G, when the current tick counter reaches the value 200 octal 1672 in the previous counter has the value 176 octal 1674, and when no events or operations have transpired with respect to the connection context 1662, then the connection context has timed out from the first or highest set of pointers 1576 and is moved to the doubly linked queue pointed to the by the pointer 1669 corresponding to the digit 6 in the time out value 264. As shown in FIG.

16H, when the current tick counter reaches the value 260 1680 and the previous tick counter contains the value 257 1682, then the connection context 1662 is moved to the doubly linked list pointed to by the pointer 1684 corresponding to the final, least-significant octal digit 4 in the time out value 264. When the current tick counter then reaches the value 264, the connection context is removed from the doubly linked list pointed to by pointer 1684 and placed on a list of timed out connection contexts for error processing.

Figure 17:
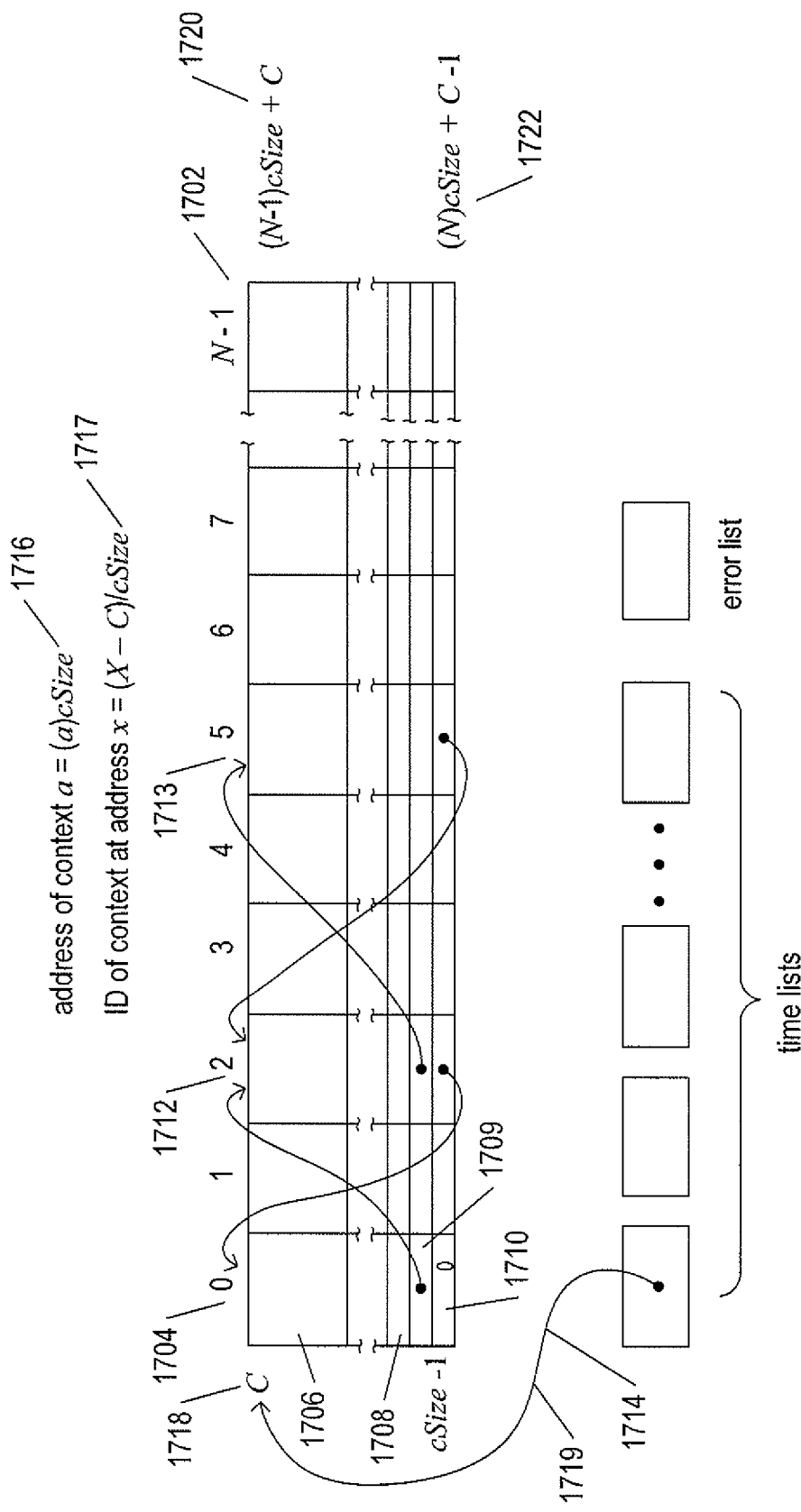
FIG. 17 shows one implementation of the doubly linked connection contexts.

FIG. 17 shows one implementation of the doubly linked connection contexts. Each connection context is stored in an array of N connection contexts 1702. In other words, the contexts are located in fixed locations in memory. Each connection context, such as connection context 0 1704 includes numerous fields containing state information and connection parameters 1706, a time out value 1708, a forward pointer 1709, and a back pointer 1710. The forward pointer and back pointer connect the connection context into a doubly linked list. In the example shown in FIG. 17, connection contexts 1704, 1712, and 1713 are linked together into a three-number doubly linked list that is referenced by the digit pointer 1714. Moving connection contexts between lists involves reassigning pointers rather than moving the contents of a connection context to a new memory location. The index of a connection context serves as the connection ID. The address of a connection context with connection-context ID a is computed as shown in expression 1716 and the ID of a connection context can be computed from the address x of the connection context according to expression 1717. The address in the first field in the first context is C 1718, the address of the final field in the first context cSize−1 1719, the address of the first field in the final context is (N−1)cSize+C 1720 and the address of the final field of the final context is (N)cSize+C−1 1722.

Figure 18A:
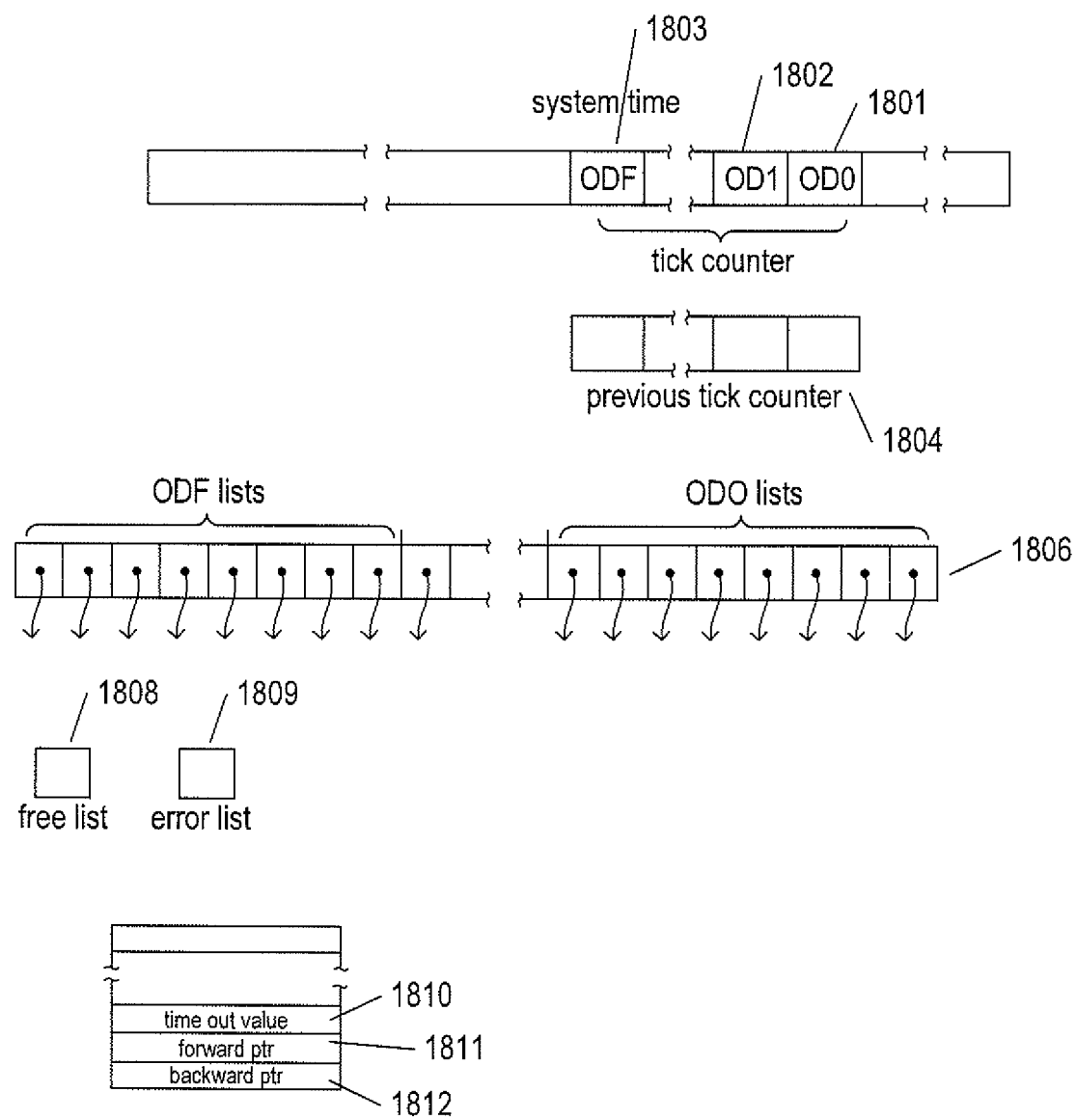
FIG. 18A shows data structures used to describe one implementation of the connection-context management scheme discussed above with reference to FIGS. 16A-17.
Figure 18B:
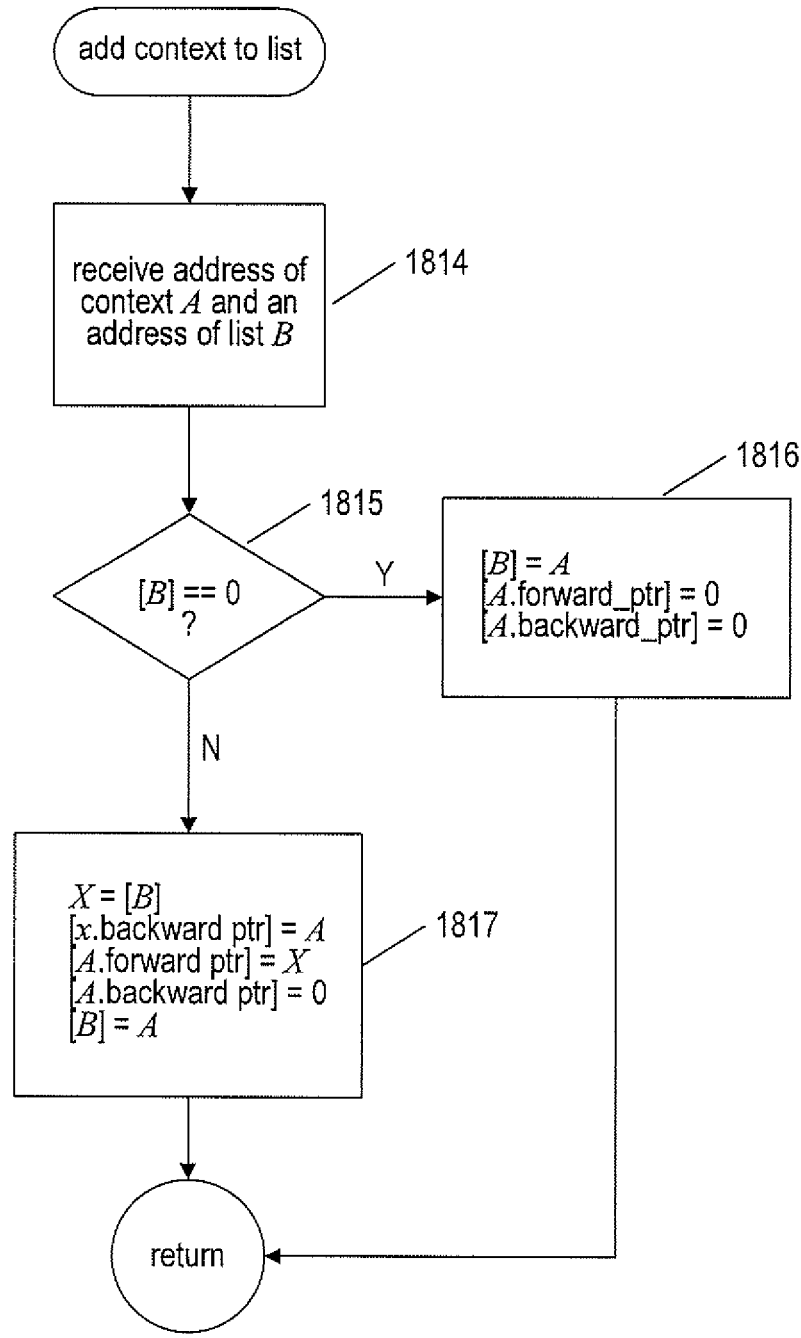
FIGS. 18B-18G provide control-flow diagrams that illustrate connection-context-management hardware logic that carries out connection-context management as discussed above with reference to FIGS. 16A-17.

FIG. 18A shows data structures used to describe one implementation of the connection-context management scheme discussed above with reference to FIGS. 16A-17. There are a number of octal digits in the tick counter 1803 labeled "OD0," "OD1," "ODF." The previous tick counter has the same number of octal digits 1804. There are eight pointers to doubly linked lists for each octal digit 1806. In addition, there is a free list that points to unused connection counters 1808 and an error list that contains timed-out connection contexts. As discussed above, each connection context includes a timed-out value field 1810, a forward pointer 1811, and a backward pointer 1812. FIGS. 18B-18G provide control-flow diagrams that illustrate connection-context-management hardware logic that carries out connection-context management as discussed above with reference to FIGS. 16A-17. FIG. 18B shows a control-flow diagram for the logic "add context to list." The logic receives an address of a context A and an address of a list B in step 1814. When the value stored in address B is 0, the list is empty, as determined in step 1815. To add the connection context with address A to the list, the contents of the list [B] is set to address A and the backward and forward pointers of the connection contexts are both set to 0 in step 1816. Otherwise, the contexts having address A is inserted as the first element of the doubly linked list referenced by the list of address B in step 1817.

Figure 18C:
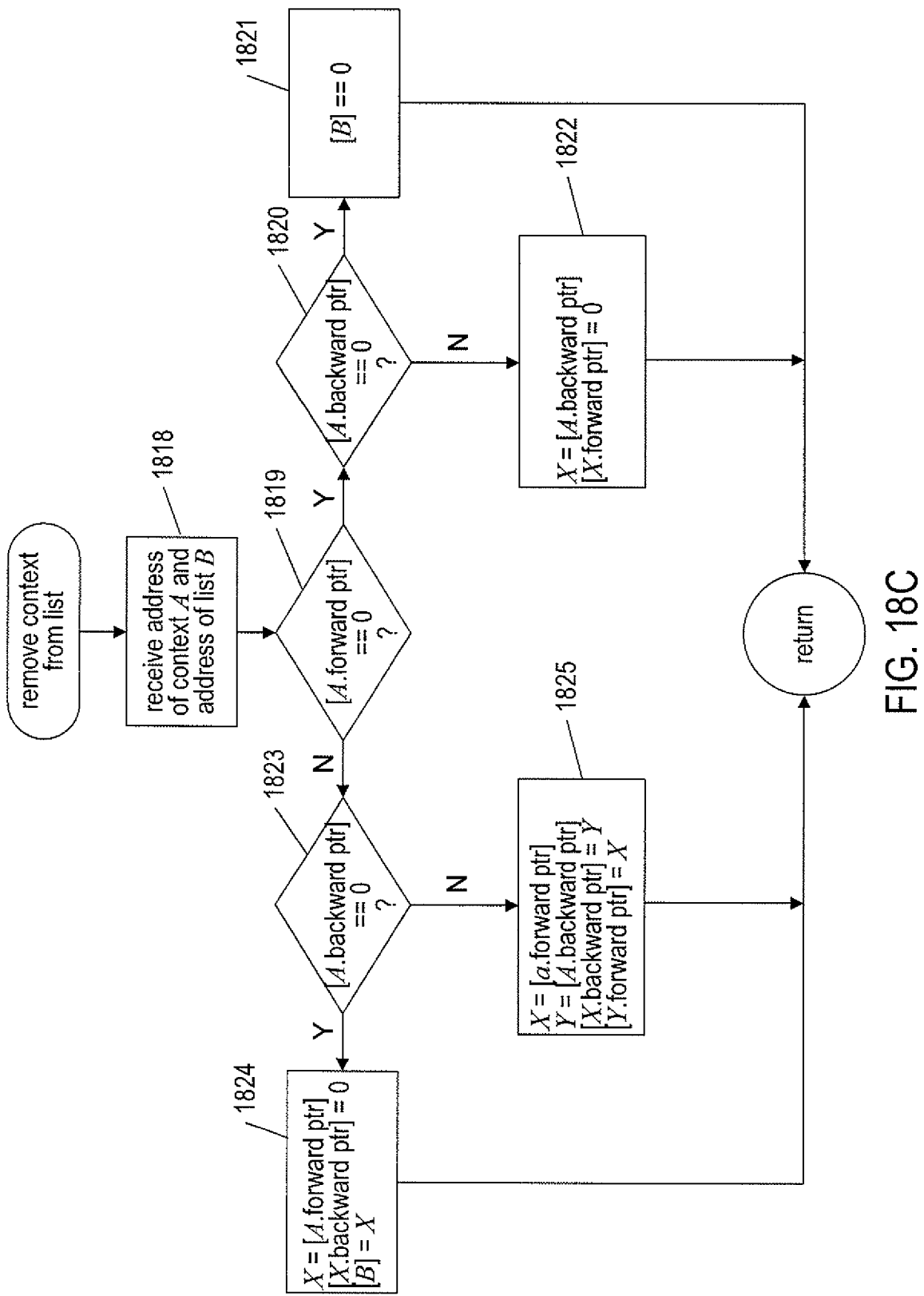

FIG. 18C shows hardware logic "remove context from list." The hardware logic receives the address of the context A and the address of the list B from which to remove context with address A. When context with address A is at the end of the list, as determined in step 1819, and when the context is also the first context on the list, as determined in step 1820, then the list is set to 0 to indicate that the list is empty in step 1821. Otherwise, context A is removed from the end of the list in step 1822. When the connection context with address A is not the last element of the doubly linked list, but when it is the first element of the doubly linked list, as determined in step 1823, then the connection context with address A is removed from the first position of the list in step 1824. Otherwise, the connection context with address A is somewhere within the list, as a result of which it must be spliced out of the list in step 1825.

Figure 18D:
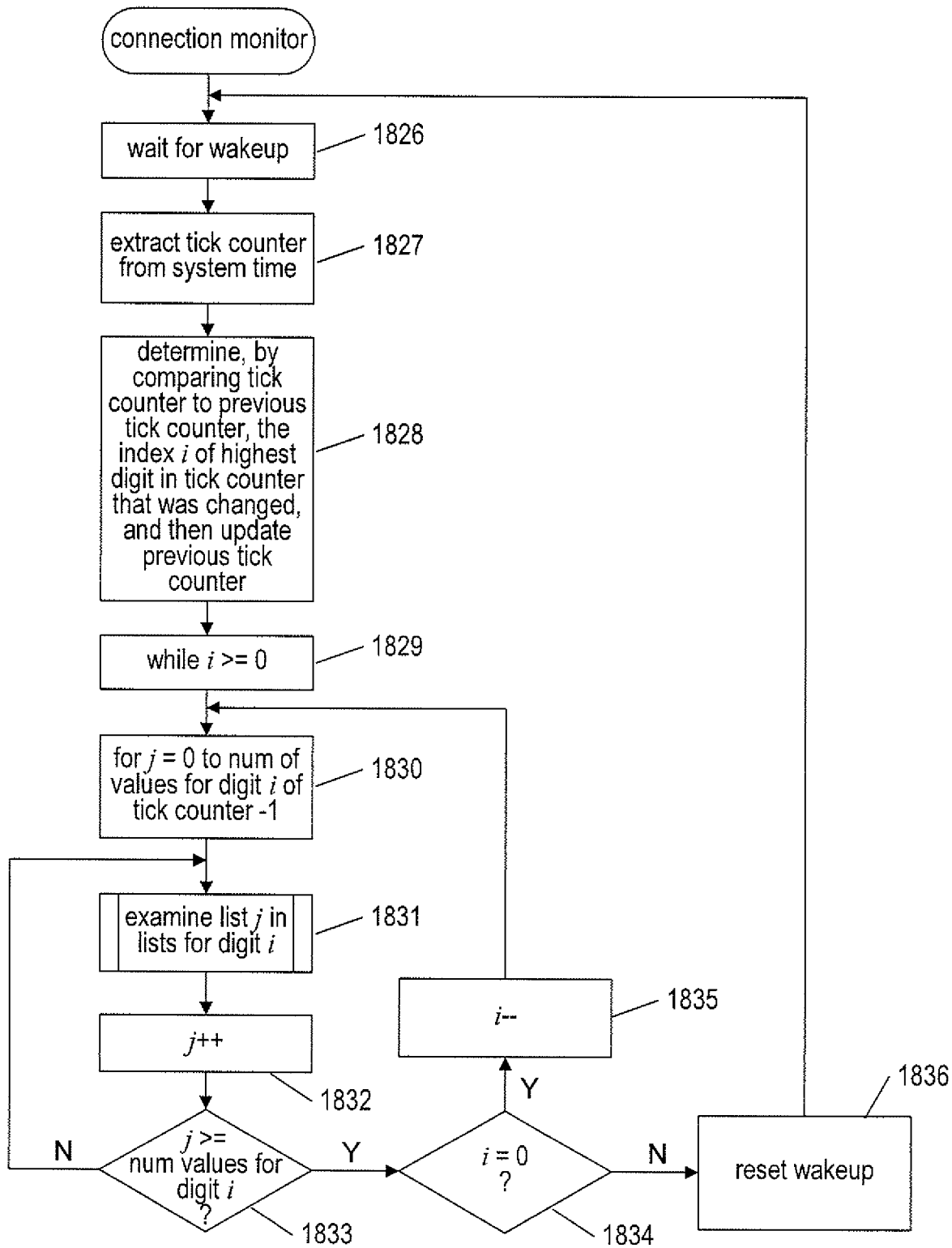

FIG. 18D provides a control-flow diagram for the hardware logic "connection monitor." The connection monitor waits for a wake up at each tick increment in step 1826. In step 1827, the connection monitor extracts the tick counter from the system time in step 1827. In step 1828, the index of the highest digit in the tick counter that has changed when the tick counter was incremented to its current value is determined. Then, in the while-loop of steps 1829-1835, each octal digit that has changed in the tick counter during the previous increment is considered. In the for-loop of steps 1830-1833, each of the doubly linked lists pointed to by pointers corresponding to the octal digits are examined by the hardware logic "examine list j in lists for digit 1." Once all of the lists corresponding to changed octal digits in the tick counter have been examined, the wake-up mechanism is reset in step 1836. Note that, by the currently disclosed context-connection-management scheme, only a small number of connection contexts need to be examined, at each clock tick, to determine whether the connection contexts have timed out. In the previously described connection monitor 1636 in FIG. 16C, every connection context needed to be examined for time out at each tick of the tick counter. Thus, the time-out monitoring overhead for the currently disclosed scheme is significantly less than that for the naïve scheme discussed with reference to FIG. 16C.

Figure 18E:
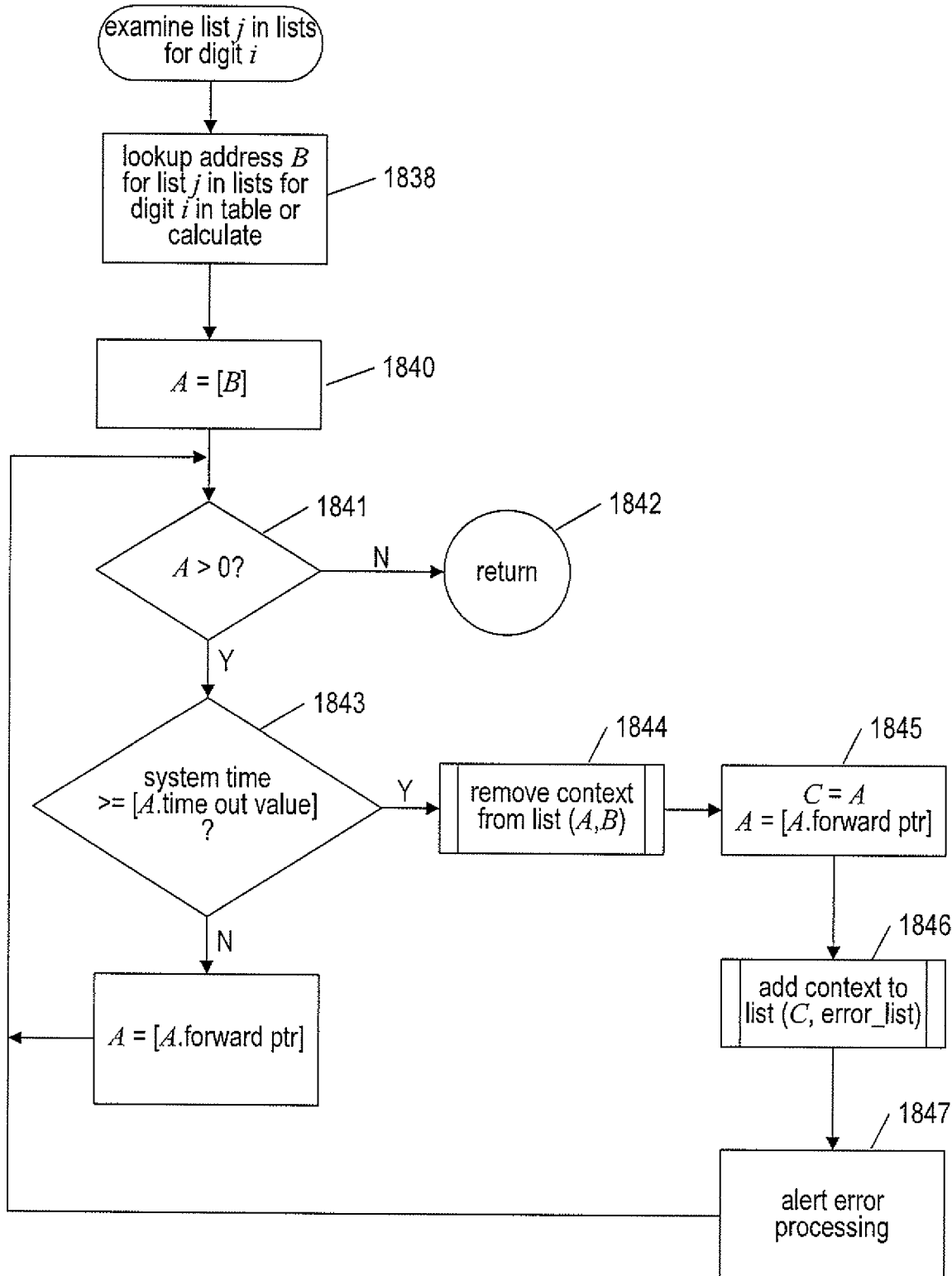
Figure 18F:
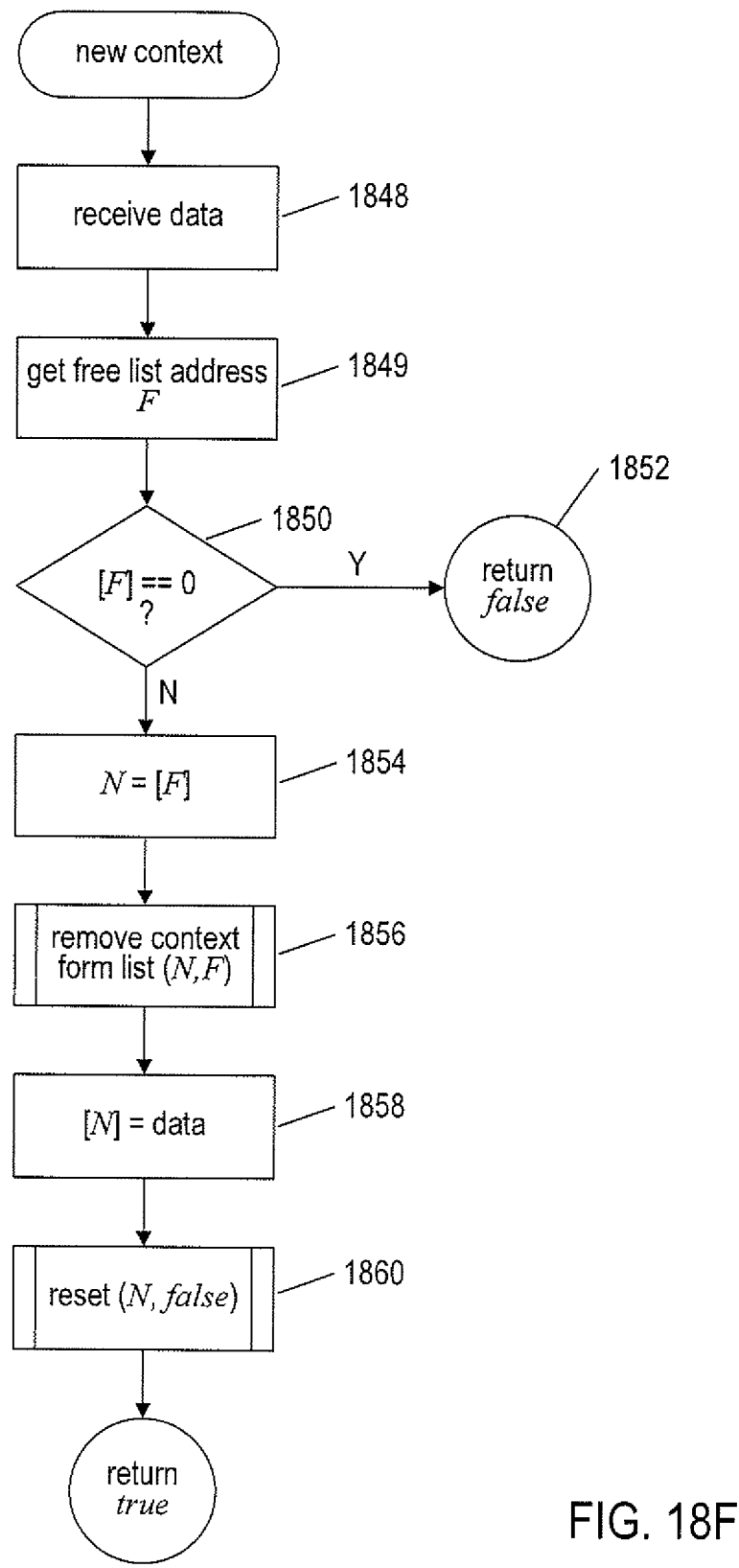
Figure 18G:
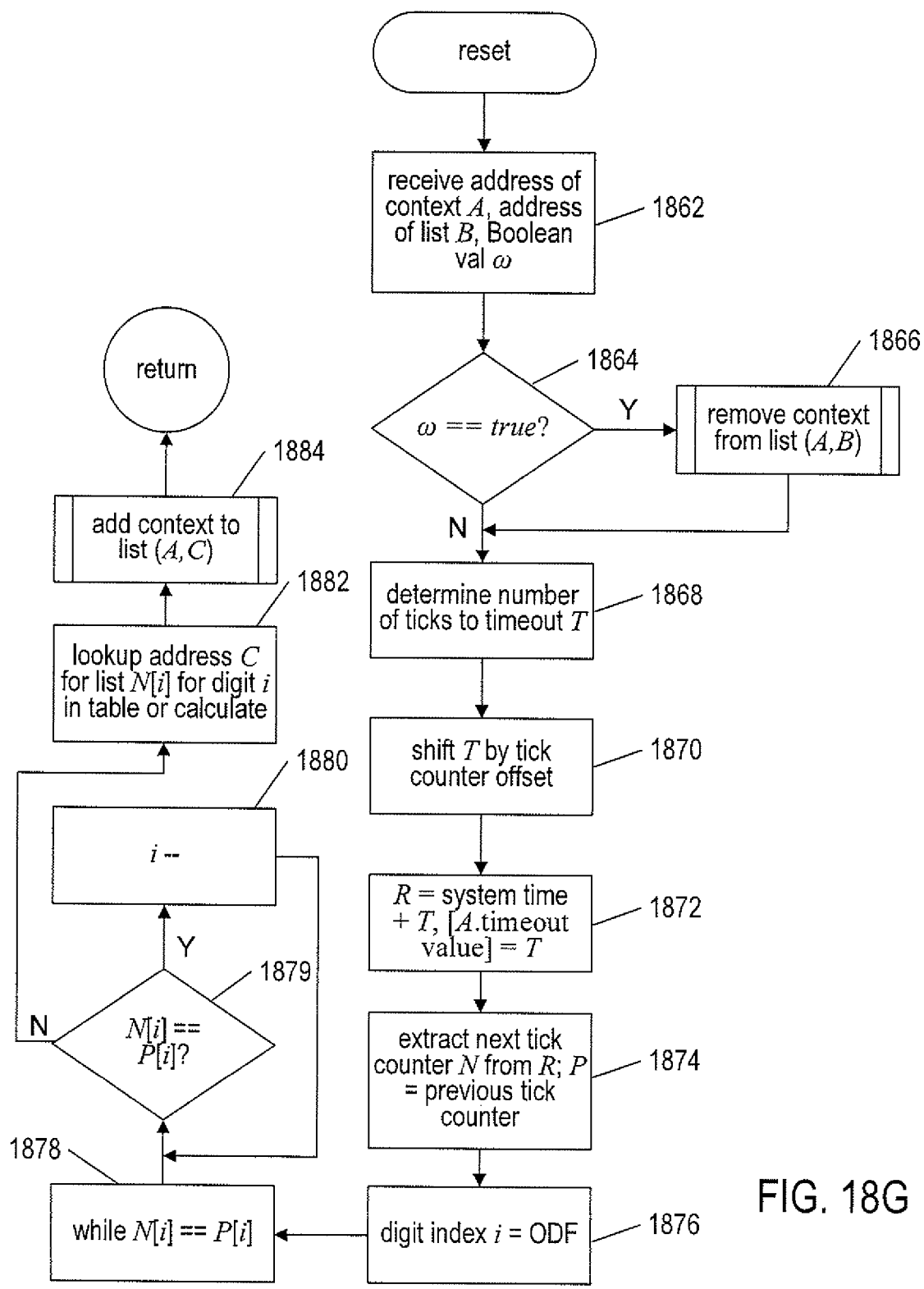

FIG. 18E provides a control-flow diagram for the hardware logic "examine list j in lists for digit i" invoked in step 1831 of FIG. 18D. In step 1838, the hardware logic looks up the address B for list j in lists for digit i of the tick counter in a table or calculates the address based on the storage scheme for the pointers to the doubly linked lists. In step 1840, the address A is set to the first element on list B. When A is not greater than 0, as determined in step 1841, then the logic "examine list j in lists for digit i" returns in step 1842. That is because the list was empty. Otherwise, in step 1843, the hardware logic determines whether the system time is greater than or equal to the time-out value in connection context with address A. If so, then the context with address A is removed from list B in step 1844 and placed on the error list in step 1846. In step 1845, the address A is advanced to the next element of the linked list. The error-processing logic is alerted in step 1847. Otherwise, the address A is advanced to point to the next connection context on the list. FIG. 18F is a control-flow diagram with hardware logic "new context." In step 1848, the parameters and status values for a new context are received. In step 1849, the free-list address list F is obtained. When the contents of this address are 0, as determined in step 1850 and the free list is empty, then a false value is returned in step 1852. Otherwise, N is set to point to the first free connection context on the free list in step 1854. In step 1856, the connection context N is removed from the free list. The contents of N are set to the received data instep 1858, and the hardware logic "reset" is called in step 1860. FIG. 18G provides a control-flow diagram for the hardware logic "reset." In step 1862, the hardware logic "reset" receives the address of a connection context A, the address of a list B, and the Boolean value $\Omega$. When $\Omega$ is true, as determined in step 1864, then the context is removed from the list B in step 1866. This version of reset is used by the management logic to reset a context for which activity or operations have been detected. When Ω is false, the reset is called for a new context in step 1860 of FIG. 18F. In step 1868, the hardware logic "reset" determines the number of ticks to time-out value T, a new time-out value for the connection context. In step 1870, the value T has shifted by the tick counter offset within the system-time register. In step 1872, the variable R is set to the system time plus the shifted value of T and the time-out value in the connection context with address A is set to T. In step 1874, a next tick counter N is extracted from R and the variable P is set to the previous tick counter. In step 1876, an index is set to the highest octal digit in the tick counter. In the while-loop of steps 1878-1880, the index i is decremented until the octal digit referenced by i in the new tick counter N is different from the previous tick counter P. In step 1882, the address C is set to the address for the list corresponding to the octal value of the $i^{th}$ octal digit in the next tick counter N. Finally, the connection context is added to the list with address C in step 1884. Thus, the hardware logic "reset" places a connection context into the appropriate doubly linked list associated with the highest octal digit if the next tick counter does not have the same value as the same octal digit in the previous tick counter.

Although the present invention has been described in terms of particular embodiments, it is not intended that the invention be limited to these embodiments. Modifications within the spirit of the invention will be apparent to those skilled in the art.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A target fabric controller configured to bridge an Ethernet fabric to one or more peripheral component interconnect express (PCIe) attached non-volatile memory express (NVMe) data-storage devices, the target fabric controller comprising:
    a single integrated circuit that includes:
        dual Ethernet media-access-controller (MAC) configured to receive frames from, and transmit frames to, the Ethernet fabric,
        a management processing unit that contains integrated-circuit management logic and is configured to establish and tear down TCP connections and manage RDMA (remote-direct-memory-access)-over-Converged-Ethernet (RoCE) and NVMe connections,
        a transport engine configured to receive and transmit TCP and iWarp protocol messages,
        an RDMA engine configured to process inbound and outbound RoCE and iWarp protocol messages and coordinate data transfer to main memory;
        an NVMe engine configured to access a controller, communicating through main-memory data structures with a PCIe root complex configured to interconnect the single integrated circuit with an NVMe data-storage device, and
        the PCIe root complex.

2. The target fabric controller of claim 1 further comprising a main-memory block configured to store data buffers and data structures, including circular queues, that provide a communications channel between the NVMe data-storage device or devices and the target fabric controller.

3. The target fabric controller of claim 2 wherein the main-memory block is further configured to store NVMe submission queues and completion queues, memory-mapped doorbell registers, and interrupt vectors.

4. The target fabric controller of claim 2 further comprising an Rx packet buffer configured to temporarily store frames to facilitate processing of the frames by the transport engine, the RDMA engine, and the NVMe engine.

5. The target fabric controller of claim 4 further comprising an Rx direct-memory-access (DMA) module configured to transfer data from frames stored in the Rx packet buffer to data buffers within the main-memory block.

6. The target fabric controller of claim 1 wherein the transport engine, the RDMA engine, and the NVMe engine together comprise an upper-layer processor implemented as multiple state machines and one or more microprocessors that control exception handling.

7. The target fabric controller of claim 1 wherein the management processing unit is further configured to create and tear down connections through which the target fabric controller communicates with the NVMe data-storage device.

8. The target fabric controller of claim 1 wherein the dual Ethernet MAC are further configured to implement two standard 10/25 Gbps Ethernet MACs that together comprise a lower portion of a data link layer within an Ethernet controller.

9. The target fabric controller of claim 1 wherein the dual Ethernet MAC are further configured to:
    control transmission and reception of Ethernet frames;
    perform retransmission and back-off functions;
    compute, append, and check frame-check sequences; and
    guarantee reception of well-formed frames.

10. The target fabric controller of claim 1 further comprising an abstraction layer configured to provide a common interface between internal target fabric controller modules and different PCIe-root-complex implementations.

11. The target fabric controller of claim 1 wherein the NVMe engine is configured to perform tasks logically associated with an NVMe controller and NVMe driver processes, including:
    processing NVMe submission-queue entries and RDMA send segments;
    processing NVMe completion-queue entries; and
    maintaining two versions of submission queues used to support split commands.

12. The target fabric controller of claim 1 further comprising a pause detect/control module configured to:
    detect that a pause frame is received from the Ethernet fabric;
    signal transmission-path modules to cease transmitting requests through a paused port; and
    initiate a pause responsive to internal buffers approaching data-storage saturation.

13. The target fabric controller of claim 1 further comprising an Rx first in, first out (FIFO) module configured to provide input-frame buffering for two Ethernet MAC instantiations as well as a flow-controlled output port.

14. The target fabric controller of claim 1 further comprising an Rx corrupter and a Tx corrupter configured to corrupt frames to test error-detection and error-recovery logic.

15. The target fabric controller of claim 1 further comprising an Rx parser/router configured to parse incoming Ethernet frames to route the frames to additional frame-processing modules.

16. The target fabric controller of claim 1 further comprising a descriptor input queue and a descriptor output queue configured to buffer TCP and RoCE descriptors.

17. The target fabric controller of claim 1 further comprising a TSD-memory module configured to store TCP segment descriptors produced by the RDMA engine and consumed by the transport engine.

18. The target fabric controller of claim 1 further comprising a Tx framer configured to construct Ethernet frames for transmission to the Ethernet fabric.

19. The target fabric controller of claim 1 further comprising Tx first in, first out (FIFO) modules configured to provide buffering for bridging an internal-target fabric controller-module data rate with data rates associated with the dual Ethernet MAC.

20. The target fabric controller of claim 1 further comprising an input first in, first out (FIFO) and an output first in, first out (FIFO) configured to provide temporary buffering of frames processed by the management processing unit.

21. The target fabric controller of claim 1 further comprising an SPI flash controller.

22. A target fabric controller configured to bridge an Ethernet fabric to one or more peripheral component interconnect express (PCIe) attached non- volatile memory express (NVMe) data-storage devices, the target fabric controller comprising:
   a single integrated circuit that includes:
      a main-memory module,
      dual Ethernet media-access-controller (MAC) configured to receive frames from, and transmit frames to, the Ethernet fabric,
      a management processing unit that contains integrated-circuit management logic and is configured to establish and tear down TCP connections and manage RDMA (remote-direct-memory-access)-over-Converged-Ethernet (RoCE) and NVMe connections,
      a transport engine configured to receive and transmit TCP and iWarp protocol messages,
      an RDMA engine configured to process inbound and outbound RoCE and iWarp protocol messages and coordinate data transfer to main memory,
      an NVMe engine configured to access a controller, communicating through main-memory data structures with a PCIe root complex configured to interconnect the single integrated circuit with an NVMe data-storage device, and
      the PCIe root complex.

23. The target fabric controller of claim 22 wherein the main-memory module is configured to store:
   data for transfer to one or more NVMe data-storage devices;
   contexts, each context including information that can be used to associate a response to a command based on a command identifier received in the response;
   an interrupt vector in an interrupt-vector storage location; and
   multiple pairs of queues, each queue pair comprising:
      a submission queue, having tail and head pointers,
      a submission-queue doorbell register,
      a completion queue, having tail and head pointers, and
      a completion-queue doorbell register.

24. The target fabric controller of claim 23 wherein the target fabric controller is configured to issue a command to the NVMe data-storage device by:
   inputting, by the NVMe engine, an entry containing the command to a submission queue within a queue pair;
   storing a context for the command in the main-memory module; and
   writing a new tail pointer for the submission queue to the submission-queue doorbell register.

25. The target fabric controller of claim 24 wherein writing a new tail pointer for the submission queue to the submission-queue doorbell register notifies the NVMe data-storage device to read a submission-queue entry pointed to by a submission-queue head pointer.

26. The target fabric controller of claim 24 wherein the NVMe data-storage device is configured to, following reading the submission-queue entry pointed to by the submission-queue head pointer:
   perform the command contained in the submission-queue entry; and
   input an entry containing a response into the completion queue of the queue pair.

27. The target fabric controller of claim 24 wherein circuitry within the target fabric controller is configured to, responsive to the NVMe data-storage device receiving, performing, and writing a response to the completion queue of the queue pair:
   detect writing of the response; and
   generate an interrupt to the NVMe engine by writing a connection ID associated with the completion queue into an interrupt vector within the NVMe engine.

28. The target fabric controller of claim 27 wherein the NVMe engine is configured to, upon receiving the interrupt:
   read the completion-queue entry from the completion queue;
   read the context for the command from the main-memory module; and
   write a new head pointer for the completion queue to the completion-queue doorbell to notify a solid-state disk (SSD) that the head pointer has changed and that the response has been processed by the NVMe engine.

29. A target fabric controller configured to bridge an Ethernet fabric to one or more peripheral component interconnect express (PCIe) attached non-volatile memory express (NVMe) data-storage devices, the target fabric controller comprising:
   a single integrated circuit that includes:
      a main-memory module,
      dual Ethernet media-access-controller (MAC) configured to receive frames from, and transmit frames to, the Ethernet fabric,
      a management processing unit that contains integrated-circuit management logic and is configured to establish and tear down TCP connections and manage RDMA (remote-direct-memory-access)-over-Converged-Ethernet (RoCE) and NVMe connections,
      a transport engine configured to receive and transmit TCP and iWarp protocol messages,
      an RDMA engine configured to process inbound and outbound RoCE and iWarp protocol messages and coordinate data transfer to main memory,
      an NVMe engine configured to access a controller, communicating through main-memory data structures with a PCIe root complex configured to interconnect the single integrated circuit with an NVMe data-storage device,
      the PCIe root complex, and an internal messaging subsystem configured through which messages flow from the dual Ethernet MAC to the PCIe root complex and from the PCIe root complex to the Ethernet MAC through internal message-processing modules of the target fabric controller, including an upper-layer processor comprising the transport engine, the RDMA engine, and the NVMe engine.

30. The target fabric controller of claim 29 wherein the internal messaging subsystem comprises:
a control/module-intercommunications module;
a non-volatile logging controller; and
a chain-like interconnect configured to interconnect the Ethernet MAC, PCIe root complex, internal message-processing modules, and non-volatile logging controller.

31. The target fabric controller of claim 30 wherein each module and controller interconnected by the chain-like interconnect includes a chain-like communications-link interface comprising:
a multiplexor configured to receive event messages or packets from a previous module or controller in the chain-like interconnect; and
a logging monitor configured to:
receive an event message from the module or controller in which it is included,
wait for the absence of signal on the chain-like interconnect or for an unused time slot on the chain-like interconnect, and
output the event message to the chain-like interconnect through the multiplexor for transmission to the non-volatile logging controller.

32. The target fabric controller of claim 31 wherein the non-volatile logging controller is configured to periodically write to non-volatile memory a most recent set of event messages output by the modules and controllers interconnected by the chain-like interconnect.

33. The target fabric controller of claim 32 wherein the non- volatile logging controller comprises:
a circular buffer;
a tail pointer register configured to point to the next slot in the circular buffer into which an event message is placed;
a first internal logic module configured to receive a next message from the chain-like interconnect and to place the message in the circular buffer, updating the tail pointer register; and
a second logic module configured to access the contents of the circular buffer and dump the contents of the circular buffer into memory locations within a non-volatile memory.

34. The target fabric controller of claim 33 wherein the second logic module is further configured to access the event message contents of the circular buffer in most-recent to least-recent order.

35. The target fabric controller of claim 33 wherein the second logic module is further configured to set a bit or byte in the non-volatile memory to indicate the most recent values dumped from the circular buffer.

36. The target fabric controller of claim 33 wherein the control/module-intercommunications module is configured to, responsive to the control/module-intercommunications module detecting an error condition, raise an input signal to direct the non-volatile logging controller to dump the contents of the circular buffer to non-volatile memory.

37. The target fabric controller of claim 33 wherein the non-volatile logging controller further comprises a decision element configured to route received event messages depending on the event type contained within the event messages.

38. The target fabric controller of claim 37, wherein:
periodic event messages are routed to the circular buffer; and
recovered-error messages are routed to an additional logic module configured to signal the management processing unit and store the recovered-error messages in a set of non-volatile-memory addresses accessible to the management processing unit.

39. The target fabric controller of claim 32 wherein, responsive to an error occurring in the target fabric controller that requires diagnosis from on-site diagnosticians or by factory technologists, the contents of the non-volatile memory are accessed to determine the set of most recent event messages logged by internal message-processing modules and controllers within the target fabric controller.

40. The target fabric controller of claim 32 wherein two types of event messages are transmitted in the chain-like interconnect, the two types of event messages including:
a logging message; and
a recovered-error message.

41. The target fabric controller of claim 40 wherein the two types of event messages both include a header that comprises one or more of:
a time stamp;
a module ID;
a task ID; and
an event type.

42. The target fabric controller of claim 41 wherein a logging message includes one or more of:
an input type;
an input data summary;
an output type; and
an output summary.

43. The target fabric controller of claim 42 wherein a recovered-error message includes one or more of:
an error type; and
a logic ID.

44. A target fabric controller configured to bridge an Ethernet fabric to one or more peripheral component interconnect express (PCIe) attached non- volatile memory express (NVMe) data-storage devices, the target fabric controller comprising:
a single integrated circuit that includes:
a main-memory module,
dual Ethernet media-access-controller (MAC) configured to receive frames from, and transmit frames to, the Ethernet fabric,
a management processing unit that contains integrated-circuit management logic and is configured to establish, monitor, and tear down TCP connections and manage RDMA (remote-direct-memory-access)-over-Converged-Ethernet (RoCE) and NVMe connections,
a transport engine configured to receive and transmit TCP and iWarp protocol messages,
an RDMA engine configured to process inbound and outbound RoCE and iWarp protocol messages and coordinate data transfer to main memory,
an NVMe engine configured to access a controller, communicating through main-memory data structures with a PCIe root complex configured to interconnect the single integrated circuit with an NVMe data-storage device, and
the PCIe root complex.

45. The target fabric controller of claim 44 wherein the management processing unit is further configured to, during a three-frame exchange between the target fabric controller and a remote computer system which establishes a TCP connection between the target fabric controller and the remote computer system, create a connection context for the TCP connection in the main-memory module.

46. The target fabric controller of claim 44 wherein each TCP connection managed by the management processing unit is represented by a connection context that contains:
  a connection ID;
  state information for the connection;
  connection parameters; and
  a time-out value.

47. The target fabric controller of claim 46 wherein the management processing unit is further configured to:
  monitor a system-time register to detect each next clock tick; and
  responsive to a next clock tick occurring, iterate through connection contexts for TCP connections in the main-memory module that may have timed out, to determine which connection contexts include a time-out value less than the current system time indicated by the system-time register, and move the connection contexts that include a time-out value less than the current system time to a time-out-connection list for subsequent error handling.

48. The target fabric controller of claim 47 wherein the management processing unit is further configured to extract a first number of bits from the system-time register that represent a second number of clock digits, wherein the second number is the first number divided by a number of bits per digit.

49. The target fabric controller of claim 48 wherein each digit in the clock digits is associated with a number of pointers equal to the number of values that can be represented by the digit, and each pointer is configured to point to a doubly linked list of connection contexts.

50. The target fabric controller of claim 49 wherein the time-out value in each connect context is represented by a number of digits equal to the second number of clock digits.

51. The target fabric controller of claim 50 wherein the management processing unit is further configured to, responsive to the management processing unit creating a connection context:
  enter a time-out value in a time-out value field of the connection context; and
  add the connection context to a doubly linked list pointed to by a pointer associated with the value of the highest-order digit of the time-out value.

52. The target fabric controller of claim 51 wherein the management processing unit is further configured to, responsive to the management processing unit creating a connection context:
  enter a time-out value in the time-out value field of the connection context; and
  add the connection context to a doubly linked list pointed to by a pointer associated with the value of the highest-order digit of the time-out value.

53. The target fabric controller of claim 51 wherein the management processing unit is further configured to, responsive to the management processing unit detecting an event with respect to a TCP connection represented by a connection context:
  remove the connection context from the doubly linked list in which it currently resides;
  enter a new time-out value in the time-out value field of the connection context; and
  add the connection context to a doubly linked list pointed to by a pointer associated with the value of the highest-order digit of the time-out value.

54. The target fabric controller of claim 51 wherein the target fabric controller is configured to, responsive to the management processing unit detecting the occurrence of a next clock tick:
  determine the number of digits in the clock digits for which the value has changed since the previous clock tick; and
  for each digit in the clock digits for which the value has changed,
    for each doubly linked list pointed to by a pointer associated with the digit that may contain timed-out connection contexts,
      for each connection context in the doubly linked list,
        remove the connection context from the doubly linked list,
        responsive to the connection context timing out, add the connection context to the time-out-connection list, and
        responsive to the connection context not timing out, add the connection context to a doubly-linked list associated with a lower-order digit of the clock digits.

55. The target fabric controller of claim 51 wherein:
  each connection context includes a forward-pointer field and a backward-pointer field configured to connect the connection context within a doubly-linked list; and
  a connection context is moved from one doubly-linked list to another doubly- linked list by changing the contents of the forward-pointer field and a backward-pointer field.

* * * * *